US012412157B2

(12) United States Patent
Bourdon

(10) Patent No.: US 12,412,157 B2
(45) Date of Patent: Sep. 9, 2025

(54) GEOSPATIAL ANALYSIS SYSTEM AND METHODS FOR OPTIMIZING TRADE DEPLOYMENT AND RISK MITIGATION IN CONSTRUCTION CONTRACTING PROJECTS

(71) Applicant: BuildWise, LLC, West Palm Beach, FL (US)

(72) Inventor: Nicholas Andre Bourdon, Boca Raton, FL (US)

( * ) Notice: Subject to any disclaimer, the term of this patent is extended or adjusted under 35 U.S.C. 154(b) by 64 days.

(21) Appl. No.: 18/597,665

(22) Filed: Mar. 6, 2024

(65) Prior Publication Data
US 2024/0303605 A1 Sep. 12, 2024

Related U.S. Application Data

(60) Provisional application No. 63/450,440, filed on Mar. 7, 2023.

(51) Int. Cl.
*G06Q 10/10* (2023.01)
*G06Q 10/0635* (2023.01)
(Continued)

(52) U.S. Cl.
CPC ....... *G06Q 10/103* (2013.01); *G06Q 10/0635* (2013.01); *G06Q 10/06375* (2013.01); *G06Q 30/018* (2013.01)

(58) Field of Classification Search
CPC ............. G06Q 10/103; G06Q 10/0635; G06Q 10/06375; G06Q 30/018; G06Q 30/00282
See application file for complete search history.

(56) References Cited

U.S. PATENT DOCUMENTS 11,070,651 B2 * 7/2021 Loynd .................... G06Q 10/10
11,288,613 B2 * 3/2022 Barnes ................... G06Q 50/08
(Continued)

OTHER PUBLICATIONS

Abu Oda, M. M. A., Tayeh, B. A., Alhammadi, S. A., & Abu Aisheh, Y. I. (2022). Key indicators for evaluating the performance of construction companies from the perspective of owners and consultants. Results in Engineering, 15, 100596. https://doi.org/10.1016/j.rineng.2022.100596 (Year: 2022).*

*Primary Examiner* — Shannon S Campbell
*Assistant Examiner* — Manal A. Alsamiri
(74) *Attorney, Agent, or Firm* — Derek Fahey, Esq.; The Plus IP Firm, PLLC

(57) ABSTRACT

A system and computer implemented method for optimizing trade deployment and risk mitigation in a construction contracting project based on a risk of utilizing a plurality of contractors on the construction contracting project is disclosed. The method includes receiving contractor information from a subcontractor and creating and storing the contractor information in a connected database as a contractor record. The method further includes analyzing the contractor information for authentication and assigning a value to a review status of the contractor record. The method further includes calculating a risk metric for the contractor and the project and displaying search results in response to a search query from the user computing device, generating a second graphical representation of a density map comprising a graphical icon corresponding to the geolocation data of the contractor record, and modifying appearance of the graphical icons in response to a user selection.

20 Claims, 38 Drawing Sheets

(51) Int. Cl.
    *G06Q 10/0637*    (2023.01)
    *G06Q 30/018*     (2023.01)
    *G06Q 30/0282*   (2023.01)

(56) References Cited

U.S. PATENT DOCUMENTS

| | | | | |
|---|---|---|---|---|
| 11,836,655 | B2* | 12/2023 | Peters | G06F 16/2445 |
| 2012/0109713 | A1* | 5/2012 | Wilhite | G06Q 30/0611 |
| | | | | 705/26.4 |
| 2014/0236723 | A1* | 8/2014 | Abhyanker | G06Q 50/01 |
| | | | | 705/14.57 |
| 2023/0214917 | A1* | 7/2023 | Doyle | G06Q 40/03 |
| | | | | 705/7.39 |

\* cited by examiner

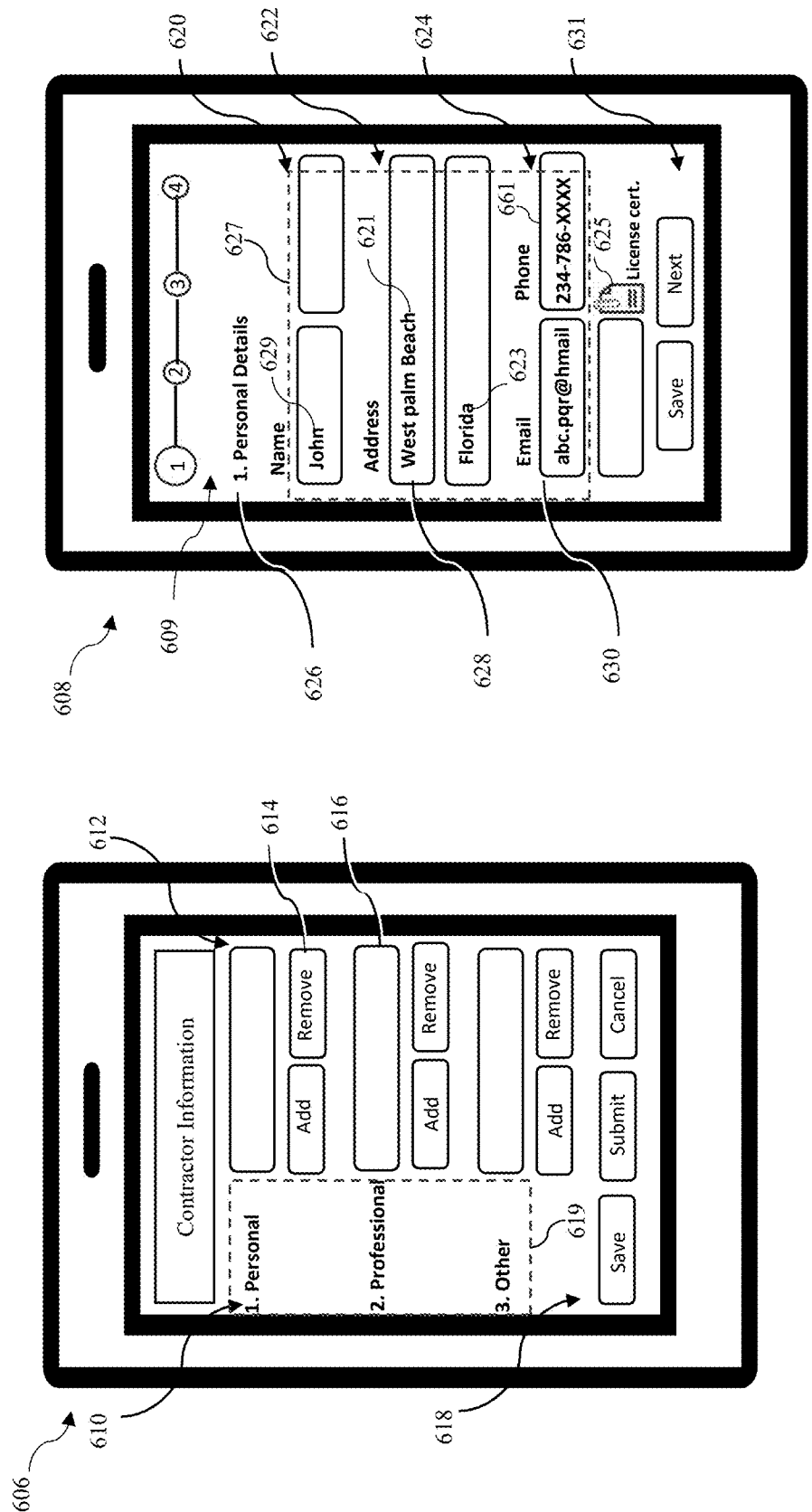

| Name | Current Location | Specialization | Valid License | Valid Insurance | Overall Risk |
|---|---|---|---|---|---|
| A.contractor5 | Orlando, Florida | HVAC | Yes | Yes | Low |
| A.contractor2 | West Palm Beach, Florida | HVAC | Yes | Yes | High |
| A.contractor1 | Tampa, Florida | HVAC | Yes | Yes | Low |
| A.contractor3 | Tampa, Florida | HVAC | Yes | Yes | Low |
| A.contractor7 | Orlando, Florida | HVAC | Yes | Yes | Low |
| A.contractor6 | West Palm Beach, Florida | HVAC | Yes | Yes | High |
| A.contractor4 | Tampa, Florida | HVAC | Yes | Yes | Low |

FIG. 6E

| Name | Current Location | Specialization | Valid License | Valid Insurance | Overall Risk |
|---|---|---|---|---|---|
| A.contractor5 | Orlando, Florida | HVAC | Yes | Yes | Low |
| A.contractor7 | Orlando, Florida | HVAC | Yes | Yes | Low |
| A.contractor1 | Tampa, Florida | HVAC | Yes | Yes | Low |
| A.contractor3 | Tampa, Florida | HVAC | Yes | Yes | Low |
| A.contractor4 | Tampa, Florida | HVAC | Yes | Yes | Low |
| A.contractor6 | West Palm Beach, Florida | HVAC | Yes | Yes | High |
| A.contractor2 | West Palm Beach, Florida | HVAC | Yes | Yes | High |

GEOSPATIAL ANALYSIS SYSTEM AND METHODS FOR OPTIMIZING TRADE DEPLOYMENT AND RISK MITIGATION IN CONSTRUCTION CONTRACTING PROJECTS

CROSS-REFERENCE TO RELATED APPLICATIONS

This application claims the benefit of the filing date of U.S. Provisional Application Ser. No. 63/450,440 entitled "METHODS AND SYSTEMS FOR ASSIGNING A RISK OF USING A PLURALITY OF SUBCONTRACTORS ON A CONSTRUCTION PROJECT" and filed Mar. 7, 2023, the subject matter of which is incorporated herein by reference.

TECHNICAL FIELD

The present disclosure relates to the field of construction management, and more specifically to the field of subcontractor evaluation methods.

BACKGROUND

Construction projects often come with a variety of challenges that can decrease the efficiency and profitability of these projects. For construction professionals, such as general contractors, this is a big problem. These issues will not only lower the project's profitability but will also welcome stress and frustration to all of the individuals involved. Another major issue that construction projects face is disorganization. When hiring a plurality of subcontractors, there is bound to be some organization issues. A disorganized project creates a disorganized team which leads to miscommunication, misunderstandings, and ultimately a poorly completed project. Overall, organization is key.

In the realm of construction projects, identification of suitable contractors and subcontractors across diverse geographic locations poses a multifaceted challenge. The construction projects encompasses a broad spectrum, including residential, commercial, and industrial undertakings. Contractors, pivotal to the realization of these projects, vary in expertise, resources, and geographical reach. The general challenge lies in the need to align project requirements with the capabilities and availability of contractors, considering the distinct demands and regulations prevalent in different geographic locations.

Specifically, the identification process involves assessing various parameters, such as contractors' qualifications, experience, and past performance. For instance, determining if a contractor possesses the requisite licensing, bonding, and insurance in accordance with the regulations of a specific geographic area is crucial. In a commercial construction project, identifying contractors may involve selecting a general contractor with experience in managing large-scale projects, alongside subcontractors specializing in concrete work, HVAC systems, and interior finishing. The process extends beyond mere selection, encompassing negotiations, contract drafting, and ongoing collaboration throughout the project lifecycle.

Operatively, the process involves extensive research, networking, and sometimes leveraging digital platforms to identify potential contractors and the subcontractors. This may entail soliciting recommendations from industry peers, reviewing past projects, and conducting background checks to verify qualifications and credentials of the contractors and the subcontractors. This challenge intensifies when the project spans across diverse geographic locations, each with its unique set of challenges and opportunities. The online platforms often suffer from several shortcomings, such as, the information provided by contractors may be incomplete or outdated, leading to mismatches between project requirements and contractor capabilities. Secondly, the absence of robust verification mechanisms can result in unreliable or fraudulent listings, posing risks to project owners.

Moreover, some of the biggest challenges construction projects face are lack of skilled workers, lack of communication, and unreliable subcontractors. The current method for evaluating the risk the general contractor takes, when hiring a plurality of subcontractors, is often word of mouth. Miscommunication happens much too often, especially in business. When gathering together a team for a profitable project, a manager, or general contractor, needs to have confidence in his workers and be able to trust that they know what they are doing, how to do it, and will perform beyond expectations. Every contractor knows that you cannot trust the promise of good work without any proof, which means general contractors typically seek out background information on workers before gathering the team. General contractors will look at metrics such as safety records, prior projects worked on, turnover rates, insurance, etc. All of these metrics are normally stored across various platforms forcing the general contractors to have to search for the desired information, analyze such information, and determine themselves the level of risk involved in hiring a plurality of subcontractors thereby making the overall process expensive and time consuming.

As a result, there exists a need for improvements over the prior art and more particularly for a more efficient system or method for evaluating a plurality of potential subcontractors for a particular construction project. Furthermore, there is a need for a system or method for calculating a risk metric for a plurality of subcontractors.

SUMMARY

A method and system for optimizing trade deployment and risk mitigation in a construction contracting project based on a risk of utilizing a plurality of contractors on the construction contracting project having a computer implemented method being executed by one or more processors over a communication network is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a computer implemented method for optimizing trade deployment and risk mitigation in a construction contracting project based on a risk of utilizing a plurality of contractors on the construction contracting project is disclosed. The method for optimizing trade deployment and risk mitigation comprises receiving contractor information from a contractor computing device of a contractor, the contractor information comprising (i) contractor input data, (ii) at least one document, and (iii) geolocation data, storing the contractor record in a connected database, analyzing the contractor information, authenticating and validating the contractor information, and assigning a review status of a corresponding value for a first subset of the contractor information, the value of the review status being indicative of a validation outcome of the first subset of the subcontractor information. The method for optimizing trade deployment and risk mitigation in a construction contracting project then includes calculating a contractor risk metric associated with the contractor record based on the review status and the corresponding value. The contractor risk metric is a measurement of a potential impact of the contractor on the construction contracting project, storing the contractor risk metric in the contractor record in the connected database. The method for optimizing trade deployment and risk mitigation in a construction contracting project further includes displaying a first graphical user interface on a second computing device of a user, the first graphical user interface comprising a request for the user to input a search query comprising parameters associated with the construction contracting project to generate the search query, receiving the search query from the second computing device, generating query results by matching the parameters with the contractor record stored in the connected database, and segmenting the query results into a plurality of groups based on risk metrics and the geolocation data associated with the contractor record. The method for optimizing trade deployment and risk mitigation in a construction contracting project includes generating a first graphical representation of a map comprising a graphical icon corresponding to the geolocation data of the contractor record matched in the query results. The plurality of contractor records are represented by a plurality of graphical icons distributed across the map. The graphical icon comprises a first stylized representation, generating a project risk metric within a first predetermined geolocation based on the contractor risk metric of the contractor record matched in the query results and where said contractor record comprises the geolocation data corresponding to the first predetermined geolocation, generating a second graphical representation of a density map that represents the magnitude of risk associated with the construction contracting project. Thereafter, the method for optimizing trade deployment and risk mitigation in a construction contracting project includes displaying at least one of a first graphical representation and the second graphical representation on the user computing device, receiving a selection from the user computing device, wherein the selection is a request to modify appearance of the graphical icon from the stylized representation to a second stylized representation, and automatically displaying on the user computing device, the second stylized representation comprising a subset graphical window comprising the contractor record displayed in a standardized format.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown, wherein:

FIGS. 6A, 6B and 6C are example graphical user interfaces displayed on a computing device, in accordance with another example embodiment;

FIGS. 6E and 6F illustrate query results in response to a search query, in accordance with another example embodiment;

FIG. 7 is an example user interface displaying a contractor's profile, according to an example embodiment;

DETAILED DESCRIPTION

Figure 1A:
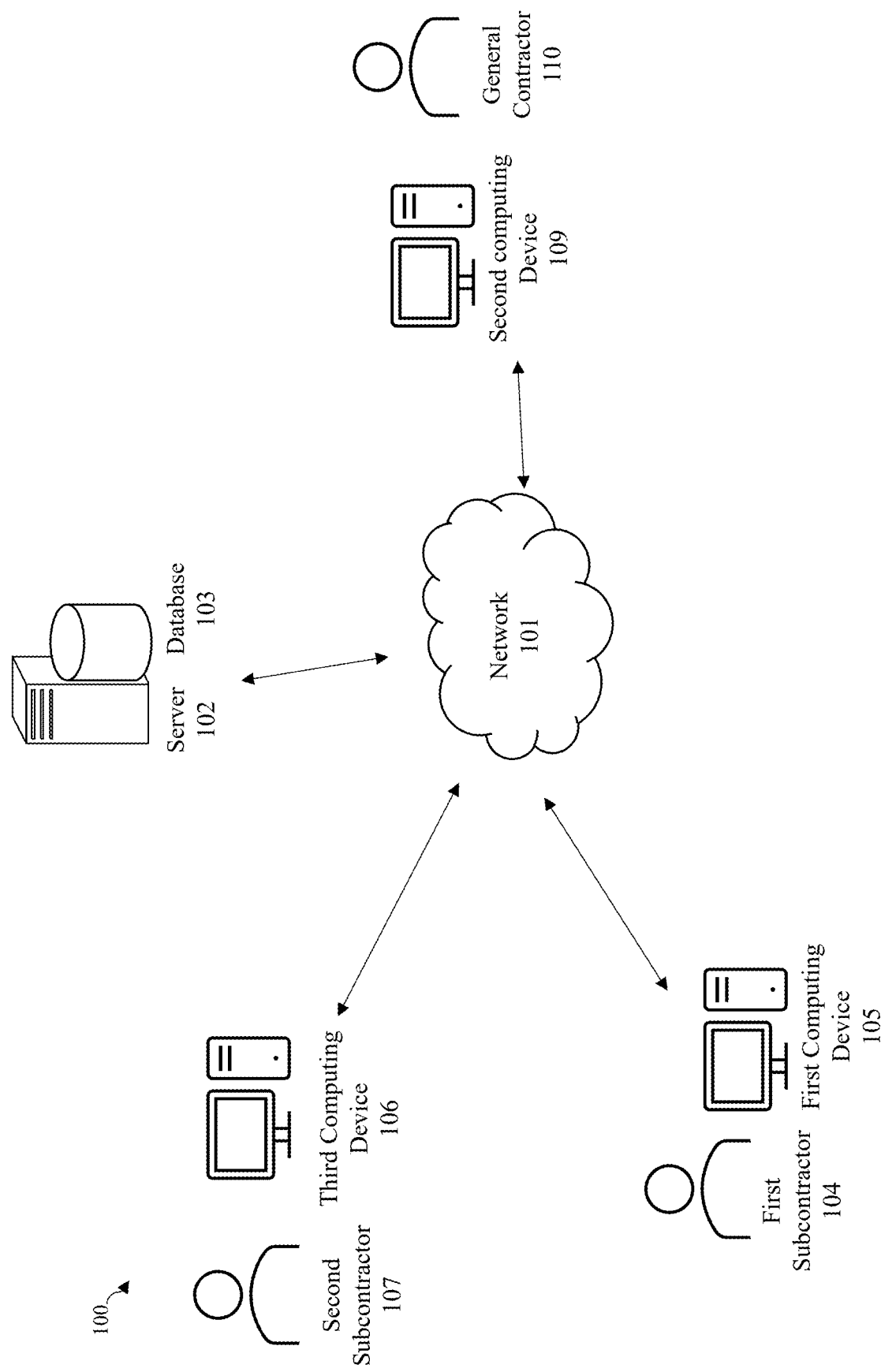
FIG. 1A is a block diagram illustrating a system for assigning a risk of utilizing a plurality of subcontractors on a construction project, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the prior art by verifying credentials, competency, qualifications, and previous work experience of subcontractors that significantly enhances the process of selecting subcontractors for a project. The selection process becomes more rigorous and reliable, mitigating the risk of selecting underqualified or unsuitable candidates. Further, the disclosed embodiments improve upon the prior art by promoting transparency and accountability in the selection process, the method fosters trust and confidence among project participants. The disclosed embodiment relies on assigning a risk metric to a contractor and the project and significantly enhances the process of selecting contractors and executing projects by introducing a systematic evaluation framework. By employing such a method, stakeholders gain a comprehensive understanding of the inherent risks involved, enabling informed decision-making during contractor selection and project execution. The stakeholders can prioritize mitigation efforts and allocate resources more effectively, thereby enhancing project outcomes and stakeholder satisfaction. The disclosed embodiments improve upon the prior art by considering multiple parameters to search and identify subcontractors within a geographic location for a construction project. The embodiments provide a systematic evaluation that reduces the risk of overlooking crucial aspects and enhances the likelihood of identifying the most suitable subcontractors for the project. Further, the system facilitates user interaction with graphical icons representing subcontractors on a user device thereby enhancing user experience. Users can intuitively navigate through various subcontractor options, accessing relevant information such as expertise, risk, and location that promotes faster decision-making thereby improving the selection process. The disclosed embodiments improve upon the problems with the prior art by providing a system for assigning a risk of using a plurality of subcontractors on a construction project. The disclosure allows a contractor to analyze a list of subcontractors for a project such that the contractor can select certain subcontractors for hire based on their risk factor. Each risk factor is assigned a color to allow the contractor to easily identify the risk factor of a subcontractor. Thus, the disclosed embodiments optimize trade deployment and mitigate risks for a construction project.

One particularly improvement over the prior art is the dynamic and interactive nature of the system, which allows users to customize their analysis and visualization of data in real time. This system not only presents static maps and metrics but also enables users to interact with the data, adjusting parameters to suit specific project needs or to explore various risk scenarios. This feature significantly enhances the utility and flexibility of the platform, empowering users to engage in what-if analysis and tailor their strategies based on updated information or changing project dynamics.

Additionally, the integration of machine learning algorithms for the authentication and validation of contractor information introduces a level of depth and reliability in risk assessment not commonly found in traditional systems. By leveraging machine learning, the system can continually improve its accuracy and efficiency in processing and analyzing contractor data. This approach not only minimizes human error but also adapts over time to recognize patterns and nuances in the data, leading to more nuanced risk assessments and more informed decision-making.

Furthermore, the method's emphasis on geolocation data and its use in generating both density maps and heat maps for visualizing contractor distribution and project risk provides a substantial improvement over existing technology. This geospatial analysis allows for a highly detailed understanding of how risk and resource availability are distributed across different locations, providing insights that are crucial for strategic planning in construction project management. The ability to visually compare and contrast these factors across different regions offers a powerful tool for optimizing trade deployment and mitigating risk based on geographical considerations.

Lastly, the systems ability to convert non-standardized contractor information into a standardized format through advanced data extraction and processing techniques addresses a common challenge in the industry. By creating a unified data structure, the system facilitates more efficient data management, better integration with existing databases or systems, and enhanced scalability. This standardization is critical for ensuring that the system can handle diverse data types and sources, making it a versatile tool for construction project management. Moreover, the system is adaptable to various settings and geographic locations where input of data may vary significantly in format, structure, and even disclosed information.

In summary, the disclosed system's dynamic interactivity, machine learning-enhanced validation processes, sophisticated geospatial analysis, and advanced data standardization techniques collectively represent a significant leap forward in construction project management and contractor selection. These features not only address existing gaps and limitations in prior art but also open up new avenues for enhancing project efficiency, reducing risk, and improving overall project outcomes.

Referring now to the Figures. FIG. 1A is a diagram of an operating environment 100 that supports the computer implemented method of utilizing a plurality of subcontractors on construction projects, according to an example embodiment. The most prominent element of FIG. 1A is the server 102 associated with a repository or database 103 and further coupled with network 101, which can be a circuit switched network, such as the Public Service Telephone Network (PSTN), or a packet switched network, such as the Internet or the World Wide Web, the global telephone network, a cellular network, a mobile communications network, or any combination of the above. In one embodiment, network 101 is a secure network wherein communications between endpoints are encrypted so as to ensure the security of the data being transmitted. Server 102 is a central controller or operator for the functionality that executes on at least a first computing device 105, via various methods.

FIG. 1A further includes a first computing device 105, a second computing device 109, and a third computing device 106 which each may be smart phones, mobile phones, tablet computers, handheld computers, laptops, or the like. The first computing device 105 corresponds to the first subcontractor 104. The second computing device 109 corresponds to the general contractor 110. The third computing device 106 corresponds with the second subcontractor 107. Each of the computing devices include a user interface and/or graphical user interface. In certain embodiments, the system may communicate between the first subcontractor, the second subcontractor, and the general contractor, over the communications network, where the first subcontractor is a user that is supervised by a contractor. The second subcontractor is another subcontractor of the plurality of subcontractors. The subcontractors enter subcontractor input data via a user interface on the computing devices to be sent through the communications network via a data packet and stored in the database. The subcontractor input data includes contractor name, contact information, financial information, administrative information, license information, tax information, prior job information, reference information. Other information related to the subcontractor may be included in the subcontractor input data and is within the spirit and scope of the present invention.

FIG. 1A further shows that server 102 includes a database 103, which may be one or more of a relational databases comprising a Structured Query Language (SQL) database stored in a SQL server, a columnar database, a document database and a graph database. The first computing device 105, the second computing device 109, and the third computing device 106 may also each include their own database. The database 103 serves data from a database, which is a repository for data used by server 102 and the mobile devices during the course of operation of the invention. Database 103 may be distributed over one or more nodes or locations that are connected via network 101.

The software is configured to create contractor records for the users. The database 103 may include a stored record for each of the users in the system. The database may be configured to store a subset of user attributes including non-personal identifying information ("PII") data. PII means information that identifies, relates to, describes, is capable of being associated with, or could reasonably be linked, directly or indirectly, with a particular user. Non PII data may include information that is anonymous and cannot identify the user. Non PII data helps protect the user such that the information may not be used to harm the user. Non PII data may include device type, browser type, language preference, time zone, etc.

FIG. 1A shows an embodiment wherein networked computing devices 105, 106, and 109 may interact with server 102 and database 103 over the network 101. Server 102 includes a software engine that delivers applications, data, program code and other information to networked first computing device, second computing device, and third computing device. The software engine of server 102 may perform other processes such as audio and/or video streaming or other standards for transferring multimedia data in a stream of packets that are interpreted and rendered by a software application as the packets arrive. It should be noted that although FIG. 1A shows only three networked mobile computing devices, the system of the present invention supports any number of networked mobile computing devices connected via network 101, having at least the first computing device 105, the second computing device 109, the third computing device 106.

Server 102 may include a website server that delivers web pages to the first contractor computing device 105, the second contractor computing device 109, and the third computing device 106. Web pages (sometimes referred to herein as, "graphical displays") may be sent via communications including hypertext markup language ("HTML"), cascading style sheets ("CSS"), and JavaScript files, among others. Additional communications between the various device entities (105, 106, 109) may include various types of data transfer. The data may be provided in a variety of suitable formats, such as one or more of extensible markup language ("XML"), JavaScript object notation ("JSON"), and other lesser used formats such as YAML (standing for a recursive definition of "YAML Ain't Markup Language," and referring to a human-readable data-serialization language). Data objects (e.g., JSON, XML) received by the web browser may be displayed according to accompanying HTML, CSS, and/or JavaScript, depending on the context.

Server 102 also includes program logic comprising computer source code, scripting language code or interpreted language code that is compiled to produce executable file or computer instructions that perform various functions of the present invention. In another embodiment, the program logic may be distributed among more than one of server 102, computing devices, or any combination of the above.

Note that although server 102 is shown as a single and independent entity, in one embodiment of the present invention, the functions of server 102 may be integrated with another entity, such as each of computing devices. Further, server 102 and its functionality, according to a preferred embodiment of the present invention, can be realized in a centralized fashion in one computer system or in a distributed fashion wherein different elements are spread across several interconnected computer systems. While the blockchain is illustrated as a single entity, the blockchain is actually decentralized, meaning that the data in the blockchain is stored into multiple nodes of the network. The decentralized nature of the blockchain allows the data stored within the blockchain to be immutable.

Figure 1B:
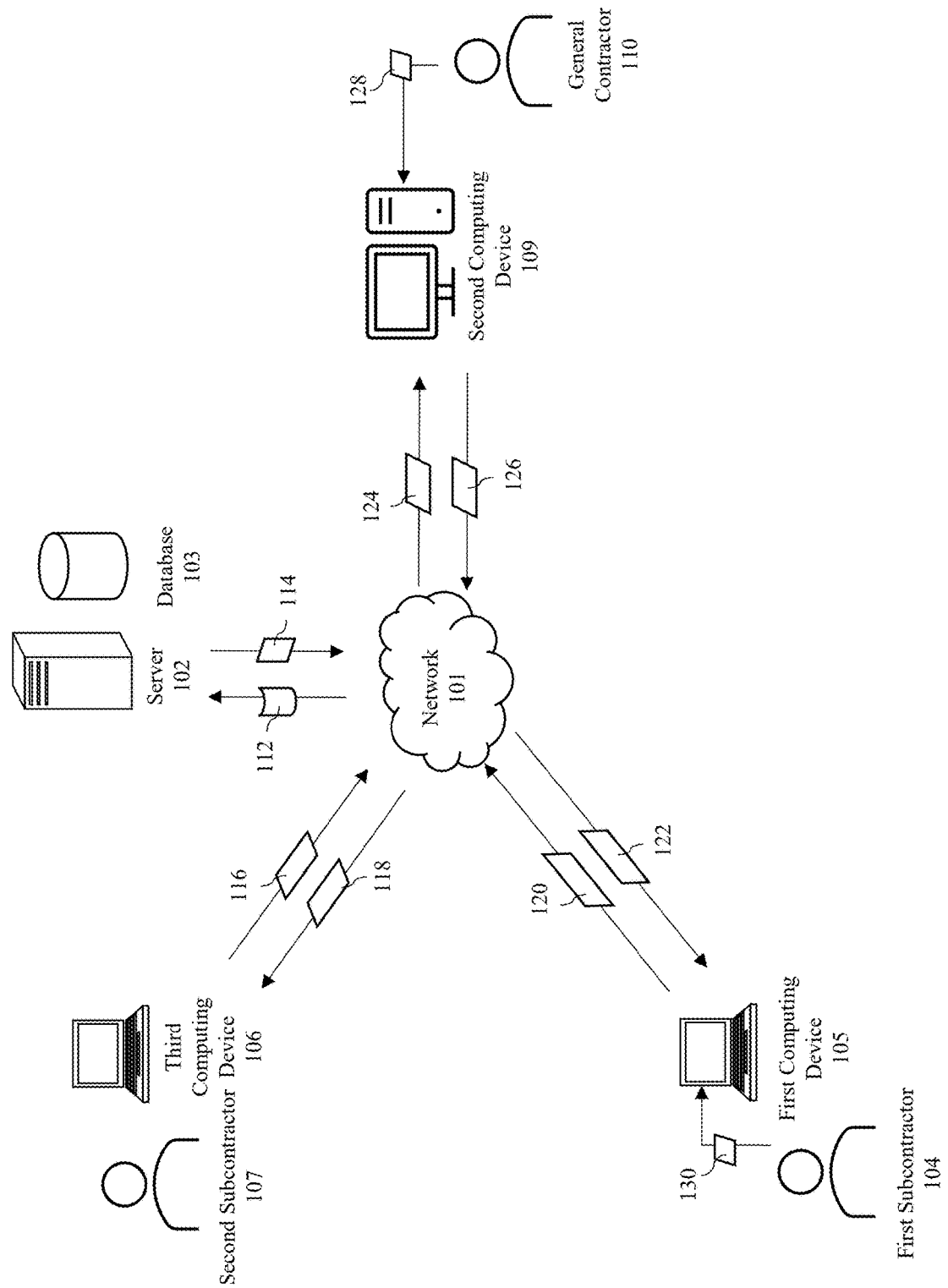
FIG. 1B is a block diagram illustrating a system for optimizing trade deployment and risk mitigation in a construction contracting project based on a risk of utilizing a plurality of contractors on the construction contracting project, according to an example embodiment.
Figure 1C:
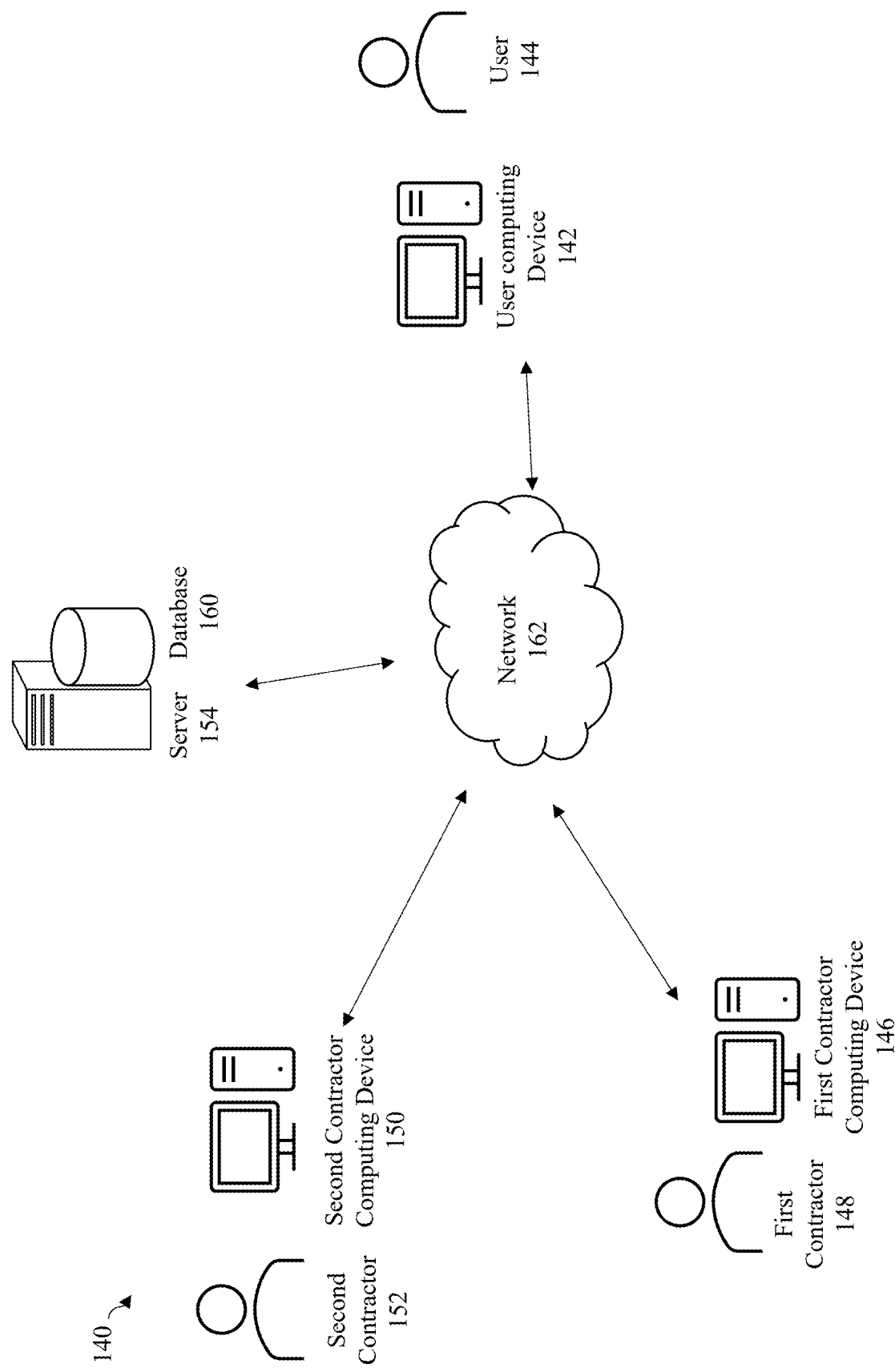
FIG. 1C is a block diagram illustrating a system for optimizing trade deployment and risk mitigation in a construction contracting project based on a risk of utilizing a plurality of contractors on the construction contracting project, according to another example embodiment.

In another embodiment, FIG. 1C comprises a first contractor computing device 146, a second contractor computing device 150, and a user computing device 142. The computing devices may be smart phones, mobile phones, tablet computers, handheld computers, laptops, or the like. The first contractor computing device corresponds to the first contractor 148. The second contractor computing device corresponds to the second contractor 152, and the user computing device 142 corresponds to the user 144. As noted above, each of the computing devices include a user interface and/or graphical user interface. In certain embodiments, the system may communicate between the first contractor, the second contractor, and the user, over the communications network, where the first contractor is a user supervised by a contractor. In an example, the first contractor and the second contractor are subcontractors available in a location. The contractors enter subcontractor input data via a user interface on the computing devices to be sent through the communications network via a data packet and stored in the database. The user input data includes contractor name, contact information, financial information, administrative information, license information, tax information, prior job information, reference information. Other information related to the contractor may be included in the contractor input data and is within the spirit and scope of the present invention. It may be noted that the user depicted in FIG. 1C is same as the general contractor shown in FIGS. 1A and 1B, and throughout this document, it refers to the general contractor in various embodiments presented herein. Alternatively, in certain embodiments, the term "user" encompasses any individual other than the general contractor who seeks to identify contractors and subcontractors for a construction project. Further, the term "contractor," including the first contractor and the second contractor of FIG. 1C, is same as the subcontractor, represented by the first subcontractor and the second subcontractor in FIGS. 1A and 1B, and in various embodiments disclosed herein, it denotes the subcontractor across the entirety of the document.

In another embodiment, the system 140 includes combination of hardware and software similar to the operating environment 100. System 140 may include fewer or different components, and the division of work between the components may vary depending on the arrangement. For example, the system 140 may have the user computing device 142 of the user 144 that is in communication with the first contractor computing device 146 of the first contractor 148 and the second contractor computing device 150 of the second contractor 152. FIG. 1C shows an embodiment wherein networked computing devices 142, 146, and 150 may interact with server 154 and database 160 over the network 162. Server 154 includes a software engine that delivers applications, data, program code and other information to networked first computing device, second computing device, and third computing device. The software engine of server 154 may perform other processes such as audio and/or video streaming or other standards for transferring multimedia data in a stream of packets that are interpreted and rendered by a software application as the packets arrive.

Server 154 may include a website server that delivers web pages to the first contractor computing device 146, the second contractor computing device 150, and the user computing device 142. Server 154 also includes program logic comprising computer source code, scripting language code or interpreted language code that is compiled to produce executable file or computer instructions that perform various functions of the present invention. In another embodiment, the program logic may be distributed among more than one of server 102, computing devices, or any combination of the above. Network 162 is similar to network 101, which can be a circuit switched network, such as the Public Service Telephone Network (PSTN), or a packet switched network, such as the Internet or the World Wide Web, the global telephone network, a cellular network, a mobile communications network, or any combination of the above. In one embodiment, network 162 is a secure network wherein communications between endpoints are encrypted so as to ensure the security of the data being transmitted. Server 154 is a central controller or operator for the functionality that executes on at least a first contactor computing device, via various methods.

The server 154 includes the database 160, which may be one or more of a relational databases comprising a Structured Query Language (SQL) database stored in a SQL server, a columnar database, a document database and a graph database. The first contractor computing device, the second contractor computing device, and the user computing device may also each include their own database.

The process of assigning a risk of utilizing a plurality of subcontractors on a construction project will now be described with reference to FIGS. 1B and 2 through 5B. FIGS. 1B and 2 through 5B depict, among other things, data flow and control flow in the process for assigning a risk of utilizing a plurality of subcontractors on a construction project, according to one embodiment. FIG. 1B is a schematic illustrating communication between the entities in FIG. 1A in relation to assigning a risk of utilizing a plurality of subcontractors on a construction project, according to an example embodiment. It is understood that in FIG. 1B, the data packets 112, 114, 116, 118, 120, 122, 124, 126, 128, and 130 are used to show the transmission of data and may be used at different stages of the process. The first subcontractor 104 may use the first computing device 105 to communicate with the server 102, which includes the database 103. The general contractor 110 may use the second computing device 109, and the second subcontractor 107 may use the third computing device 106.

Figure 2A:
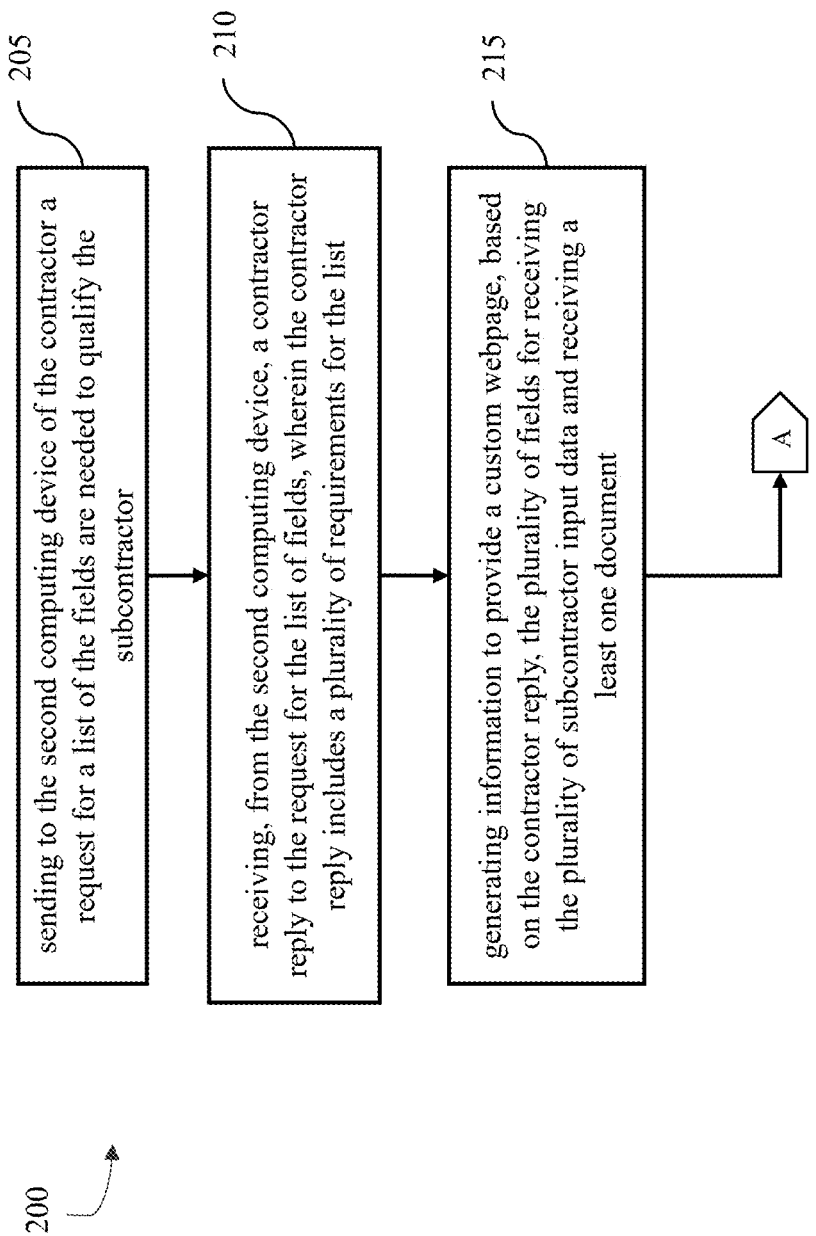
FIG. 2A is a block flow diagram of an example embodiment for assigning a risk of utilizing a plurality of subcontractors on a construction project, according to an example embodiment.
Figure 2B:
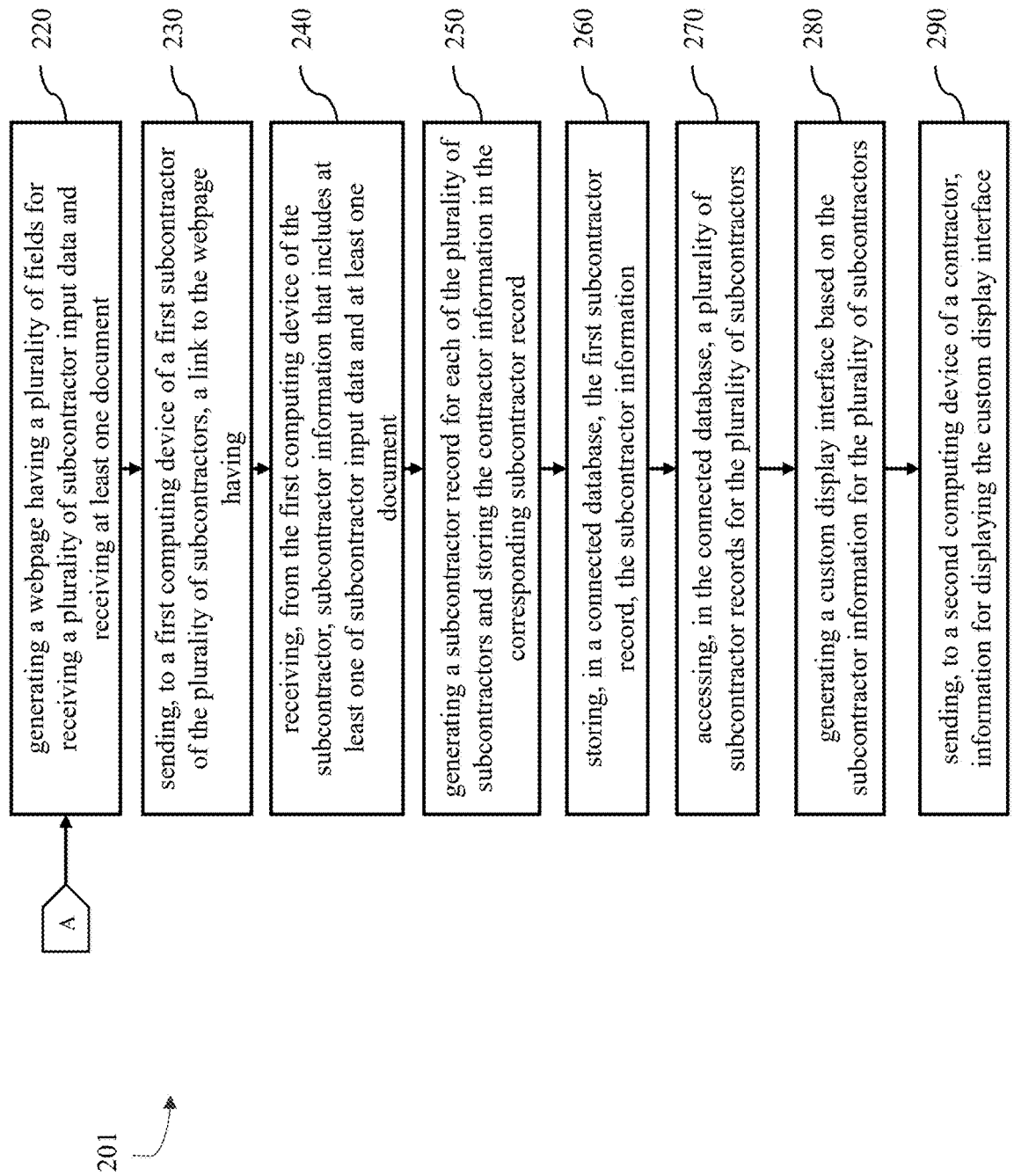
FIG. 2B is a block flow diagram of an example embodiment for assigning a risk of utilizing a plurality of subcontractors on a construction project, according to an example embodiment.

Referring now to FIGS. 2A and 2B, methods 200 and 201 illustrate the steps taken by one or more processors to execute the computer implemented method of assigning a risk of utilizing a plurality of subcontractors on a construction project are shown, according to an example embodiment. In step 205, the one or more processors of the server 102 may send data packet 114 to be received as data packet 124 by the second computing device of the general contractor. The data packets 114 and 124 include a request for a list of the fields that are needed to quality the subcontractor. In step 210, the general contractor enters a contractor reply to the request for the list of fields, via data packet 128, into the second computing device. The second computing device sends data packet 126 over the network 101. The processor then receives, from the second computing device, the contractor reply in data packet 112. The contractor reply may include a plurality of requirements for the list. Next, in step

215, the processor may generate information configured to provide a custom webpage 609. Based on the contractor reply, the plurality of fields for receiving the plurality of subcontractor input data and receiving a least one document may vary.

In step 220, the one or more processors will first generate the custom webpage 609 having a plurality of fields for receiving a plurality of subcontractor input data and receiving at least one document. The at least one document may be an alphanumeric information defining a certificate of license, proof or insurance, a financial document, certificate of competency, etc. The subcontractor input data may include contractor name 629, contact information 661, financial information 635, administrative information, license information, tax information, prior job information, reference information, etc. However, the subcontractor input data may also include other information associated with the subcontractor and is within the spirit and scope of the present invention.

Next, in step 230, processor of server sends data packet 114, including link data configured to provide a link to the webpage to the first computing device of the plurality of subcontractors, over the network 101. The first computing device receives the link data via data packet 122. The first subcontractor enters subcontractor information via data packet 130 into the first computing device 105. The first computing device sends data packet 120 including the subcontractor information entered by the first subcontractor. In step 240, the server receives data packet 112, including data of subcontractor information that includes at least one of subcontractor input data and at least one document from the first computing device. The document includes alphanumeric information defining a certificate of license, proof of insurance, a financial document, a certificate of competency. Next, in step 250, the server will generate a subcontractor record for each of the plurality of subcontractors. Once the subcontractor records are generated, the server will store the contractor information in the corresponding subcontractor record. Next, in step 260, the server will store, in a connected database, the first subcontractor record having the subcontractor information. Next, in step 270, the server will access, in the connected database, a plurality of subcontractor records for the plurality of subcontractors. Next, in step 280, the server will generate a custom display interface based on the subcontractor information for the plurality of subcontractors. Once the custom display is generated, the processor will move to step 290. In step 290, the server will send data packet 114 including information for displaying the custom display interface to a second computing device of a contractor.

Figure 3:
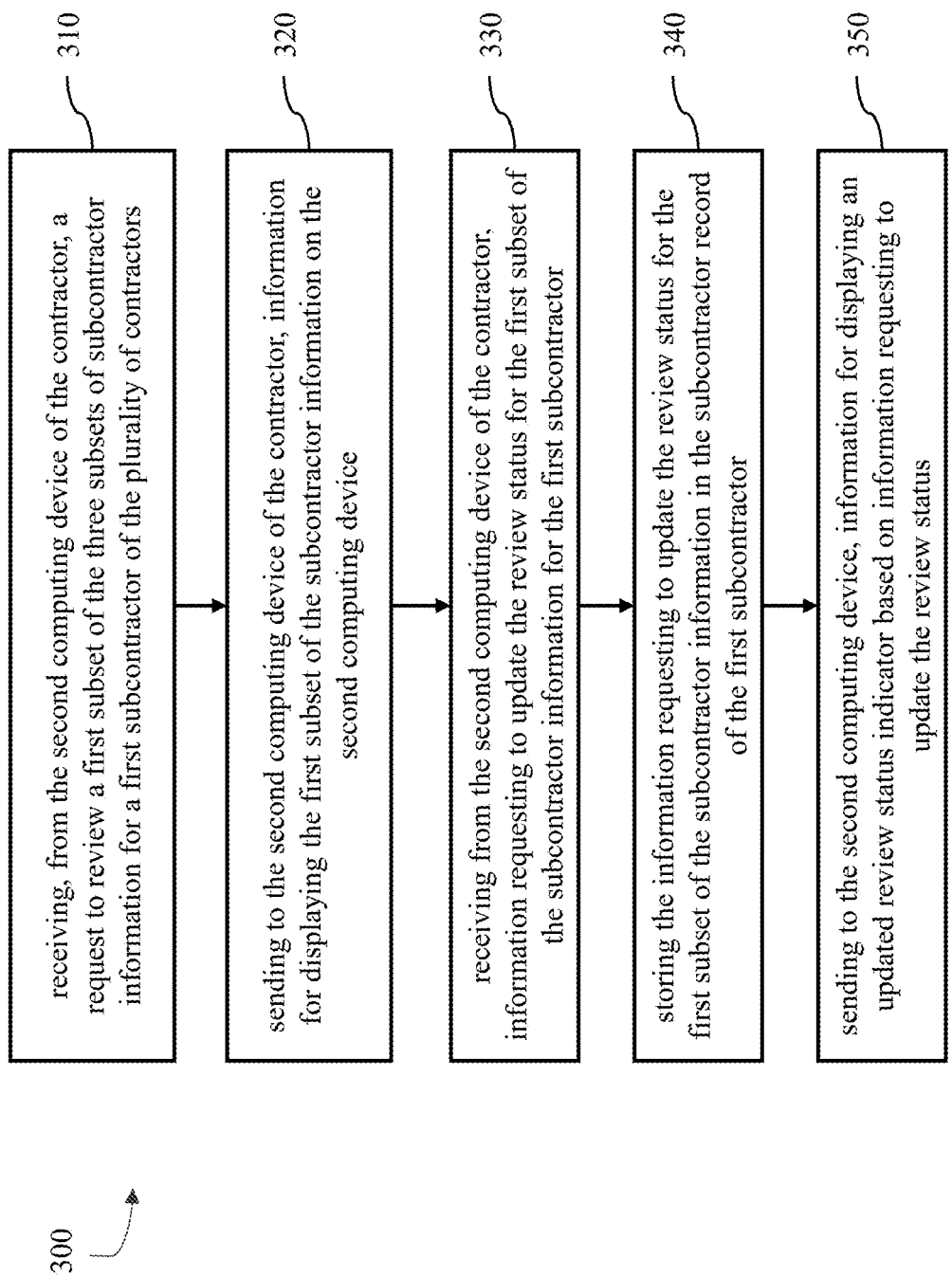
FIG. 3 is a flow chart illustrating a method for displaying a risk score for a contractor, according to an example embodiment.
Figure 10:
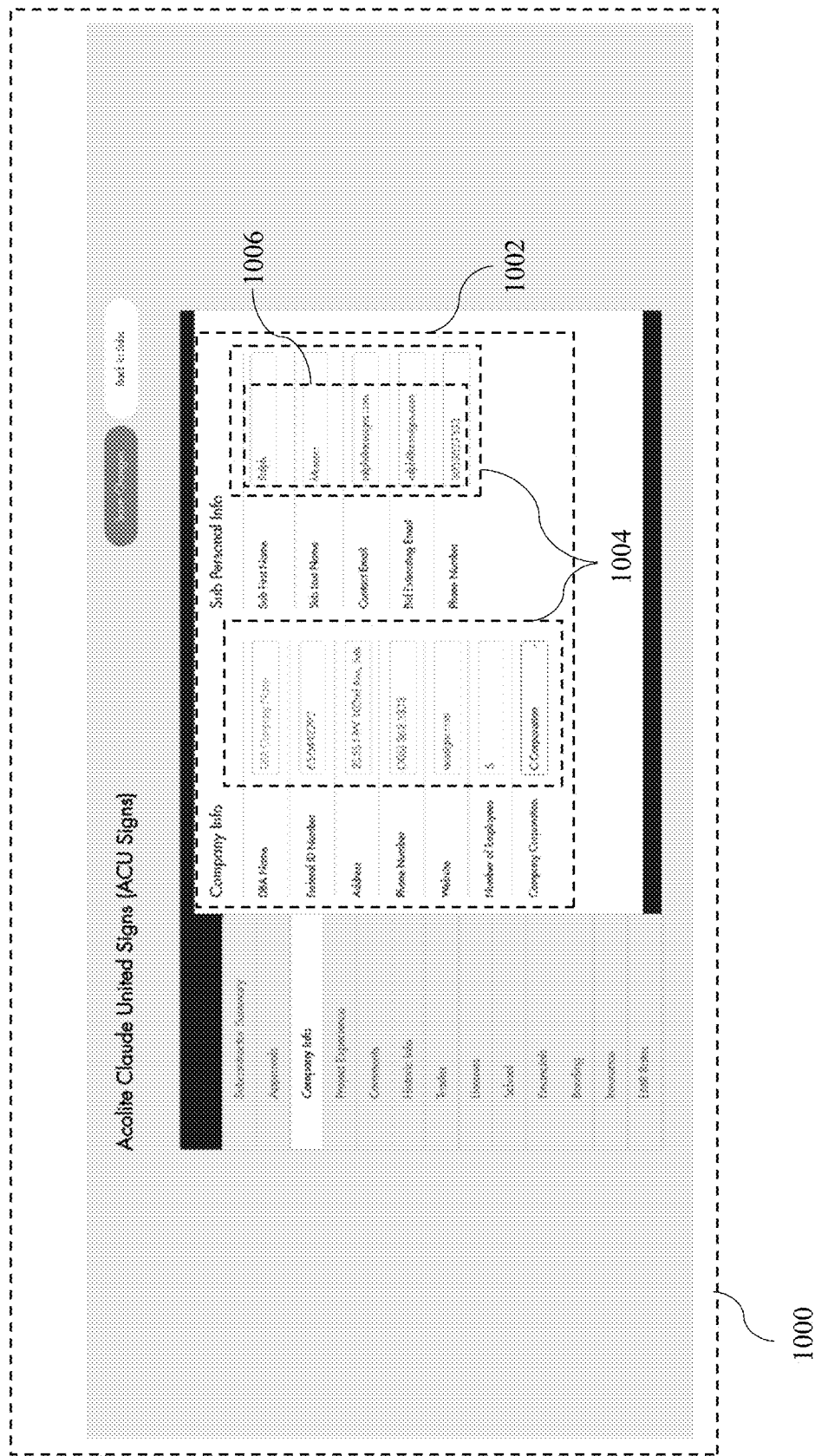
FIG. 10 is an example user interface for inputting subcontractor input data such as contact information, administrative information, tax information, etc., according to an example embodiment.

Referring now to FIG. 3, a flow chart 300 illustrating a method for displaying a risk score for a contractor is shown, according to an example embodiment. Beginning with step 310, the server receives data packet 112 including a request, from the second device of the contractor, to review a first subset of the three subsets of subcontractor information for a first subcontractor of the plurality of subcontractors. For example, the first subset 1006 of the contractor information provided by the contractor or the subcontractor, as shown in FIG. 10. In step 320, the processor will send, to the second computing device of the contractor, information for displaying the first subset of the subcontractor information on the second computing device. In step 330, the server will receive, from the second computing device of the contractor, information requesting to update the review status for the first subset of the subcontractor information for the first subcontractor. In step 340, the processor will store the information requesting to update the review status for the first subset of the subcontractor information in the subcontractor record of the first subcontractor. In step 350, the processor of the server will send to the second computing device information for automatically displaying an updated review status, for instance, updated review status 242 corresponding to a data based on information requesting to update the review status. The review status indicator may include a graphical representation 237 where the review status is at least one of denied, approved, or commented on.

Figure 4:
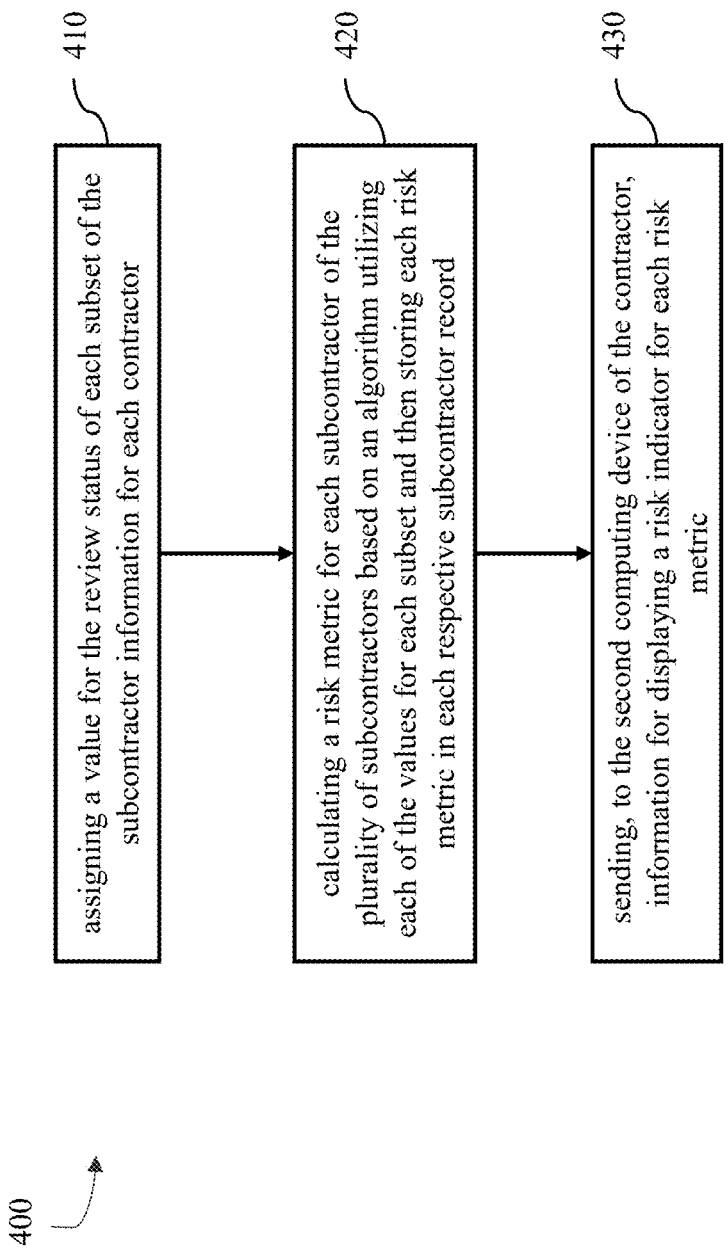
FIG. 4 is a flowchart illustrating a method for displaying a risk factor for each subcontractor, according to an example embodiment.

Referring now to FIG. 4, a flowchart 400 illustrating a method for displaying a risk factor for each subcontractor is shown, according to an example embodiment. Beginning with step 410, the server to assign a value (226 in FIG. 9) for the review status of each subset of the subcontractor information for each contractor. Next in step 420, the server will calculate a contractor risk metric 1600 for each subcontractor of the plurality of subcontractors based on an algorithm utilizing each of the values for each subset and then storing each contractor risk metric 1600 in each respective subcontractor record. As noted above, the contractor risk metric is a measurement of a potential impact of the contractor on the construction contracting project. Next, in step 430, the processor will send, to the second computing device of the contractor, information for displaying a risk indicator 229 for each risk metric.

Figure 5A:
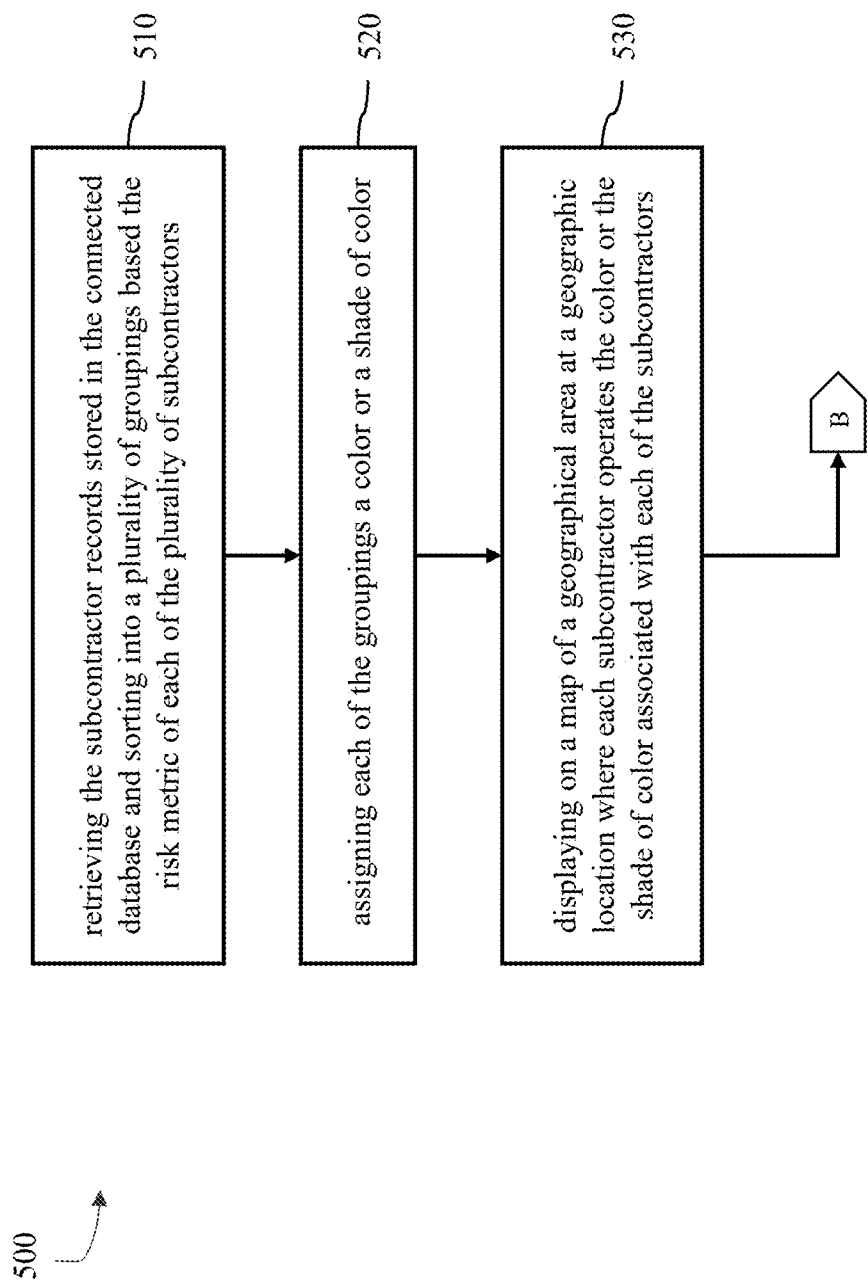
FIG. 5A is a flowchart illustrating the steps for creating and displaying a map depicting the risk factors associated with a plurality of subcontractors, according to an example embodiment.

Referring now to FIG. 5A, a flowchart 500 illustrating the steps for creating and displaying a map depicting the risk factors associated with a plurality of subcontractors is shown, according to an example embodiment. Beginning with step 510, the server to retrieve the subcontractor records, stored in the connected database, and sort said records into a plurality of groupings based on the contractor risk metric 1600 of each of the plurality of subcontractors. In step 520, the processor will assign each of the groupings a color or shade of color. In step 530, the server will display, on a map of a geographical area at a geographic location where each subcontractor operates, the color or the shade of color associated with each of the subcontractors.

Figure 5B:
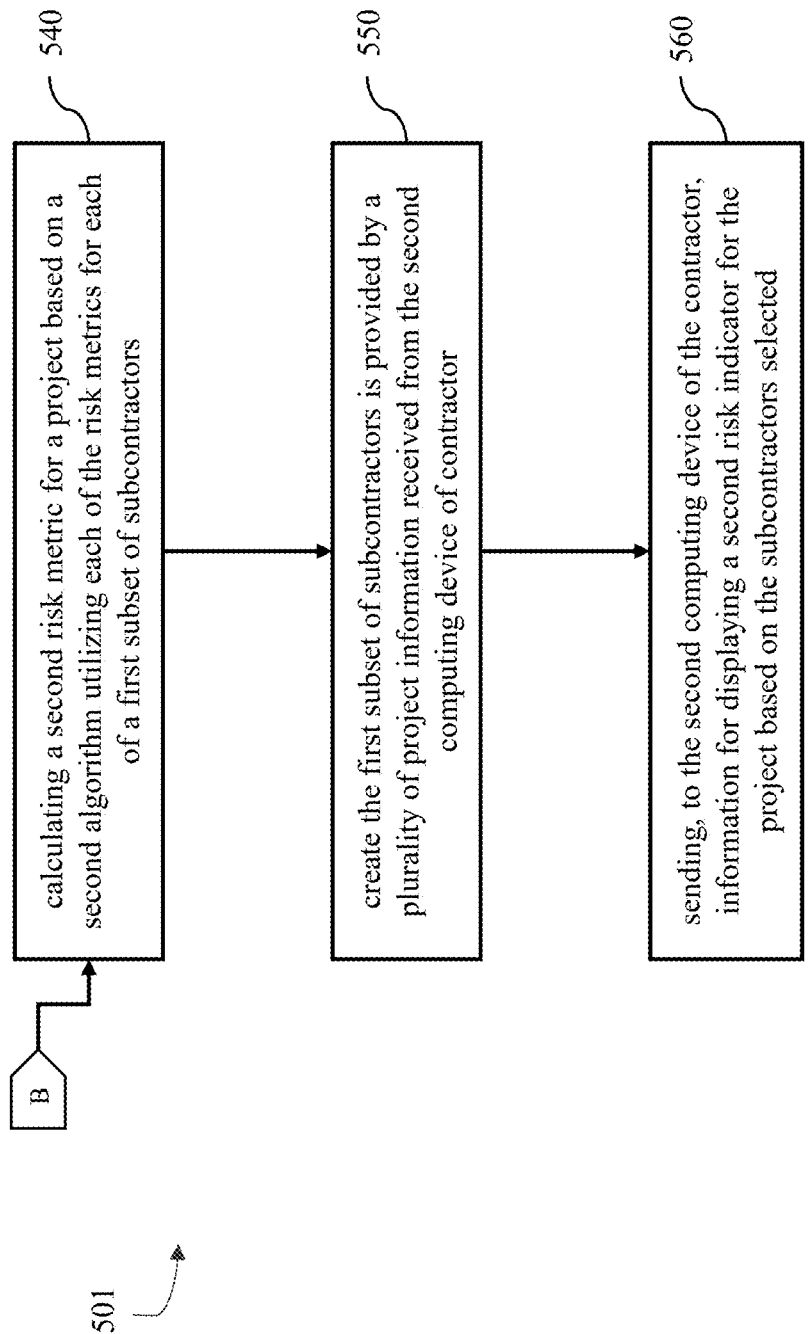
FIG. 5B is a flowchart illustrating the steps the processor will use when a general contractor selects a group of subcontractors, according to an example embodiment.

Referring now to FIG. 5B, a flowchart 501 illustrating the steps the processor will use when a general contractor selects a group of subcontractors is shown, according to an example embodiment. In step 540, the processor calculates a second risk metric for a project based on a second algorithm utilizing each of the risk metrics for each of a first subset of subcontractors. In step 550, the processor will create a first subset of subcontractors from a plurality of project information received from the second computing device of contractor. In step 560, the processor will send, to the second computing device of the contractor, information for displaying a second risk indicator for the project based on the subcontractors selected.

It is understood that the methods illustrated in FIGS. 2A through 5B are a continuous cycle and that each step of these methods may operate concurrently with another step of these methods to assign a risk of utilizing a plurality of subcontractors on a construction project. In other embodiments, the methods may further include additional steps to assign a risk of utilizing a plurality of subcontractors on a construction project consistent with the systems disclosed herein.

The server may provide graphical user interfaces to each of the first computing device, the second computing device, and the third computing device. Each of the graphical user interfaces may be configured to allow a user to interact with the interface, and/or webpage, such that the interface(s) and display(s) may include a plurality of user interface elements such as input controls, navigation components, informational components, and containers. Such user interface elements may include for example, accordions, bento menu(s), breadcrumb(s), button(s), card(s), carousel(s), check box(es), comment(s), doner menu(s), dropdown(s), feed(s), form(s), hamburger menu(s), icon(s), input field(s), kebab menu(s), loader(s), meatball menu(s), modal(s), notification(s), pagination(s), picker(s), progress bar(s), radio button(s), search field(s), sidebar(s), slide control(s), stepper(s), tag(s), tab bar(s), tool tip(s), and toggle(s). Each of these user interface elements may be used in certain embodiments to enable each of the users to interact with the system, provide data to and from the server across the communications network and implement the methods as discussed in FIGS. 2 through 5B. Other user interface elements configured to provide a display to the user to interact with the system in accordance with the methods described herein may be used and are within the spirit and scope of the disclosure. The user may interact with the graphical user interfaces using gestures to trigger certain elements on the graphical user interfaces. A gesture may include computer gestures such as a tap, via a touch sensitive interface display, a click, on or near one of the second user graphical indicators.

In an example, the entities and the devices shown in system 140 may communicate with each other over the network 162. Referring to FIGS. 1D, 2A, 2C, 2D and 2E, in a data process flow 203 of FIG. 1D, the server 154 may send a first data packet 164, to the user computing device 142 of a user 144, also referred to as the second computing device of the general contractor in FIGS. 1A and 1B. The data packet 164 has a plurality of data 165, 166, associated with a particular contracting project and the data packet 164 is a request for a list of the fields needed to qualify the subcontractor or other contractors. The data 165 and 166 may include the type of project, location of the project, type of contractor and subcontractors required. The method 200 of FIG. 2A, in step 205, includes sending to the second computing device of the contractor a request for a list of the fields needed to qualify the subcontractor. The user computing device, upon receiving the data packet may display a graphical user interface 606 on the user computing device, as shown in FIG. 6A. The graphical user interface 606 has a form for entering multiple fields required for qualifying the contractor for the construction contracting project. As shown, the graphical user interface 606 displays a page for contractor information that shows various categories of information 610. The various categories of information include personal details, professional details and other details. The user or the general contractor can enter the information in the space fields, provided on the right side 612 of the graphical user interface for each category of information. In an example, the space fields may be text input field 616, dropdown menu, and numeric input field. The graphical user interface 606 also has graphical buttons 614 to add or remove information entered in the space field. After entering information for the various categories of information the user may select one of the graphical buttons 618 provided on the bottom of the page. The user may select the save button to save all information entered by the user, submit button for submitting the information entered or may select the cancel button to cancel the information entered and refill the space fields provided on the page. It is understood that different types of forms displayed in the graphical user interface 606 having different structure and layout are also covered within the scope and spirit of the invention.

The user computing device 142 may then send a response packet 167 to the server 154 having data 168 and 169. The data 168 and 169 may include the information entered by the user for each category of information provided to the user on the graphical user interface 606. In step 210, the server receives from the user computing device or second computing device, a user response or a contractor reply to the request for the list of fields 619. The user response includes a plurality of requirements for the list. In the next step 215, information to provide a custom webpage, based on the user response, the plurality of fields for receiving the plurality of contractor input data and receiving a least one document is generated. As noted above, the document includes alphanumeric information defining a certificate of license, proof of insurance, a financial document, a certificate of competency. The server then transmits a data packet 170 for generating a custom display website is provided to the first contractor computing device 146. The packet comprises data 171 and 172 that includes graphical elements for generating a website for receiving a plurality of fields from the contractor. In an example after receiving the packet 170 a website is being displayed on a graphical user interface of the first contractor computing device 146 of the first contractor 148. In an example, the graphical user interface 608 of FIG. 6B is displayed on the first contractor computing device. The web page has multiple fields, such as name 620, address 622, and email and phone 624 where the contractor may be required to enter the contractor information 627. The web page may display multiple pages and the contractor may enter different types of information in each page. For instance as shown in FIG. 6B the first page may require the contractor to fill in personal details 626 of the contractor, and the contractor may enter the information in the text fields, such as the text fields 628 and 630 on the webpage. For example, the contractor may enter contractor information 627 into the fields that includes a name "John" as the contractor input data 621, the address information "West Palm Beach, Florida" may be the geolocation data 623 provided by the contractor, and the License certificate as uploaded and attached may be the document 625 provided by the contractor. After entering the information, the contractor may select one off save our next buttons 631 as displayed on the bottom of the graphical user interface. It is noted that the above example depicting contractor information 627, the contractor input data 621, and the document 625 is for illustrative purpose and the contractor information 627, the contractor input data 621, and the document 625 comprising additional data and information are covered within the scope and spirit of the invention.

Figure 1D:
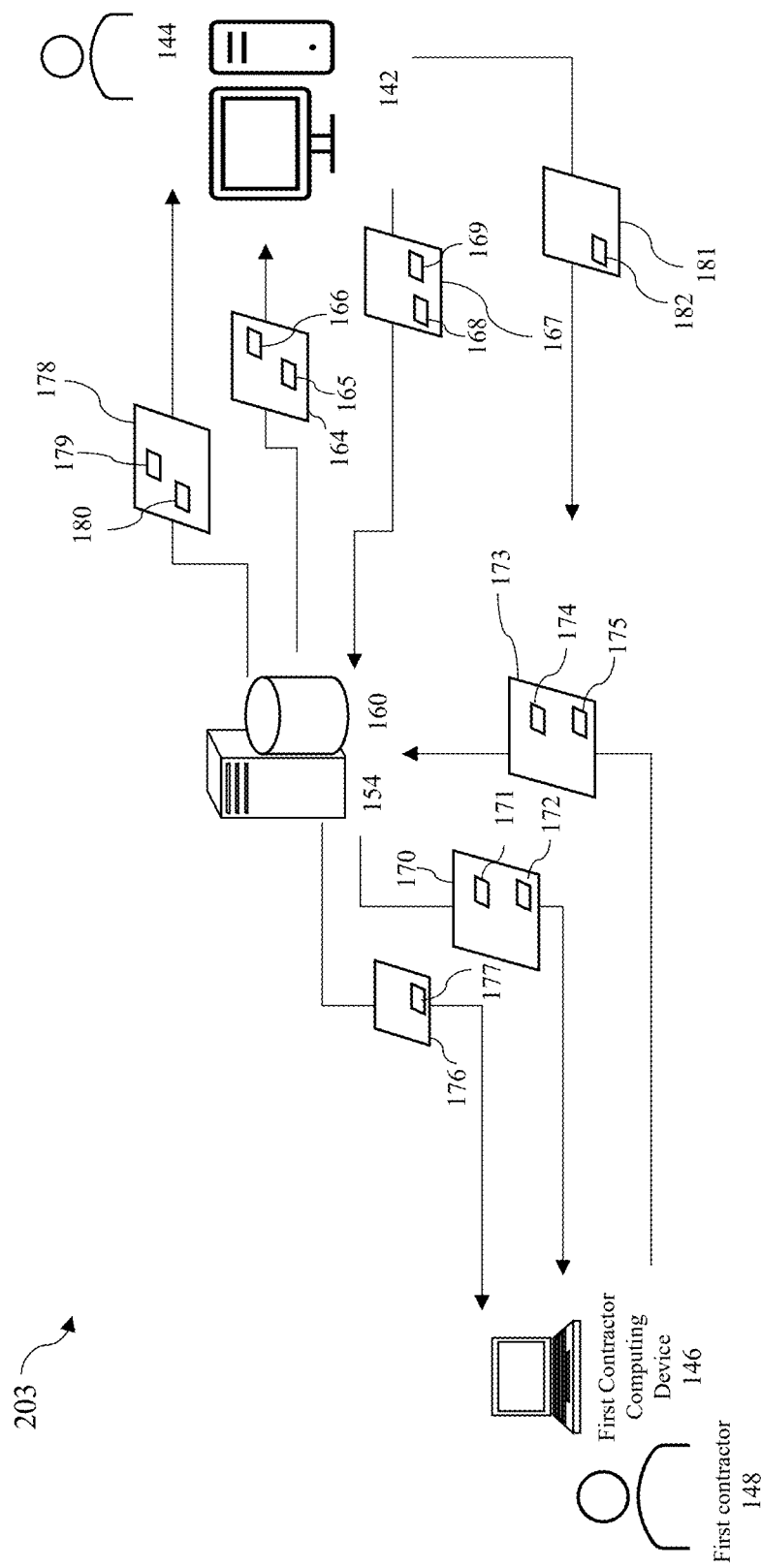
FIG. 1D is a schematic illustrating the flow of data in relation to example embodiments for optimizing trade deployment and risk mitigation in a construction contracting project by a user and a contractor, according to another example embodiment.

Referring to FIG. 1D, the first contractor computing device sends back a packet 173 having data elements 174 and 175 having subcontractor information that includes subcontractor input data and a document. The document may include a license certificate, an insurance certificate, a previous work experience document or any other document relevant to the first contractor. In step 264 of the method 262 of FIG. 2C, the method for optimizing trade deployment and risk mitigation includes receiving contractor information from a contractor computing device of the contractor, such as the first contractor computing device of the first contractor. After receiving the contractor information from the first contractor device, the server generates a contractor record for each of the plurality of contractors and stores the contractor record in the connected database. The contractor record may store the contractor information having the contractor input data and the document provided by the first contractor computing device to the server. The step 266 of the method 262 for optimizing trade deployment and risk mitigation includes creating a contractor record based on the contractor information, and in the next step 268 the contractor record is stored in the connected database. The contractor record, in one example, can be a contractor record 650 of FIG. 6D. The contractor record 650 may have various fields store different types of data for the contractor. As shown, the name of the contractor may be stored in the field 652, the location may be stored in the field 654, the specialization stored in the field 656, license in the field 658, insurance in the field 662, and overall risk in the field 664. Likewise, a contractor record is generated and stored in the connected database for each of the plurality of contractors and the database stores a plurality of contractor records. In various example embodiments, the contractor record 650 may also store the contractor risk metric 1600.

In various embodiments, the contractor input data, the document, and geolocation data, may be converted into a standardized format 653 prior to storing the contractor record in the connected database. The standardized format includes a tabular form of data where the data is organized into rows and columns. In such embodiments, each of the contractor input data, the document, and the geolocation data may be in a non-standardized format. For example, the location information provided may be inconsistent structure or style. In one input from a contractor, the location entered may be "west palm beach, Florida, US," and in another entry the location may be in form "Fl, West palm Beach, US." The system may convert these non-standardized formats to a uniform structure before standardizing the format, such as "West Palm Beach, FL, US." For converting into the uniform structure, the data may be cleaned to identify and remove address inconsistencies, errors, and missing values within the raw data. This step ensures that the data is accurate and reliable for further processing. Thereafter, the cleaned data may be converted into the uniform structure, normalizing values, and converting data types to ensure uniformity in the data. After converting the data, predefined standards or formats may be applied to the data. This includes establishing common data structures, naming conventions, and units of measurement to ensure consistency and interoperability. In another example, the system may obtain the contractor information from insurance agencies. The insurance agencies store contractor information in uniform structures to ensure consistency and accessibility of data. The contractor information encompass essential details such as contractor identities, project histories, insurance coverage, and compliance documentation. By maintaining information in the uniform structure, insurance agencies streamline data management processes, enhance data accuracy, and facilitate efficient retrieval and analysis.

In accordance with certain embodiments of the present disclosure, a comprehensive method is provided for transitioning contractor information from a non-standardized format to a standardized format, a process integral to optimizing trade deployment and risk mitigation in construction contracting projects. The non-standardized format refers to a broad range of data structures and types that contractor information might initially be presented in, including, but not limited to, unstructured text documents, image files, voice recordings, digital forms, and geographical location data in disparate formats. This diversity of formats poses a challenge for automated processing and analysis, as it requires the extraction and interpretation of relevant data from various mediums without a consistent structure.

To address this challenge, the method involves deploying advanced text and voice extraction techniques, including Optical Character Recognition (OCR) for converting textual content from images into machine-readable text, and speech-to-text algorithms for transforming spoken words from audio files into a textual format. Machine learning algorithms play a pivotal role in this process, trained on vast datasets to accurately identify, categorize, and extract pertinent information from the multitude of formats in which it may be received. For example, machine learning models can discern contractor names, contact details, license information, and proof of insurance from a heterogeneous mix of document types and data presentations. Machine learning algorithms can be employed to enhance the accuracy and efficiency of verifying contractor details against various databases. These algorithms are capable of processing large volumes of data to detect inconsistencies, validate information, and assess the reliability of the data provided by contractors.

Connected databases may also play a crucial role in this process. These are centralized or distributed databases that store vast amounts of data from various sources, such as public records, professional databases, licensing authorities, and insurance databases. When machine learning algorithms are applied to the data within these connected databases, the system can automate the process of cross-referencing contractor information with the data stored in these databases to validate credentials, work history, licenses, and insurance details.

Neural networks, a type of machine learning algorithm inspired by the human brain's structure and function, are particularly adept at recognizing complex patterns and making intelligent decisions based on the data. In the authentication and validation step, neural networks can analyze the contractor information, compare it with historical data patterns stored in connected databases, and identify anomalies or validate the information with high precision. For example, a neural network might be used to compare the contractor's provided insurance details with records in an insurance database, verifying the validity and currency of the contractor's insurance coverage.

By leveraging machine learning and neural networks in conjunction with connected databases, the system can significantly streamline the authentication and validation process. This not only reduces the time and resources required for manual checks but also minimizes the risk of human error, ensuring a more reliable and comprehensive assessment of contractor reliability and risk. This integration of advanced technologies provides a solid foundation for making informed decisions in the management of construction projects, enhancing both efficiency and project outcomes.

The transition to a standardized format is characterized by the conversion of this wide array of extracted data into a predefined structure, facilitating uniformity and compatibility with the connected database systems. The standardized format is defined by a specific schema that includes fields for contractor name, contact information, financial data, administrative details, license and insurance verifications, and geolocation data, among others. This structure enables efficient storage, retrieval, and analysis of contractor information, laying the foundation for calculating risk metrics and facilitating project management decisions. The adoption of such a standardized format ensures that data, regardless of its original form, is transformed into a consistent, structured, and analyzable format, thereby streamlining the overall process of contractor evaluation and selection for construction contracting projects.

Figure 5C:
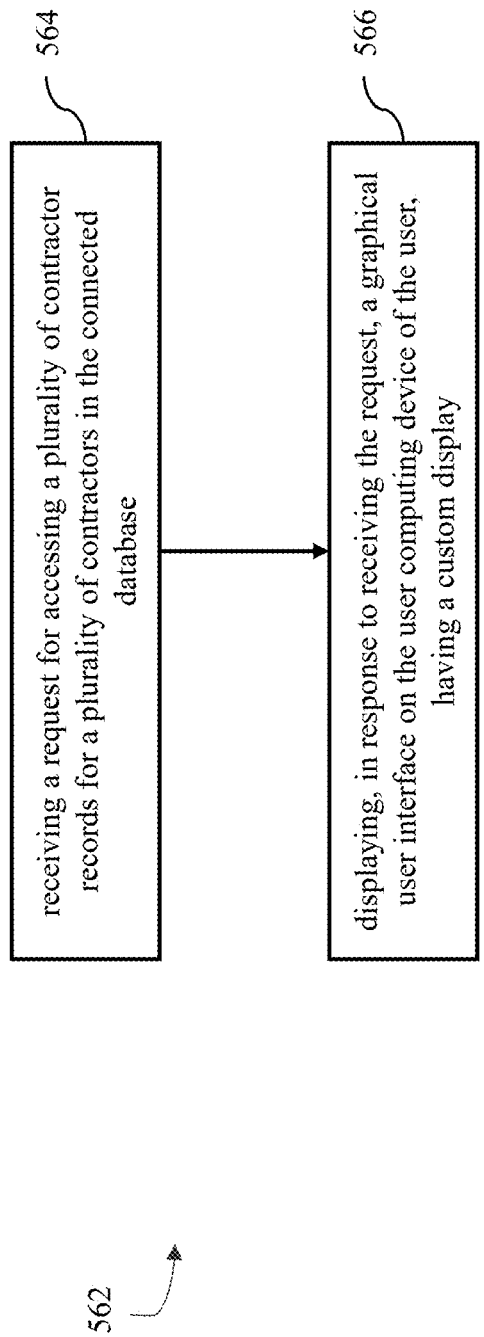
FIG. 5C is a block flow diagram of an example embodiment for displaying a custom display in response to a request to access contractor records for a construction project, according to another example embodiment.

In an embodiment, once the plurality of contractor records are stored in the connected database, the user or the general contractor may intend to access the plurality of contractor records or a subset of the contractor records. FIG. 5C is a method 562 for requesting access to the plurality of contractor records by the user computing device of the user. In the step 564, a request for accessing the plurality of contractor records is received by the server for the plurality of contractors in the connected database in the step 564. The request may include the identification numbers or names of customer records, and other details of the customer records. The server may parse the request and determine the contractor records and details of the records that is requested by the user computing device. In the next step 566, a graphical user interface on the user computing device of the user, having a custom display is displayed on the user computing device.

Figure 2C:
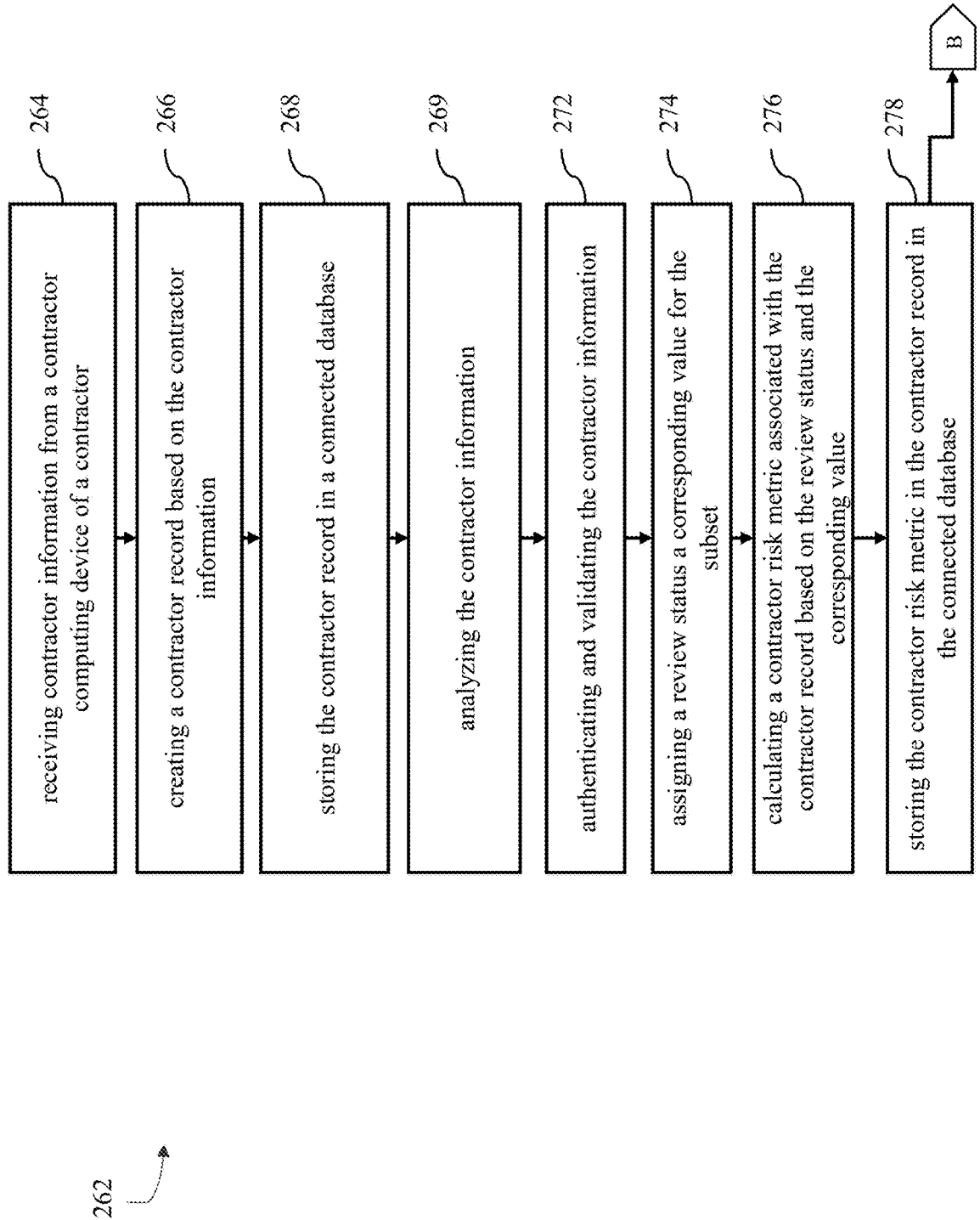
FIG. 2C, FIG. 2D, and FIG. 2E are block flow diagrams of example embodiments for optimizing trade deployment and risk mitigation in a construction contracting project based on a risk of utilizing a plurality of contractors on the construction contracting project, according to another example embodiment.
Figure 3A:
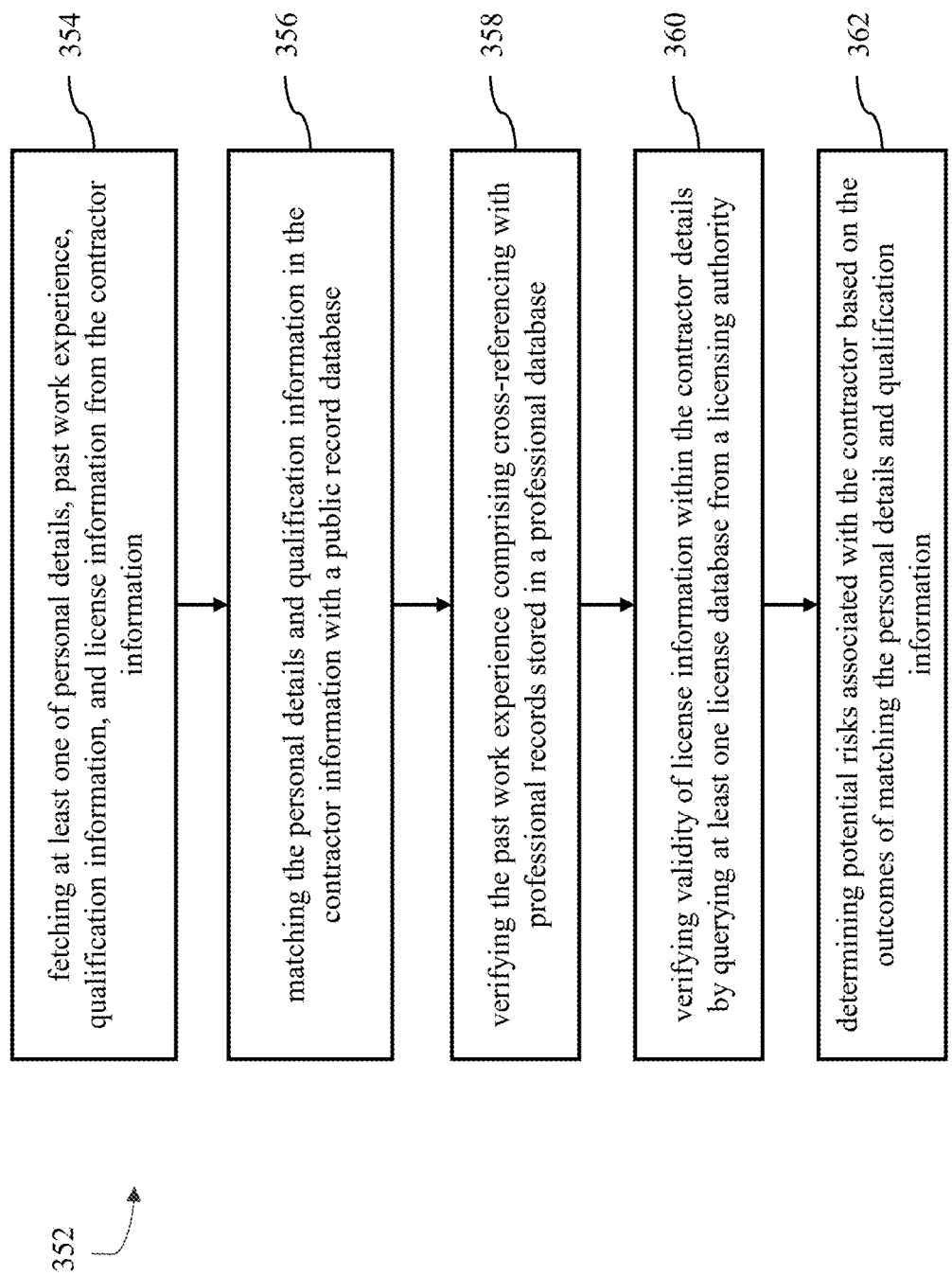
FIG. 3A is a block flow diagram of an example embodiment for determining potential risk associated with a contractor for a construction project, according to another example embodiment.

Referring to FIG. 2C, in the next step 269, the method for optimizing trade deployment and risk mitigation includes analyzing the contractor information, and authenticating and validating the contractor information in the step 272. As would be understood, authenticating and validating is important for various reasons, including data security, data integrity and prevention of data loss. Authenticating and validating profile information helps ensure that the data being received is from legitimate sources and has not been tampered with or spoofed. Without proper authentication and validation, malicious actors could impersonate users or inject fraudulent data into the network, compromising its integrity and security. Validating the contractor information helps maintain the accuracy and integrity of the data within the network. By confirming that the data meets certain criteria or follows predefined formats, organizations can prevent errors and inconsistencies that may arise from incorrect information. By authenticating and validating profile information, organizations can demonstrate compliance with relevant regulations and standards, thereby avoiding potential legal and financial consequences associated with data breaches or non-compliance. The process of authenticating and validating the contractor information is provided in detail in the method 352 of FIG. 3A.

The authentication and validation step within the disclosed methodology is a pivotal process that significantly enhances the reliability and accuracy of contractor information, thereby improving risk assessments and decision-making in construction project management. This step involves a multi-faceted approach to verify the authenticity and accuracy of the information provided by contractors, utilizing advanced machine learning algorithms and data processing techniques.

Firstly, authentication refers to the process of confirming the identity of the contractors and ensuring that the information submitted originates from legitimate sources. This can involve cross-referencing contractor-submitted data, such as names, contact details, and license numbers, with authoritative databases or digital records to confirm their validity. The objective is to establish a trustworthiness baseline for the information before it undergoes further analysis.

Validation, on the other hand, dives deeper into the qualitative assessment of the contractor information. It entails a thorough examination of the content of the data provided by contractors, such as past work experience, qualifications, license information, and proof of insurance. This step involves comparing and cross-referencing the provided information against public records, professional databases, and licensing authorities' databases to verify its accuracy and relevance. Machine learning algorithms play a crucial role in this process, as they are trained to detect discrepancies, inconsistencies, or red flags in the data that may indicate potential risks associated with a contractor's reliability or suitability for a project.

For instance, the validation process can include checking the validity of a contractor's professional licenses against a licensing authority's database or verifying the contractor's claimed work history and qualifications by matching them with professional records stored in industry databases. This comprehensive scrutiny helps in identifying any potential risks early on, such as the risk of engaging contractors with invalid licenses, insufficient qualifications, or a history of unreliable performance.

The contractor information comprises contractor input data and one or more documents related to the contractor. The contractor input data may include the personal details of the contractor, past work experience, qualification information and license information. Each of this information is verified to authenticate and validate the contractor information provided by the contractor. In step 354, the personal details, past work experience, qualification information, and license information are fetched from the contractor information. In the next step 356, the personal details and qualification information in the contractor information is matched with a public record database that stores personal details of contractors in the first predetermined geolocation. A "predetermined geographical location" refers to a specific area or region that has been identified or selected in advance for a particular purpose or analysis. In the context of project management, construction, or data analysis, this term often denotes a geographic boundary or set of coordinates that has been chosen based on certain criteria or requirements relevant to the project or study.

The selection of a predetermined geographical location could be influenced by factors such as the scope of a construction project, the target market for a study, logistical considerations, or the need to analyze data within a specific area for risk assessment, resource allocation, or planning purposes. This location could range from a broad area, such as a city or region, to a more precise locale, like a construction site or a specific neighborhood.

In the use of data analytics and mapping in construction project management, for instance, a predetermined geographical location could be crucial for evaluating contractor distribution, assessing risks, and making strategic decisions. By focusing on a defined area, project managers can effectively concentrate their efforts and resources where they are most needed, based on the analysis of data (such as contractor availability, risk metrics, etc.) specific to that location.

Examples of such public record database may include, online contractor directories that list contractors and construction-related service providers, federal contractor databases that stores information regarding larger construction projects involving federal funding, and business registration databases maintained by government agencies including information about registered businesses and contractors involved in construction. Further, the public records databases may include contractor licensing databases maintained by states or local jurisdictions that include information such as license status, disciplinary actions, and any complaints filed against the contractors. In the next step 358, the past work experience of the contractor is verified by cross-referencing with professional records stored in a professional database for the contractors in the predetermined geolocation. The professional record databases can be centralized repositories of important information related to contractors, subcontractors, and various aspects of construction projects. Some examples may include Procore©, and other similar construction management databases. In the next step, 360, validity of the license information may be verified within the contractor information by querying at least one license database from a licensing authority. The licensing database may include, but not limited to, public online database maintained by Contractor State License Board (CSLB), or public database of National Association of State Contractors Licensing Agencies (NASCLA). After verifying the validity of the license information, validation outcomes of matching the personal details and qualification information, verifying the past work experience, and verifying validity of license information is received. In one example, the examination of contract details, including the authentication and validation of information, may be delegated to a third-party agency to conduct a thorough check and ensure a robust system of checks and balances. In the example, the validation outcomes of matching the personal details and qualification information, verifying the past work experience, and verifying validity of license information may be received from the third-party agency. In the next step 362, potential risks associated with the contractor is determined based on the validation outcomes of matching the personal details and qualification information. The potential risks may be determined based on analyzing the discrepancies, if any, between the contractor's data and the information in the databases. Instances, such as expired licenses, invalid insurance, legal disputes, or regulatory violations insufficient qualification or work experience may be considered for determining the potential risks.

In certain embodiments, authenticating and validating the contractor information involves leveraging data obtained from insurance agencies, insurance providers, bonding capacities, W9 forms, and verification through state entities and email addresses. Insurance agencies furnish crucial data regarding contractor coverage and compliance, while direct communication with insurance providers offers real-time validation of policy status and coverage details. Bonding capacities provide insight into a contractor's financial stability and ability to undertake projects of varying scales. W9 forms authenticate contractor identities and tax information, ensuring regulatory compliance. Verifying with state entities, as noted above, confirms licensing and legal standing, while validating email addresses establishes direct communication channels. This comprehensive validation process integrates multiple sources of information to establish the credibility and reliability of contractor profiles, enhancing trust and mitigating risks in project engagements. In an example embodiment, when insurance agencies or third parties are involved, then the authenticating and validating contractor information may be performed through API connections that involves establishing secure communication channels between systems to verify the accuracy and legitimacy of contractor data. By leveraging APIs, authentication protocols such as OAuth or API keys are implemented to ensure authorized access to the information. Through these connections, data validation processes verify the integrity and completeness of contractor details against predefined criteria and databases. This real-time validation enables insurance agencies and other stakeholders to confirm contractor identities, certifications, licenses, insurance coverage, and compliance status swiftly and accurately. API-based authentication and validation enhance data reliability, minimize errors, and support informed decision-making processes within the insurance industry and beyond.

Figure 6:
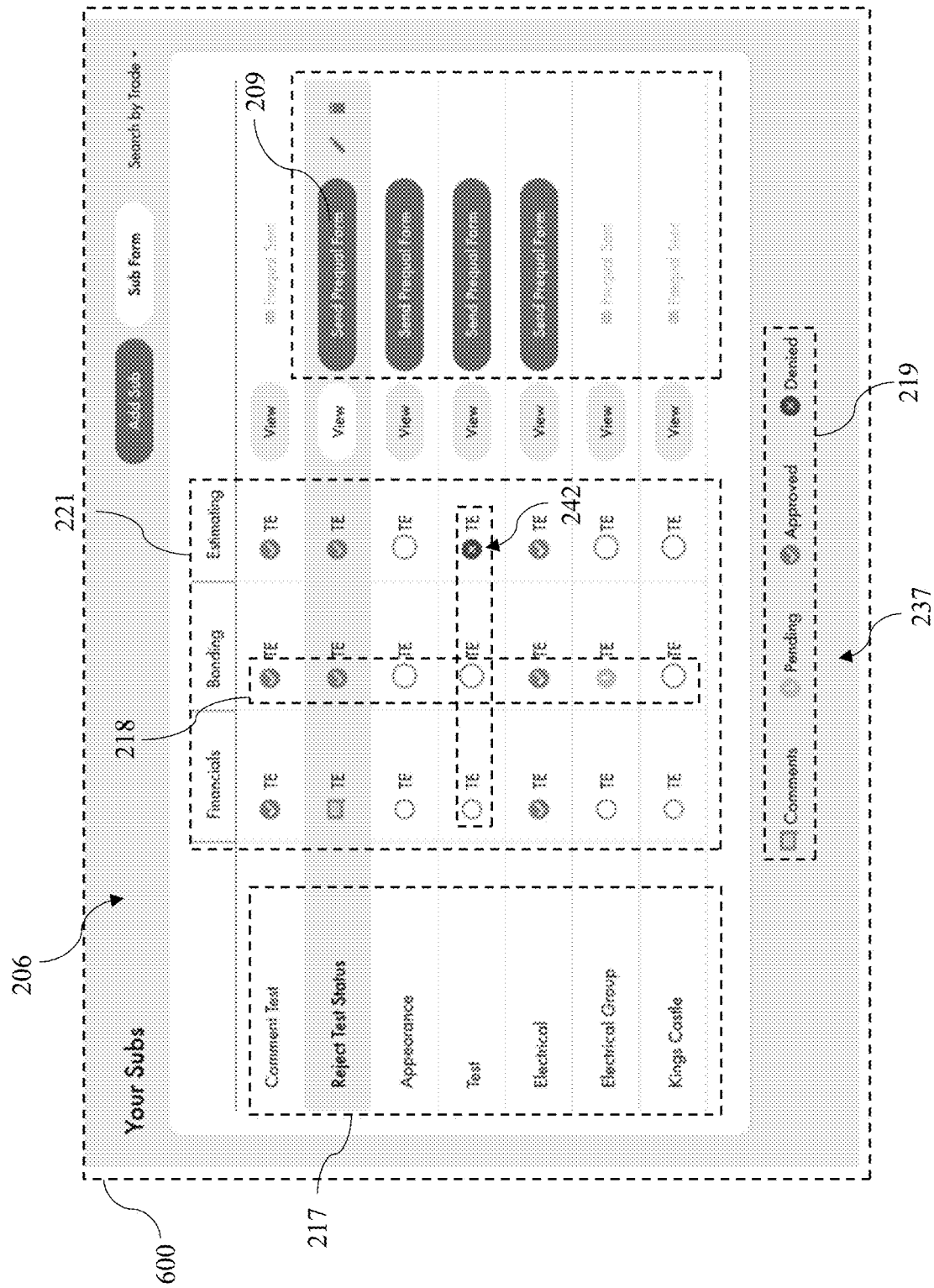
FIG. 6 is an example embodiment of a webpage having a plurality of fields for receiving a plurality of subcontractor input data and receiving at least one document, according to an example embodiment.
Figure 12:
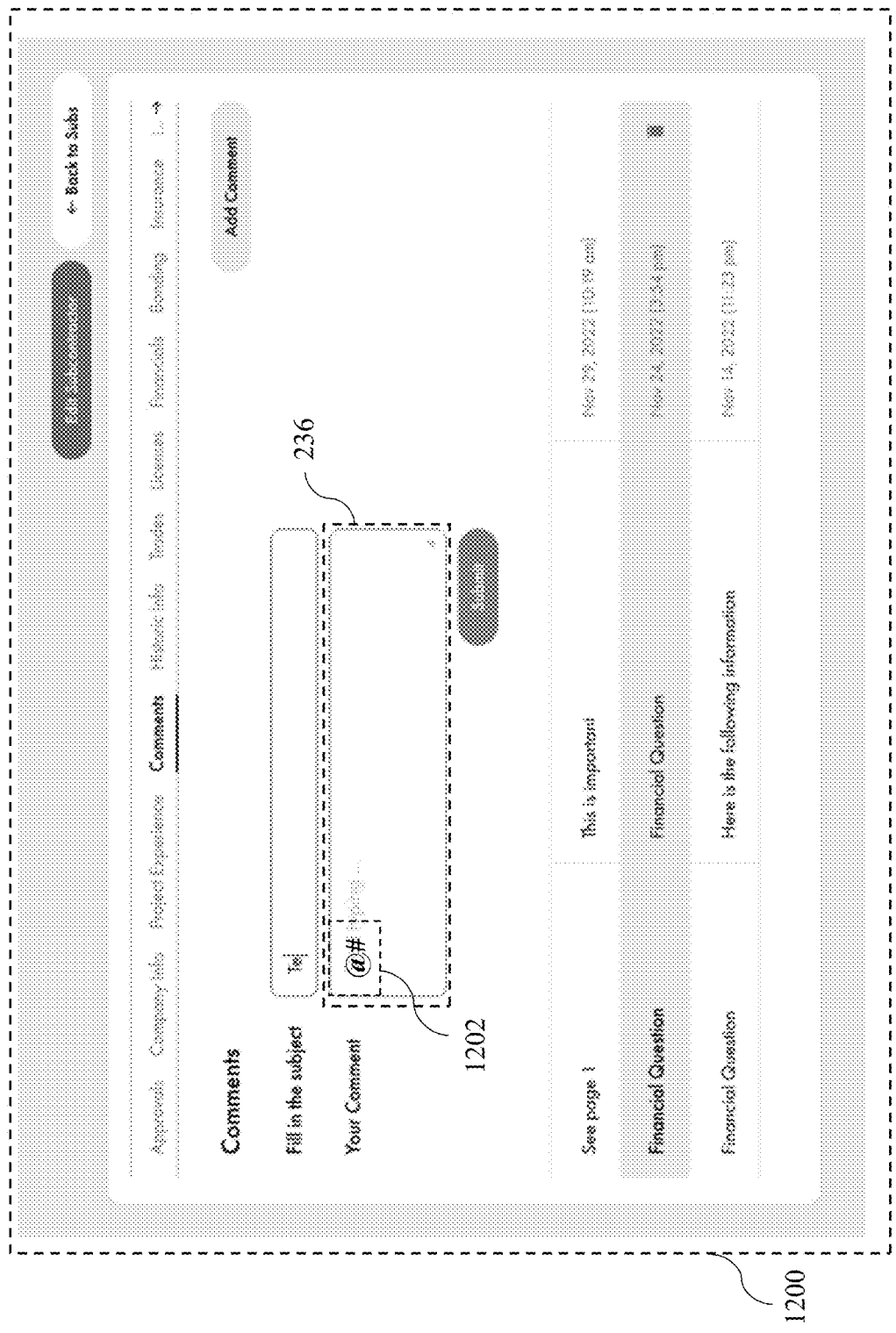
FIG. 12 depicts an example user interface displaying a comment field, according to an example embodiment.

In FIG. 2C, a review status for the contractor record is assigned a corresponding value for a subset of the contractor information in step 274 of the method for optimizing trade deployment and risk mitigation. In an example, the value of the review status comprises a graphical representation that the review status 219 is one of denied, approved, or commented. FIG. 6 illustrates a user interface 600 of a webpage 206 configured to be displayed on a second computing device of the general contractor or a user computing device of the user with the values 218 assigned to review status 219, described in detail with reference to explanation of FIG. 6 in subsequent paragraphs. In an example, when the value of review status is commented on status, then a plurality of alphanumeric content 1202 is included into a contractor comment field 236 for providing additional comments regarding the subcontractor information that has been reviewed by the contractor, as shown in FIG. 12. In an example, the server 154 may send an update packet 176 to the first contractor computing device to notify the value of the review status for the contractor record associated with the contractor, such as the first contractor. The update packet 176 may include a data element 177 that stores whether the review status is one of denied, approved, or commented.

In the next step 276, the method includes calculating a contractor risk metric associated with the contractor record based on the review status and the corresponding value. The contractor risk metric is a measurement of a potential impact of the contractor on the construction contracting project. In an example, for calculating the risk metric for the contractor, factors, such as past performance reviews, compliance history, regulatory violations, financial stability, litigation history, safety incidents, license information and insurance coverage may be analyzed to gauge the level of risk associated with the contractor. The server 154 may perform the analysis or delegated to the third-party agency. Thereafter, weights or scores are assigned to different risk factors based on their relative importance and impact on overall risk assessment of the contracting project. Factors that pose higher risks to project success or may result in significant liabilities or disruptions if not adequately addressed may be considered. A predetermined algorithm or mathematical model may be used to calculate the contractor risk metric based on the weighted risk factors and the potential risks. The weights or scores of individual risk factors may be aggregated to derive an overall risk rating that reflects the level of risk associated with the contractor. Algorithms, such as machine learning algorithms, weighted scoring models, Bayesian network models or Monte Carlo simulation may be used for calculating the risk metric for the contractor. These algorithms provide frameworks for quantifying and assessing contractor risk metrics based on diverse sets of criteria and data sources.

Figure 16:
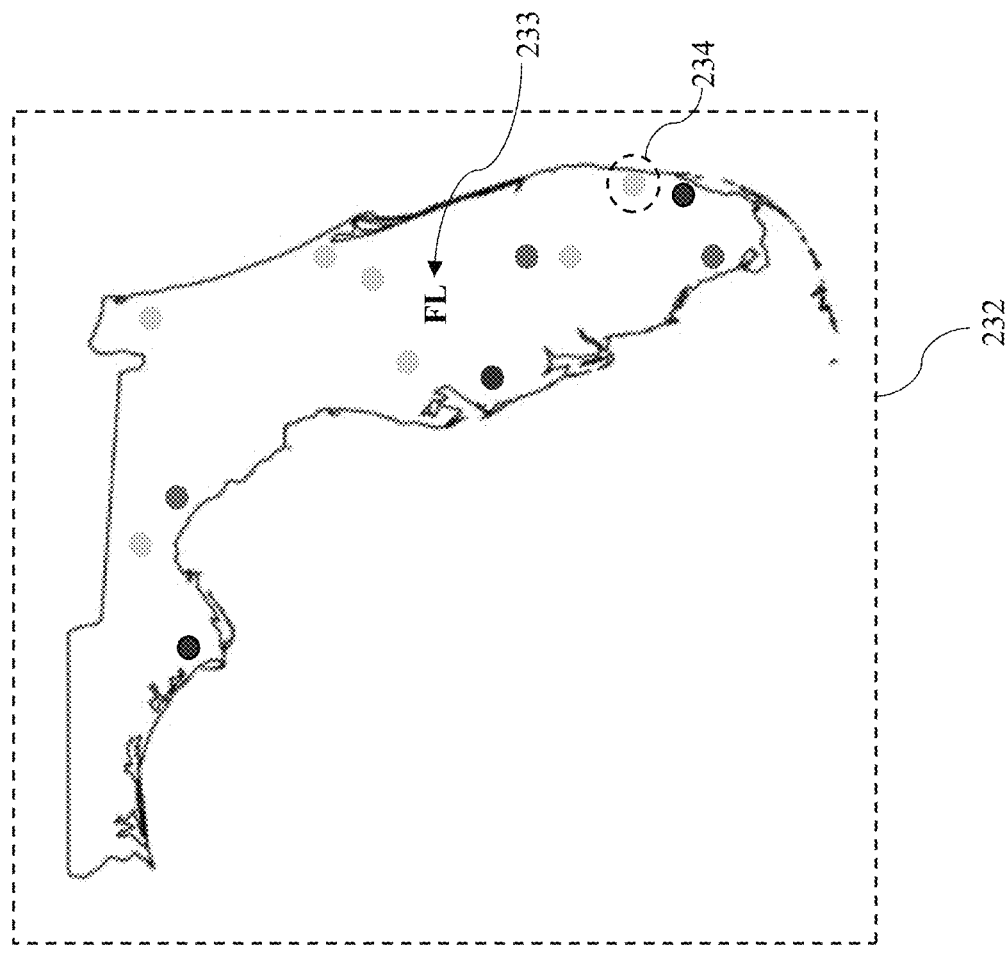
FIG. 16 illustrates an example map for sorting subtractors based on risk factor and geographic location, according to an example embodiment.
Figure 16:
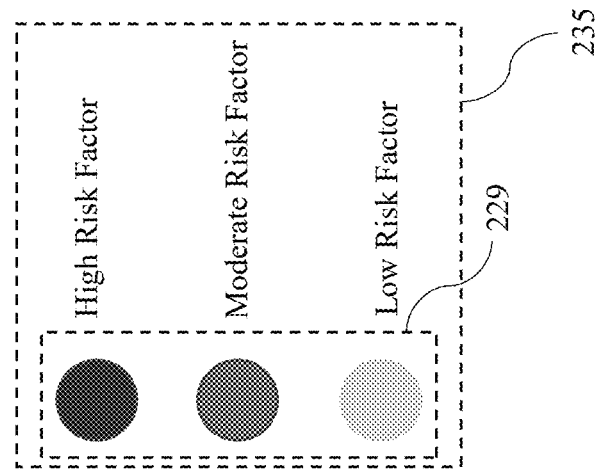
Figure 16A:
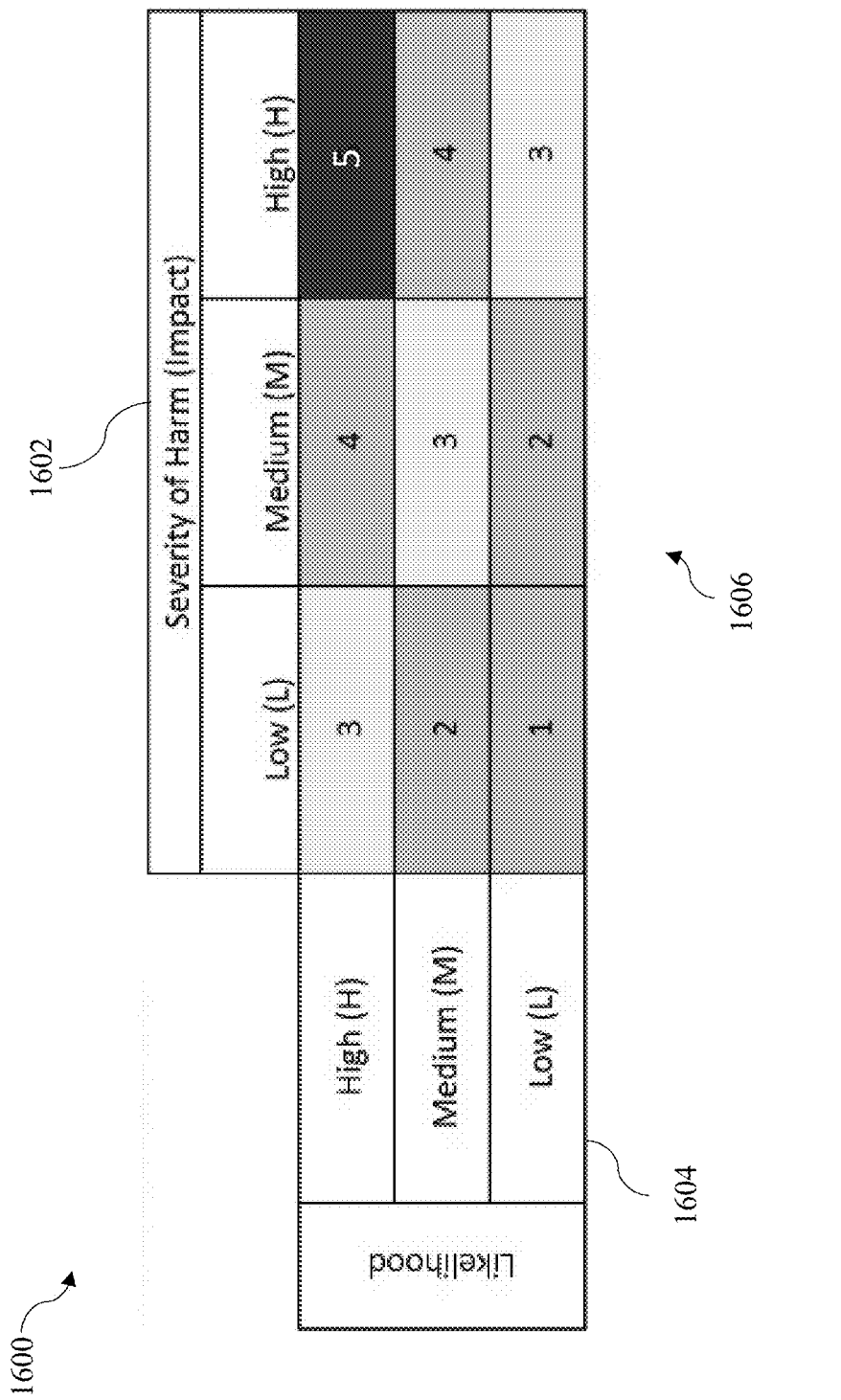
FIGS. 16A and 16B illustrate risk metric for a contractor and a project, in accordance with another example embodiment.

The contractor risk metric is illustrated in a matrix format in FIG. 16A. The project risk metric is calculated based on the potential risks and value of the review status for the contractors. As shown, the contractor risk metric 1600 has columns 1602 that show the severity of harm or impact of the contractor and the rows 1604 that shows the probability of the impact. The columns show the potential consequences or severity of harm resulting from the contractor's actions or performance. The rows assess the likelihood or probability of each identified impact occurring as a result of contractor-related risks. Probability levels may range from low to high, indicating the likelihood of occurrence based on data related to the contractor. The cells 1606 within the matrix represent the combined assessment of both severity and probability for specific risk scenarios. Each cell provides an evaluation of the potential risk associated with a particular combination of harm or impact and its likelihood of occurrence and may have numerical scores, or qualitative ratings, to reflect the overall risk level. In the next step 278, the contractor risk metric is stored in the contractor record in the connected database.

Figure 2D:
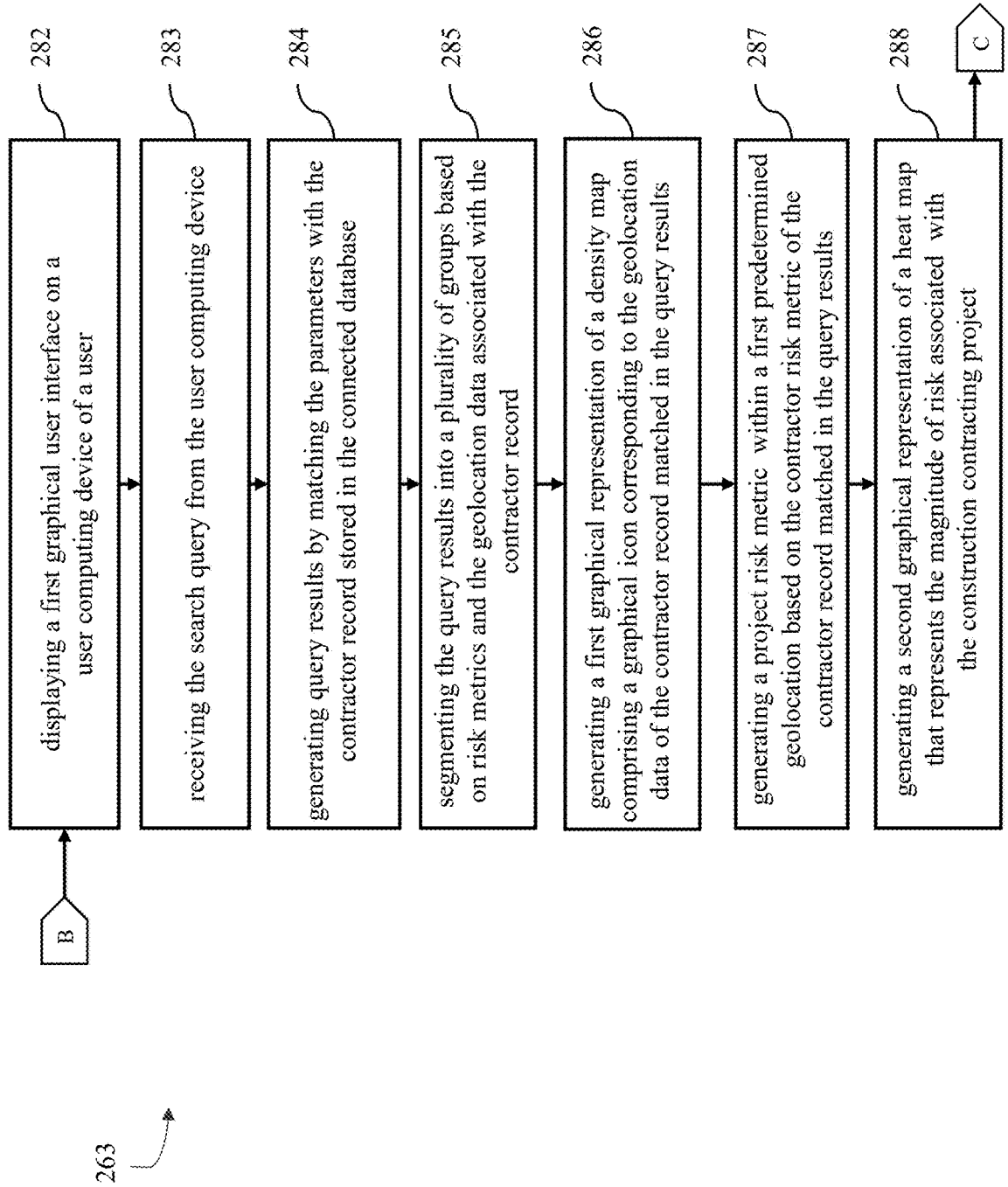
Figure 6C:
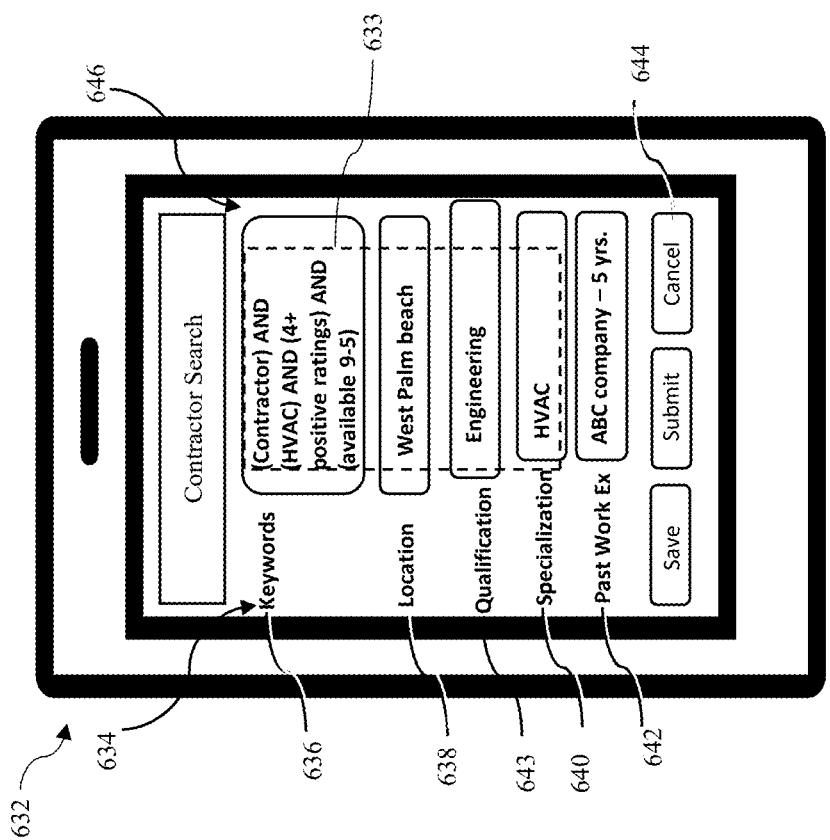
Figure 6D:
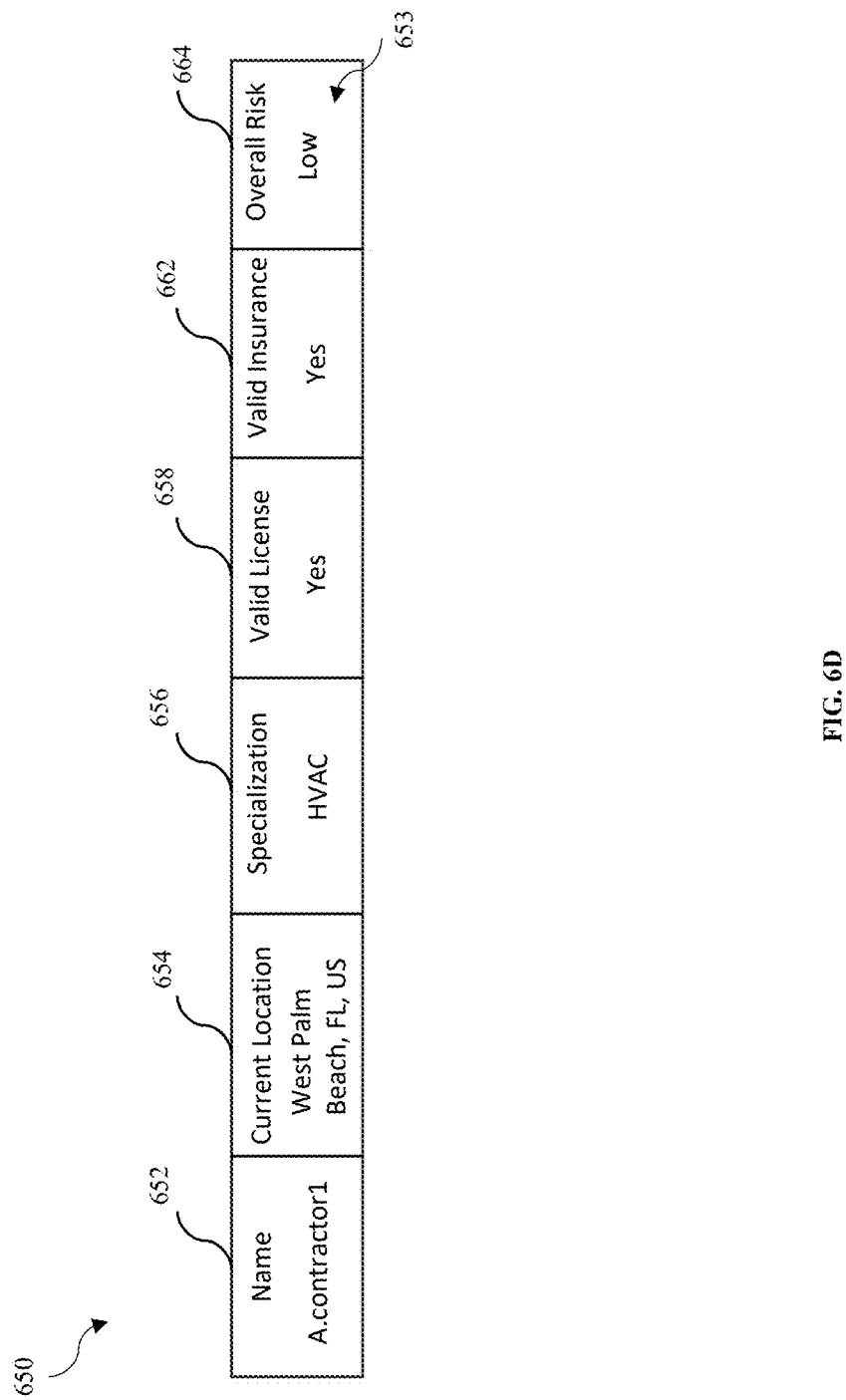
FIG. 6D illustrates an example contractor record stored in a connected database, in accordance with another example embodiment.

Referring now to method 263 of FIG. 2D, after storing the contractor risk metric in the contractor record, a first graphical user interface is displayed on a user computing device of the user, in the step 282. The first graphical user interface 632 is displayed on the user computing device as shown in FIG. 6C. In an example, the server 154 sends a data pack packet 178 to the user computing device 142 shown in FIG. 1D. The data packet 178 comprises data elements 179 and 180. The data element 179 includes the multiple fields to be displayed on the first graphical user interface 632 and the data element 180 includes information regarding the structure and layout of the fields in displayed on the first graphical user interface 632.

The method includes, in the step 283, receiving the search query from the user computing device. In an example, the first graphical interface 632 is a search page that allows the user or the general contractor to enter a search query 633 and search for other contractors or subcontractors in the predetermined geolocation. The search page includes multiple fields 634 such as keywords 636, location 638, specialization 640, and past work experience 642, qualification information 643 in which the user can enter parameters for the search query. The graphical user interface also comprises text fields 646 where the user enters the text information for the search query and the buttons 644, such as "save", "submit" and "cancel" buttons that are graphical icons displayed on the graphical user interface.

After the user enters the search query 633 and submits the search query, query results are generated by matching the parameters with the contractor record stored in the connected database, as depicted in method step 284. FIG. 6E illustrates the relevant query results 660 displayed on the first graphical user interface of the user computing device. FIG. 6E shows the query results 660 in a tabular form having contractors names in column 666, location displayed in column 668, specialization in column 670, license information in column 672, insurance information in column 674, and overall risk in column 676. In the next step 285 of FIG. 2D, the query results are segmented into a plurality of groups based on risk metrics and the geolocation data associated with the contractor record. In the context of the present disclosure, geolocation data, integral for assessing and optimizing contractor deployment and risk management, may be sourced or derived from a myriad of inputs, encompassing both actively provided information and passive data collection methods. Such data may originate from contractor-submitted documents, including but not limited to, insurance documents that specify the geographic scope of coverage or identification documents indicating the contractor's primary place of business. Furthermore, geolocation data can be actively inputted by contractors through digital forms or automatically derived from technological means such as the IP address of the contractor's computing device, or location services enabled on said device, which might include GPS data or Wi-Fi network locations. In one example, the geolocation data may be one of an IP address, GPS geolocation data received from the user computing device. In another example, the geolocation data may be obtained based on location information entered by the contractor or the subcontractor. In another example, the geolocation data may be obtained by parsing text of the document or information provided by the subcontractor or the first contractor during entering the contractor information on the website displayed on the contractor computing device. FIG. 6F illustrates segmented query results that are grouped into three groups 678, 680, 682. The groups created based on same location of the contractors having same overall risk, as shown in the figure.

Figure 6G:
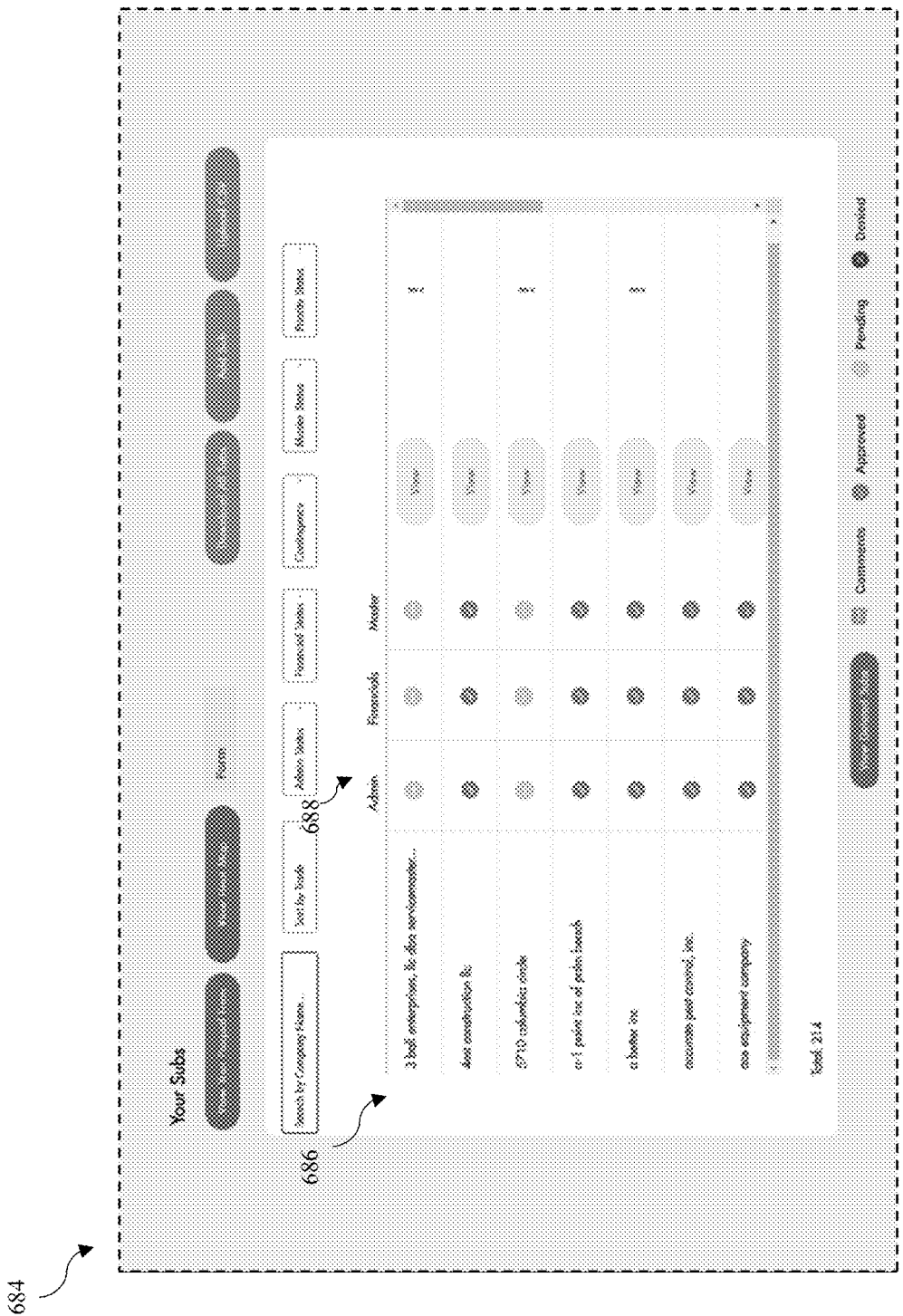
FIG. 6G is an example graphical user interface for displaying construction companies in a geographic location, in accordance with another example embodiment.

Thereafter, in step 286 of FIG. 2D, a first graphical representation 1640 of a density map 1642 is generated comprising a graphical icon corresponding to the geolocation data of the contractor record matched in the query results. In another example, a heat map may also be generated comprising a graphical icon corresponding to the geolocation data of the contractor record matched in the query results. The heat map, as would be understood, use color gradients to represent the density of data points within a geographic area. The heat maps typically assign warmer colors to areas with a higher concentration of data points and cooler colors to areas with less data. Density maps show the overall density or clustering of points rather than intensity points and use contour lines or shading to represent areas of high or low data density. In the example embodiment, graphical icons representing the subcontractors that are distributed across a geographic location are automatically displayed with different shades. FIG. 6G is an example graphical user interface for displaying construction companies in a geographic location. The graphical user interface 684 has plurality of contracting companies listed on left side column 686 of the graphical user interface 684, and other additional details 688 shown in other columns of the graphical user interface 684.

Figure 16B:
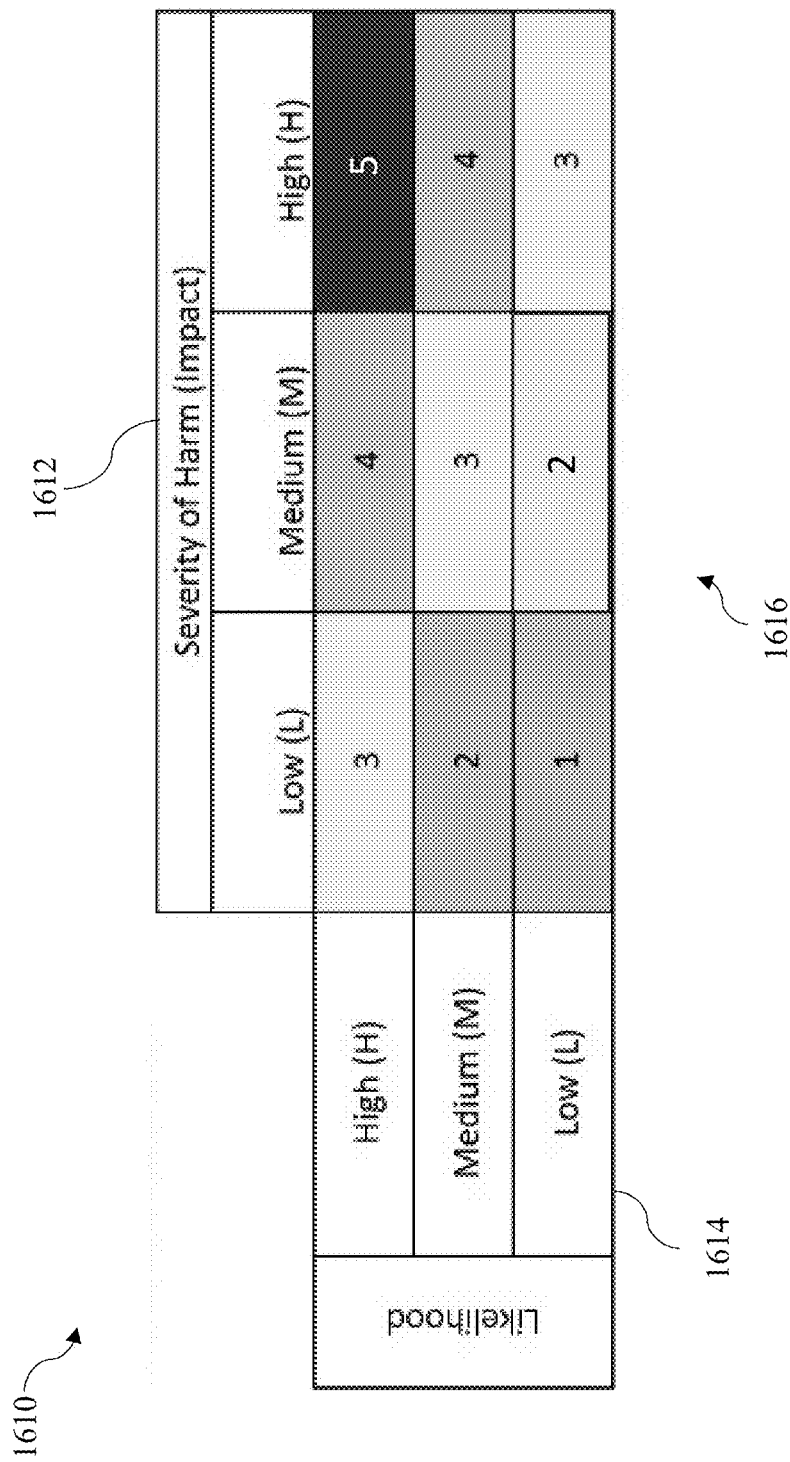
Figure 16C:
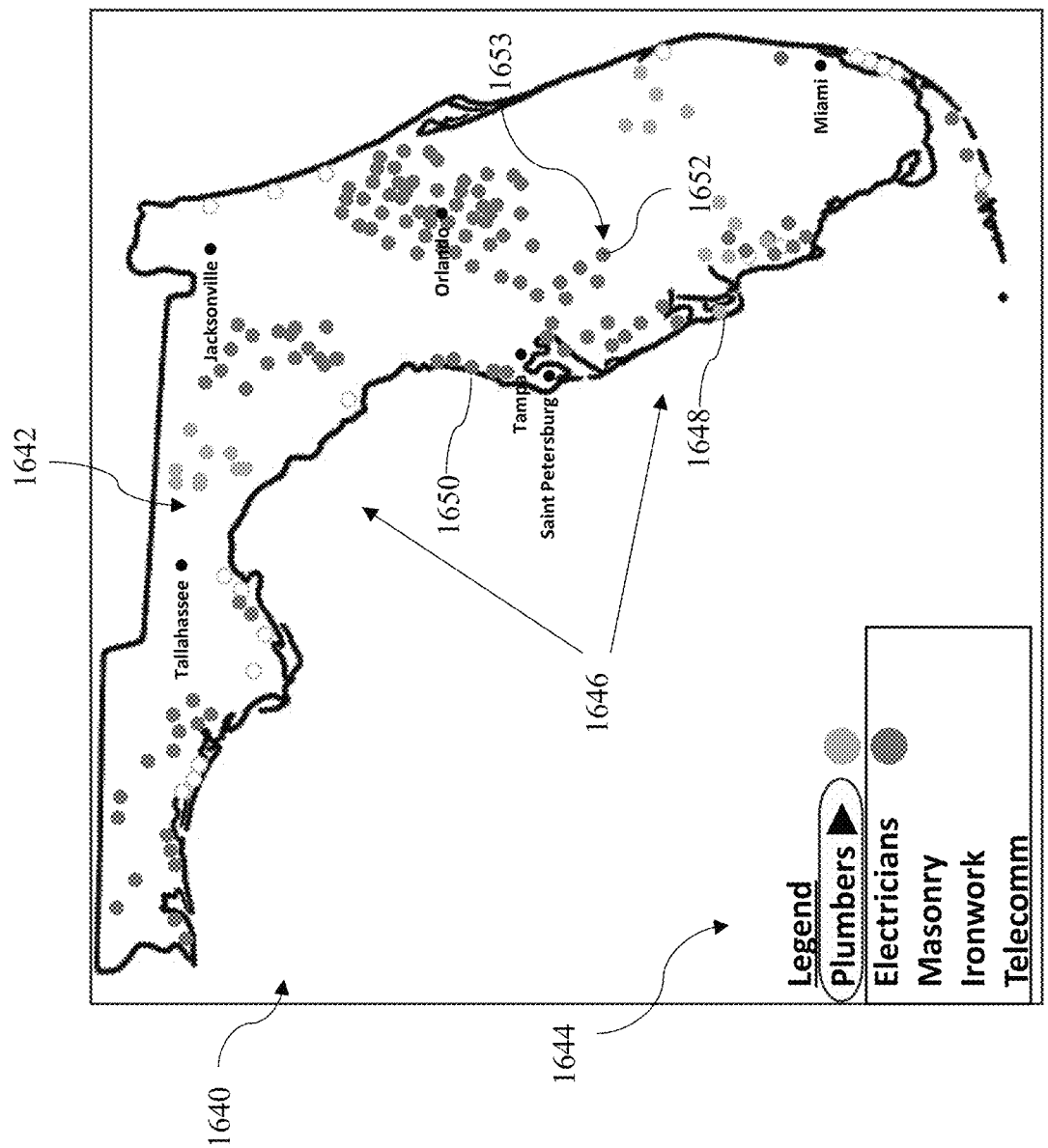
FIGS. 16C, 16D, and 16E illustrate graphical representations of a map, in accordance with another example embodiment.

In an embodiment, each shade represents a particular type of subcontractor available in that geographic location. The first graphical representation 1640 is illustrated in FIG. 16C that illustrates the density map 1642 of geographic location for example the state of Florida in the figure. The first graphical representation also shows the legend 1644 showing different types of subcontractors and corresponding shades of the graphical icons that are distributed on the map. As shown in the figure, the subcontractors are displayed as graphical icons that are distributed across the map of the geographic location. The distribution 1646 of the subcontractors has different density in different parts of the map. The graphical icon 1648 illustrates plumbers available in the area and the graphical icon 1650 represent the electricians distributed in the map. As can be seen in the figure, there is a high density of distribution of subcontractors in the areas of Saint Petersburg and Tampa and the density of electricians are higher along the border line of Tampa.

Figure 16D:
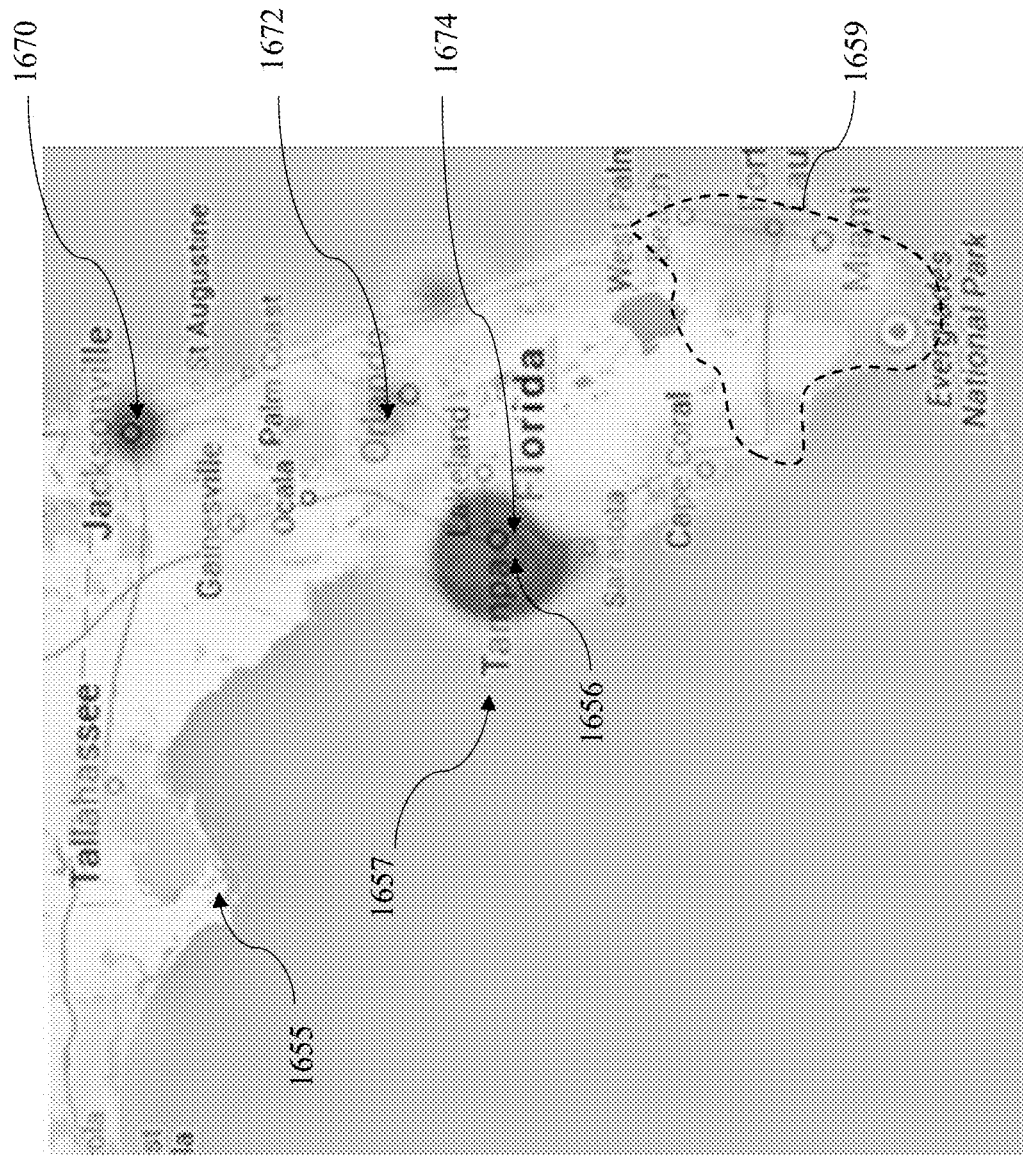

In step 287 of FIG. 2D, a project risk metric is generated within a first predetermined geolocation based on the contractor risk metric of the contractor record matched in the query results. In an example, the first predetermined geolocation 1655 is a state for example, the state of Florida, and a second predetermined geolocation 1657 may be a city, such as Tampa, and a third predetermined geolocation 1659 may be a predetermined location, within a border or a defined area, as shown in FIG. 16D. The first, second and third predetermined geolocation may be determined based on the contractor input data furnished by the contractor at the time of submitting their contractor information on the website or the search location provided by the user for entering the search query. Alternatively, these geolocations may correspond to the site of the construction contracting project for which the contractors are being searched parsed from documents associated with the project. The project risk metric is illustrated in FIG. 16B. The project risk metric 1610 is calculated based on the risk metrics of plurality of contractors in the predetermined geolocation. As shown, the project risk metric 1610 is shown in FIG. 16B. The columns 1612 show the severity of harm or impact on the project and the rows 1614 show the likelihood of the impact. The cells 1616 show the combined assessment of both severity and probability for specific risk scenarios for the project. In an alternative embodiment, the second graphical representation can also be displayed has the map 1654 FIG. 16D. In the alternative embodiment, namely the heat map, the graphical icons representing the subcontractors distributed across the predetermined geolocation is replaced with a hotspot representation 1656, or concentration area, or intensity zone, depicting the availability of particular subcontractors in that location. The shade of the hotspot representation may represent the type of subcontractors available in that location and/or the corresponding risk metric. For example, a hotspot that is red in color may correspond to a low density of a particular contractor and/or a high risk area. Similarly, a hotspot that is green in color may correspond to a high density of a particular contractor and/or a low risk area. The color may be depicted in a gradient with a corresponding legend. The user may select the type of representation of the map the user intends to be displayed on the second graphical representation. Moreover, the size of the hotspot represents the level of risk associated with that particular location. The size of the hotspot visually represents the availability of contractors in that area and associated risk. In this context, a larger sized blob 1674 indicates a high availability of contractors, signifying a low-risk scenario for project initiation or completion, as the ample supply of professionals suggests reliability and timely project delivery. Conversely, a medium sized hotspot 1670 reflects a moderate level of contractor availability, indicating a medium risk indicating that contractors are available, but their number may not fully meet demand, potentially leading to slight delays or increased costs. A small sized hotspot 1672 denotes low contractor availability, symbolizing high risk, as the scarcity of contractors may result in significant project delays, higher costs, or difficulty in finding suitable expertise.

In the context of the discussed disclosure, terms such as "concentration area," "hotspot," "intensity zone," or "area of elevated intensity" refer to specific regions within a heat map or density map where a significant aggregation or clustering of data points occurs, indicating higher levels of a particular variable or metric of interest. These areas are visually distinguished from their surroundings on the map through variations in color, saturation, or size, effectively drawing attention to regions of particular importance or concern. For example, in a construction project management scenario, a "hotspot" might denote a geographic area with a high concentration of subcontractor availability, suggesting a lower risk for project delays due to ample professional resources. Conversely, an "intensity zone" could highlight areas with elevated risk levels, perhaps due to a scarcity of skilled contractors, signaling potential challenges in project timelines or increased costs. These visual cues enable project managers and stakeholders to quickly identify and assess areas of significant interest or concern, facilitating informed decision-making and strategic planning for resource allocation and risk mitigation.

Figure 16E:
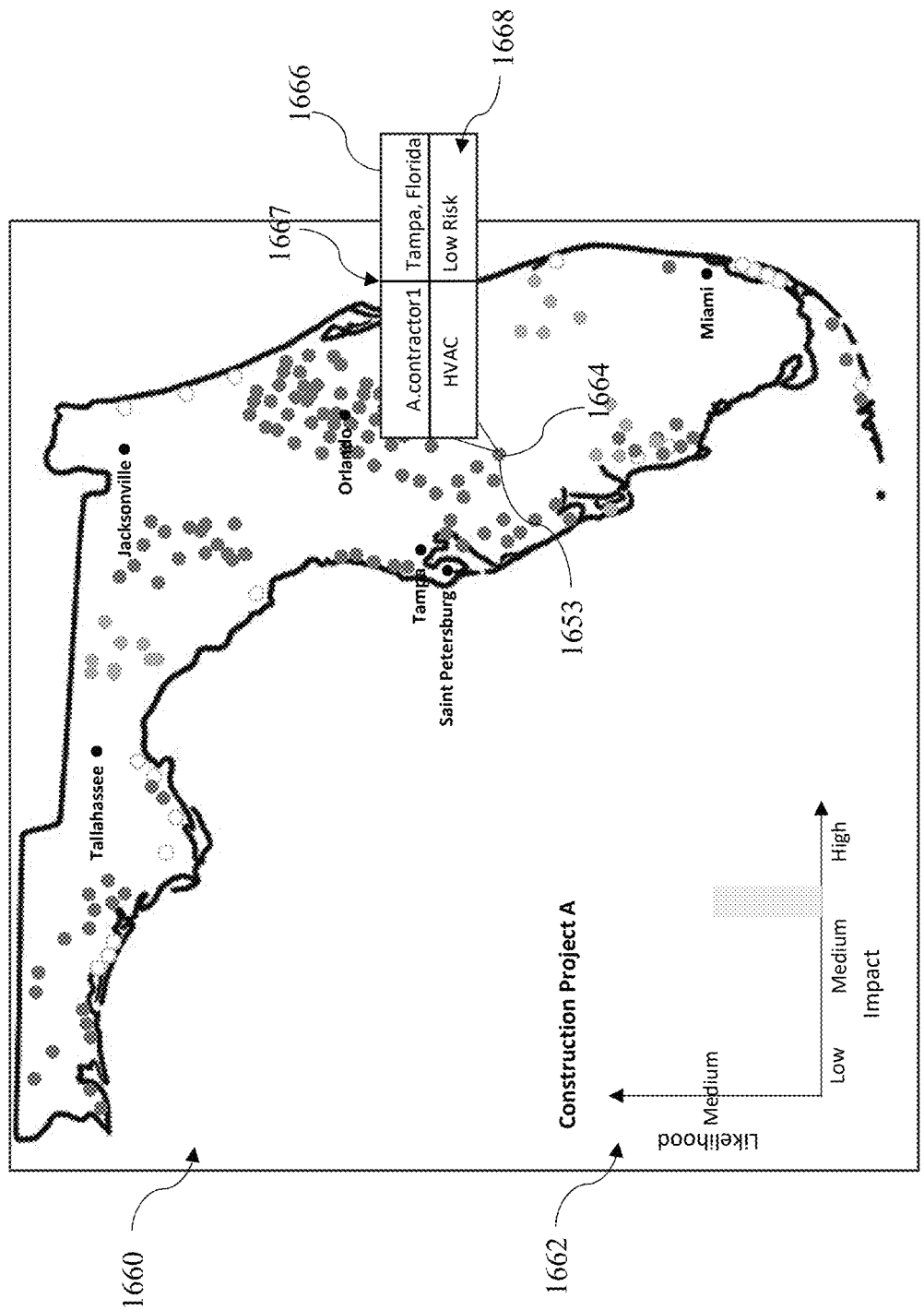

In the next step 288 of FIG. 2D, the method includes generating a second graphical representation of the density map that represents the magnitude of risk associated with the construction contracting project. As shown in FIG. 16E, the second graphical representation 1660 shows the density map of the same geographic location having a portion of the interface showing the magnitude of risk 1662 associated with the project, for instance the construction project A. The magnitude of risk 1662 is represented on an XY graph, the X axis representing the impact and the Y axis representing the likelihood of the impact on the construction project A. As shown in the figure, the impact on the project is from a medium level to high level and the likelihood of the impact is at a medium level. In one example, magnitude of risk 1662 associated with the construction contracting project is categorized into multiple categories and each category is associated with a shade of color.

A density map and a heat map are both visual tools used to represent data graphically, but they serve slightly different purposes and convey information in unique ways. A density map visualizes the concentration of data points within a specific geographical area. It is commonly used to illustrate the distribution density of a particular variable or event across a map. For example, in the context of population studies, a density map might show areas with higher concentrations of people by using varying colors or intensities. The key characteristic of a density map is its focus on the density or clustering of data points, without necessarily providing information on the magnitude or value of the data points themselves. It is particularly useful for identifying patterns of spatial distribution, such as clustering or dispersion of occurrences. A density map, within the framework of the present disclosure, could be employed to visually represent the geographic distribution of contractors based on their geolocation data. This visualization aids in identifying areas with high concentrations of available contractors, enabling project managers to observe patterns of contractor availability across different regions. For instance, a density map might reveal clusters of contractors in urban areas as opposed to rural ones, providing insights into where contractor resources are more readily available for deployment.

On the other hand, a heat map uses colors to represent the magnitude or intensity of data in different areas, providing a visual representation of how values vary across a given space or surface. Heat maps can be used in various contexts, from representing geographical data (such as temperature variations across regions) to visualizing complex datasets in software analytics (like showing areas of a webpage that receive the most clicks). The colors on a heat map range from cool to warm, indicating lower to higher values respectively. Heat maps are especially useful for identifying trends and patterns, such as hotspots or areas of high activity, based on the intensity of the data. Herein, a heat map illustrates the risk landscape of a construction contracting project across different geographical areas. By using color gradients, a heat map could depict variations in the project risk metric, which is computed based on the aggregated contractor risk metrics within specific locales. Areas with higher risks associated with contractor engagement might be highlighted in warmer colors (e.g., red), while regions with lower risk levels could be represented in cooler colors (e.g., blue). This visualization enables project managers and stakeholders to quickly identify high-risk zones and make informed decisions about where to allocate resources and how to strategize risk mitigation efforts effectively.

Overall, the utilization of diverse graphical representations, particularly density maps, plays a crucial role in analyzing risk and facilitating trade deployment for construction contracting projects. These maps are generated based on segmented query results, which are organized according to risk metrics and geolocation data associated with contractor records. A first graphical representation, or density map, employs graphical icons to represent the distribution of contractors across a geographic area, where each icon embodies a first stylized representation indicating the contractor's location and potentially their risk level. A subsequent, more evolved graphical representation integrates a project risk metric, which is derived from the contractor risk metrics and their specific geolocations. This second map variant accentuates areas of higher risk by varying the magnitude of risk representation, thereby offering a visual analysis tool that highlights geographic regions with elevated risk concentrations. Such graphical insights enable project managers and decision-makers to visually assess and strategize trade deployment and risk mitigation efforts more effectively, promoting informed decision-making by identifying risk-prone areas and facilitating the optimal placement of contractor resources.

This disclosed methodology represents a significant advancement over prior art within the domain of construction project management and contractor selection by seamlessly integrating data standardization, comprehensive risk assessment, and advanced visual analytics into a cohesive platform. Contrary to earlier methods that predominantly relied on manual data handling and lacked the ability to effectively process and analyze unstructured data, the present disclosure introduces a refined blend of machine learning and data extraction techniques. These techniques are crucial for converting a broad spectrum of non-standardized contractor information into a unified, standardized format. Such standardization not only improves the precision and consistency of data for analysis but also facilitates the integration of varied data sources, effectively bridging a significant gap identified in previous methodologies.

Moreover, the framework for calculating detailed contractor risk metrics within this disclosure markedly advances beyond traditional methods, which may have offered only a basic evaluation of potential risks. By incorporating comprehensive validation and authentication of contractor information, including thorough verification of past work experiences and qualifications against public and professional records, the disclosure ensures a layered and detailed risk assessment. This in-depth analysis aids in gaining a better understanding of the impact that contractor selection may have on project outcomes, significantly enhancing the decision-making process.

The introduction of dynamic, visually intuitive tools for risk analysis, especially through the utilization of density maps and graphical representations, sets this disclosure apart from prior art. These visual tools allow for an understanding of risk distribution across geographical areas, empowering project managers to make well-informed strategic decisions regarding trade deployment and risk mitigation. This approach to visualizing risk, as opposed to the traditional reliance on text or tables, provides an immediate and intuitive comprehension of complex data, thus improving the efficiency and effectiveness of project planning and management.

Additionally, the interactive features of the system enable users to actively engage with the data, modify search queries, and update review statuses dynamically. This level of interactivity and adaptability was likely less emphasized or missing in earlier systems, rendering the present disclosure not only more responsive to the evolving requirements of a project but also adaptable to new information. Alongside the centralization of data within a connected database and its accessibility through user-friendly interfaces, the disclosure substantially enhances the ease with which project managers can access, analyze, and act on crucial contractor information.

In summary, the present disclosure surmounts the limitations and inefficiencies of prior art, offering a more integrated, precise, and user-focused approach for optimizing construction contracting projects. With its sophisticated data processing capabilities, thorough risk analysis, and inventive application of visual analytics, the system essentially redefines the field of construction project management and contractor selection.

Figure 2E:
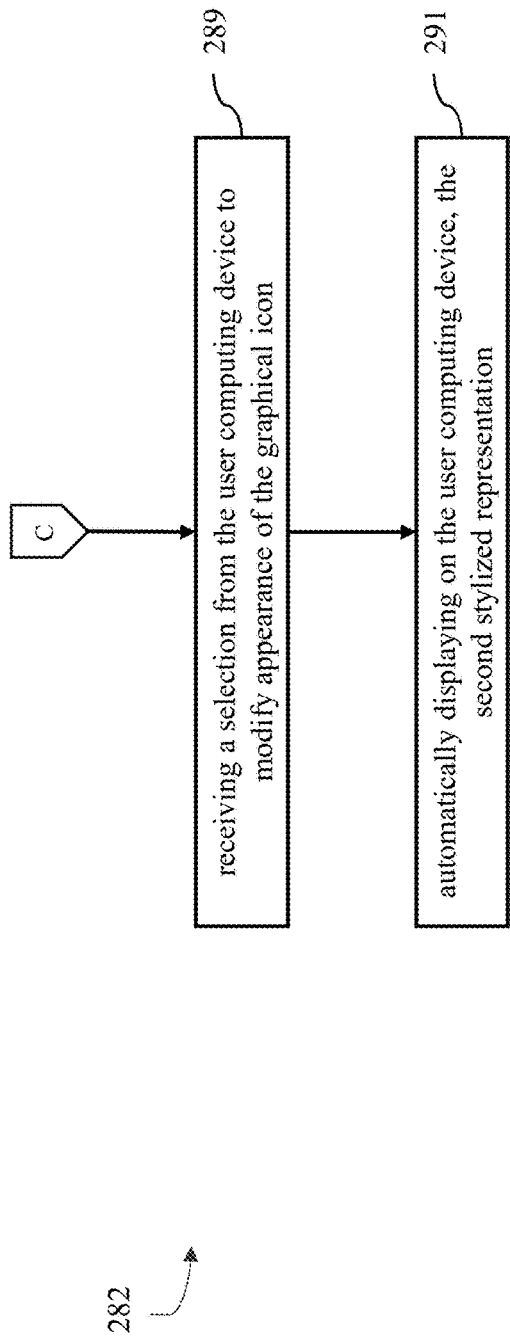

In the step 289 of FIG. 2E, the method includes receiving a selection from the user computing device to modify appearance of the graphical icon. As shown in FIG. 1D, the user computing device 142 sends a data packet representing the user selection 181 comprising a valid license information and insurance information 182 for the contractor. The user selection for modifying the appearance from the first stylized representation to the second stylized representation, in one example, is based on the contractor record meeting a predefined criteria, such as a valid license information and insurance information in the contractor information. The predefined criteria may be specified or provided by the user such as a valid license information or a valid insurance information for the contractor. It may be noted that the predefined criteria including any other information may be covered within the scope of the invention. As shown in FIG. 16C, the graphical icon 1652 represents a plumber type of subcontractor available in the predetermined location. The graphical icon 1652 has a first stylized representation 1653 having a circular shape and size and a particular shade. The first stylized representation may be a dot, point, or indicator on the map corresponding to a parameter within a corresponding record of the contractor records that were retrieved in the query results. The first stylized representation 1653 may have one of a first shade of a color, a first shape and a size of the graphical icon. In an example, the user may select to modify the appearance of the graphical icons by modifying the shape, size, shade, outline or border style of the icons or displaying an additional subset graphical window adjacent a selected graphical icon. In an example, the selection by the user may be provided by hovering a mouse pointer of the user computing device of the user or the general contractor on the particular graphical icon or by clicking the mouse for a predetermined number of times when the mouse pointer is placed over the particular graphical icon. In the next step 291, a second stylized representation is automatically displayed on the user computing device. The second stylized representation includes a subset graphical window comprising the contractor record displayed in a standardized format 1668 displayed next to the graphical icon 1664. In the embodiment, the standardized format 1668 is a tabular form, for showcasing relevant data for a contractor, and includes a structured arrangement of information organized in columns and rows. The information may include contractor name, geolocation data, specialization, and overall risk related with the contractor. FIG. 16E shows the graphical icon 1664 that is shown as graphical icon 1652 in FIG. 16C that has the first stylized representation. The graphical icon 1664 has the second stylized representation 1667 having a subset graphical window 1666 displayed adjacent to the graphical icon 1664. The subset graphical window 1666 shows the contractor record created in a standardized format having the contractor name location, specialization, and level of risk associated with the contractor.

In various embodiments, after displaying the second stylized representation 1667 on the user computing device, a user selection may be received, on the first graphical user interface of the user computing device. The user selection is regarding a contractor record from the plurality of contractor records for engagement in the construction contracting project. In response to receiving the user selection regarding the contractor record, personal details of the contractor corresponding to the contractor record is fetched from the connected database. Thereafter, a notification of engagement is sent to the contractor computing device of the contractor.

Referring now to FIG. 6, an example embodiment of a user interface 600 of a webpage 206 configured to be displayed on a second computing device of the general contractor is shown. The custom display interface displays a list of the contractors 217, three display regions 221 for each of the contractors where each of said display regions indicate a value 218 for a review status 219 for a subset of the subcontractor information. The review status may be at least one of denied, approved, or commented on. In other embodiments, the review status may have more forms depending on the type of project and evaluation system. The webpage includes at least one button 209 configured for sending at least one document. In other embodiments, the webpage 206 may be oriented differently depending on the preference of the user.

Figure 7:
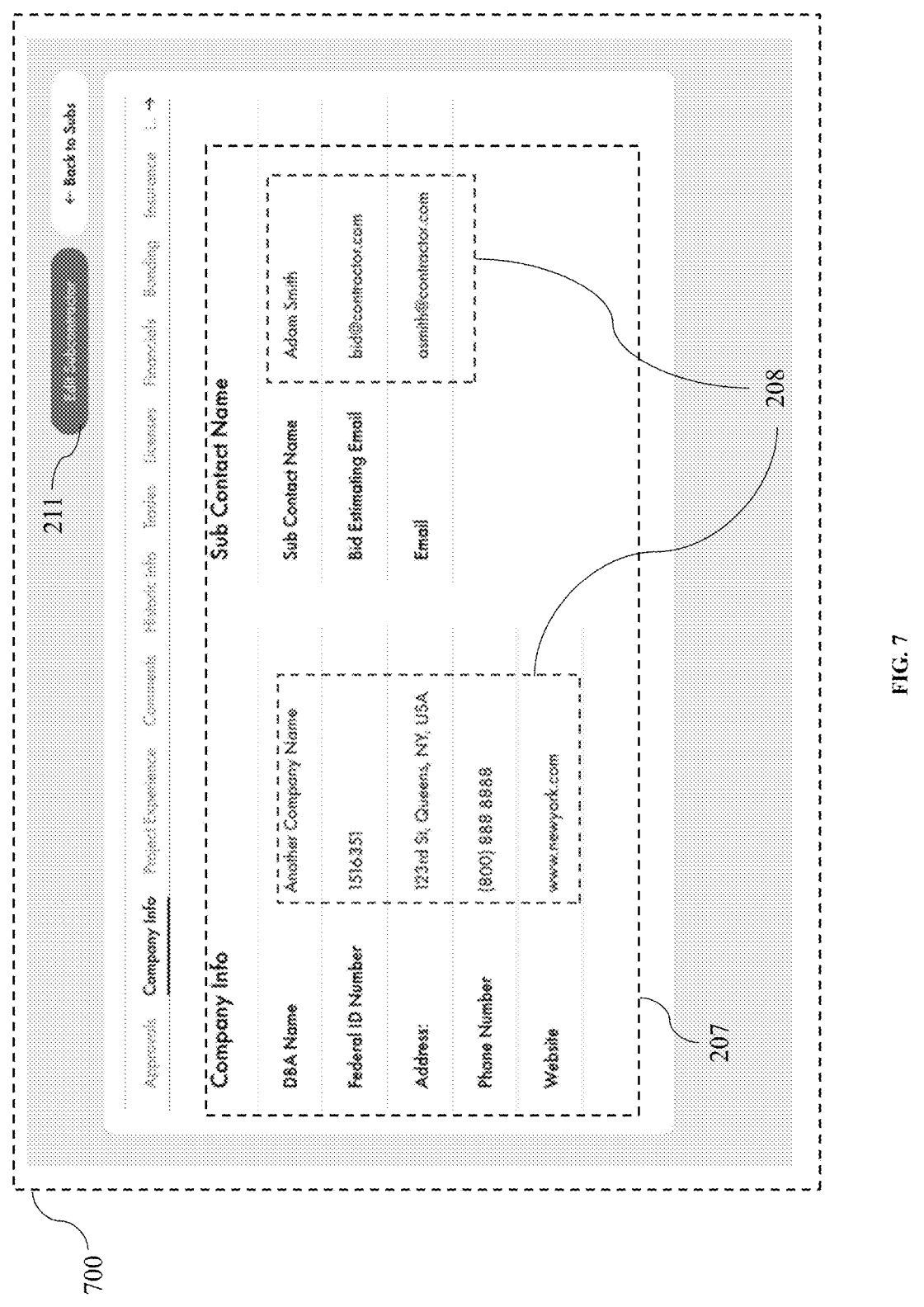

FIG. 7 depicts an example embodiment of a contracting company's profile, according to an example embodiment. FIG. 7 illustrates user interface 700 of a webpage, having a plurality of fields 207 for displaying a plurality of subcontractor information 208. Subcontractor information 208 may include contractor name, contact information 661, financial information, administrative information, license information, tax information, prior job information, and reference information. The user interface 700 includes a button 211 configured to allow the general contractor to edit the subcontractor information.

Figure 8:
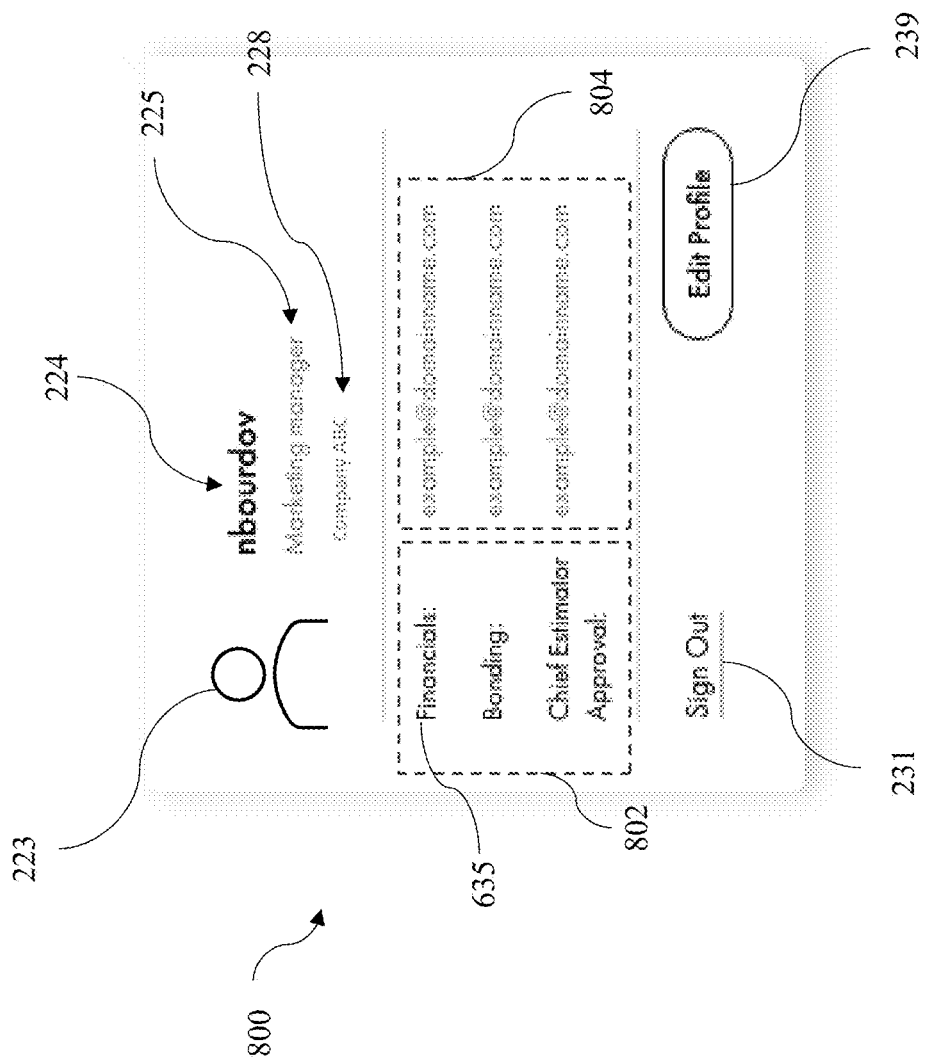
FIG. 8 is an example user interface displaying a marketing manager's profile, according to an example embodiment.

FIG. 8 is an example embodiment of a marketing manager's profile interface 800, having a plurality of fields 802 for a plurality of subcontractor input data 804. The present embodiment illustrates a profile having the following data, a profile picture 223, a name 224, a position title 225, company name 228, a sign out button 231, and an edit button 239. In other embodiments there may be more or less data displayed in a profile interface.

Figure 9:
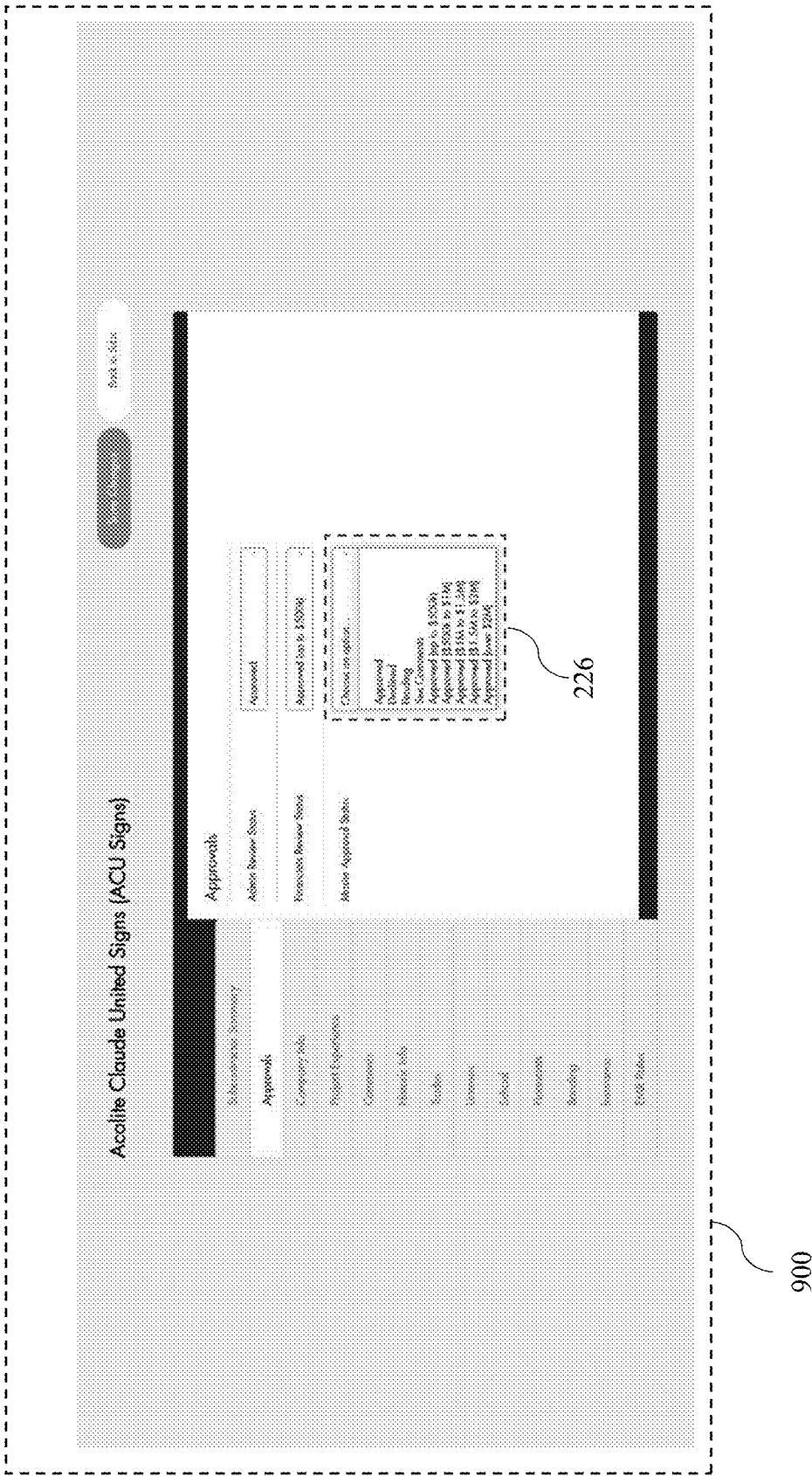
FIG. 9 is an example user interface for adjusting the status of a subcontractor, according to an example embodiment.

FIG. 9 is an example embodiment of a user interface 900 for adjusting the status of a subcontractor, having a webpage 206, and a value from a plurality of value options in a dropdown box 226 for the review status of a subset of subcontractor information. Approvals are a major factor in determining a risk metric for a particular subcontractor. FIG. 10 is an example embodiment depicting a user interface 1000 for inputting data such as contact information, administrative information, tax information, etc. User interface 1000 includes a plurality of fields 1002 corresponding to inputs 1004 for receiving a plurality of fields 1002.

Figure 11:
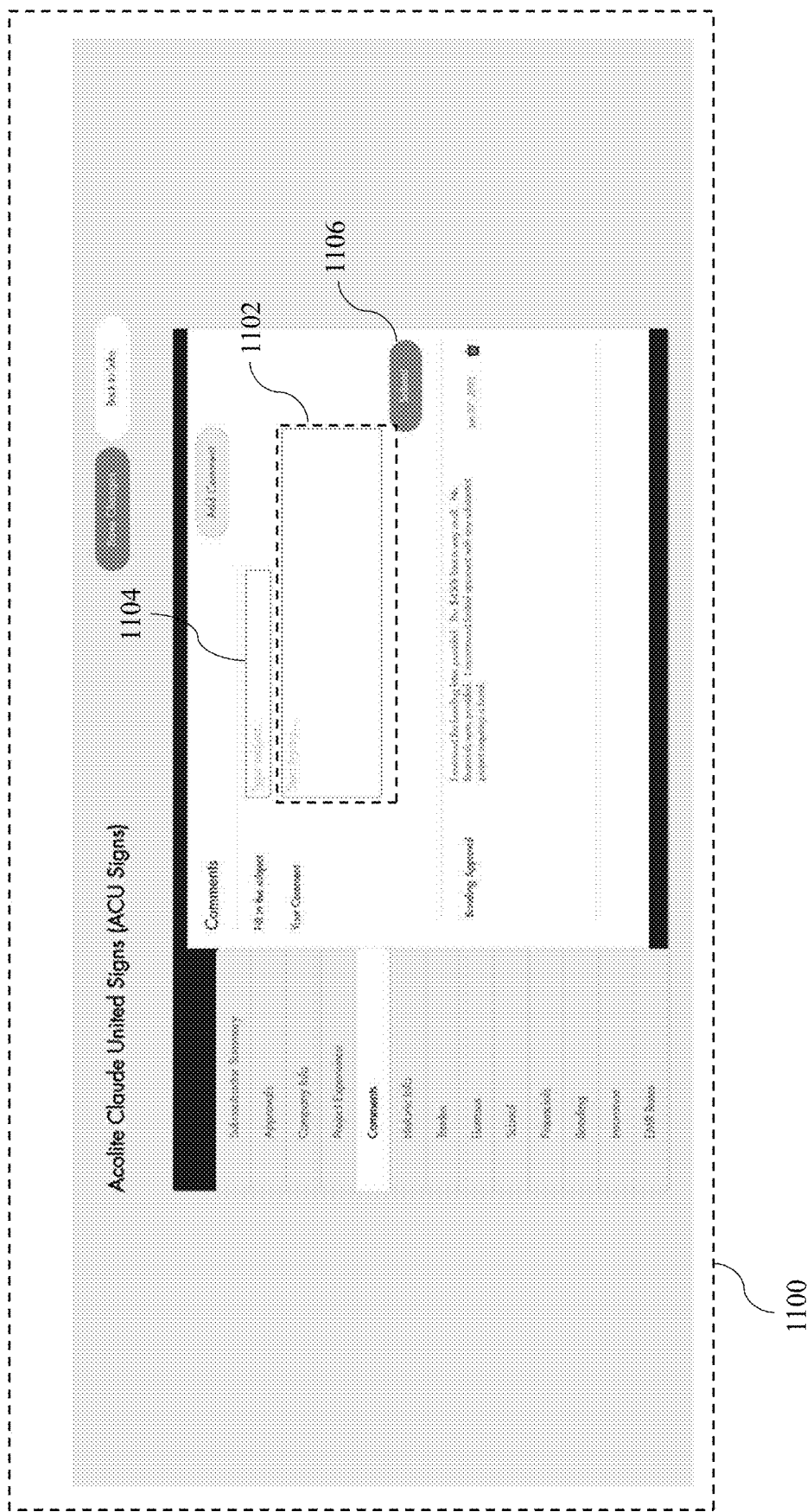
FIG. 11 is an example user interface for submitting comments, according to an example embodiment.

FIG. 11 is an example embodiment of a user interface 1100 configured for submitting comments having a contractor comment input 1102, a subject input 1104, and a submit button 1106. The user interface 1100 allows the contractor to explain to the subcontractor why they were given a certain value for the status. FIG. 12 depicts another user interface 1200 having a webpage for displaying a comment field 236. When the review status indicator is the commented on status, then a plurality of alphanumeric content 1202 is included into a contractor comment field 236 for providing additional comments regarding the subcontractor information that has been reviewed by the contractor.

Figure 13:
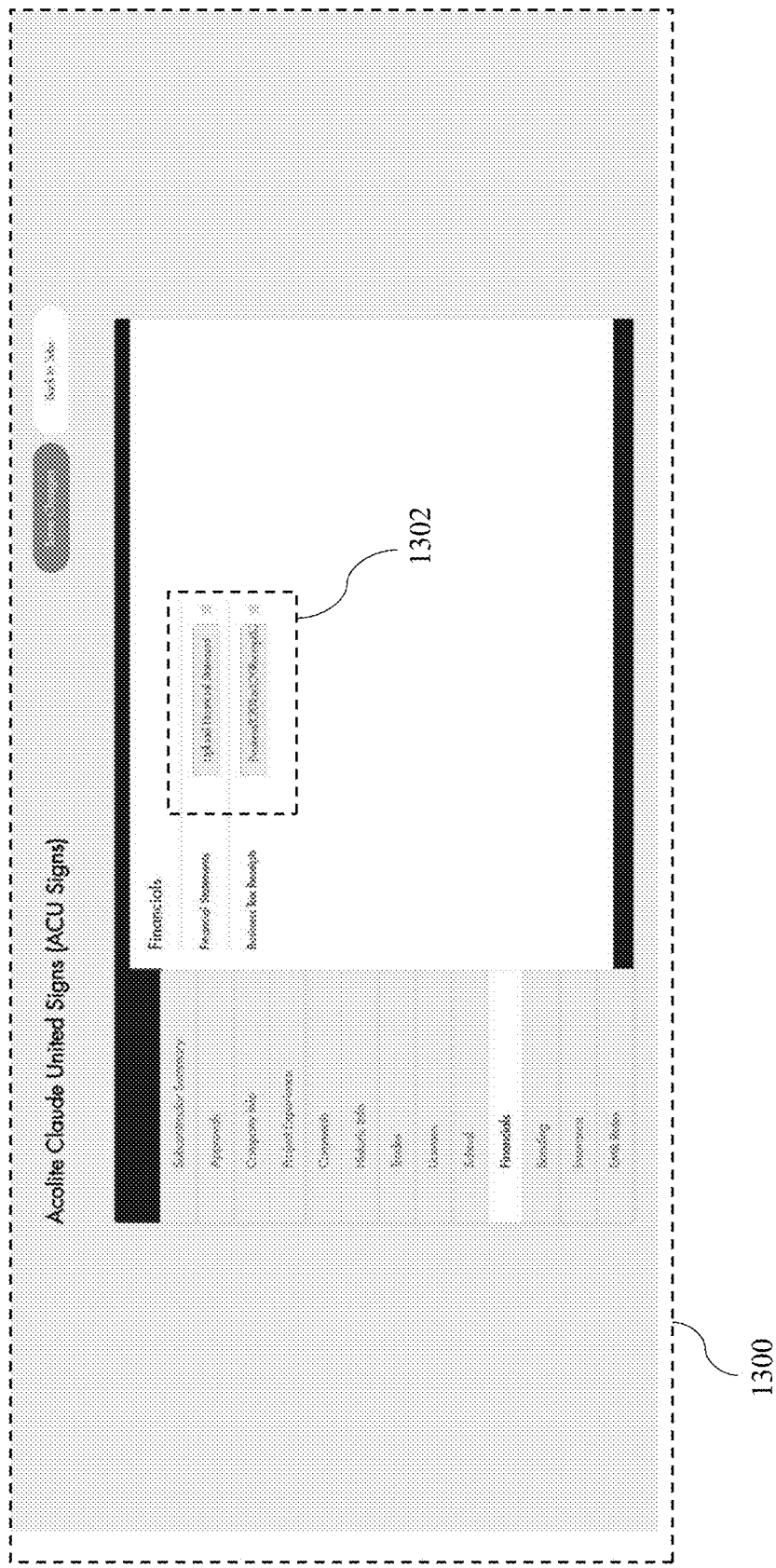
FIG. 13 depicts an example user interface for uploading at least one document, according to an example embodiment.
Figure 14:
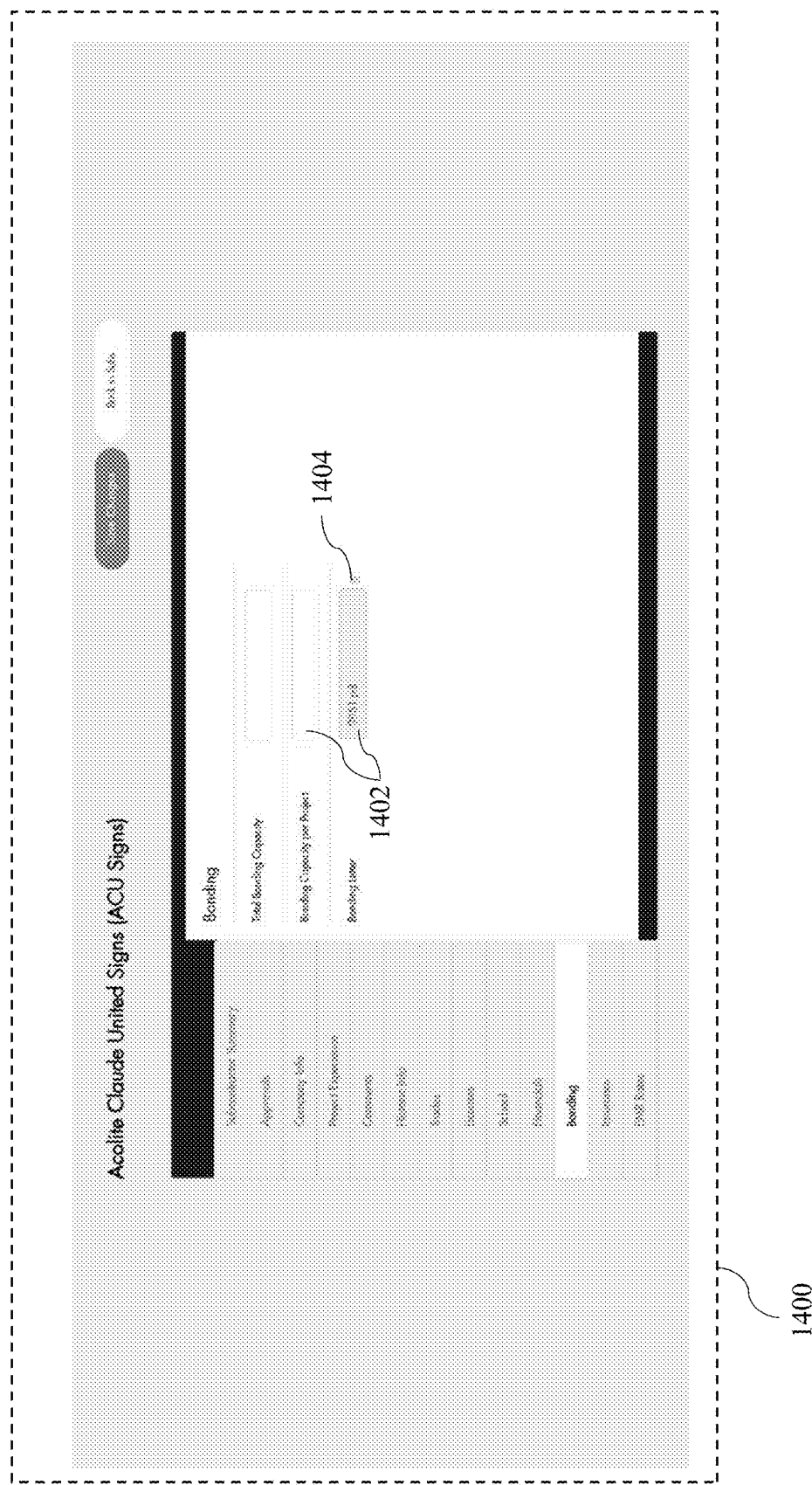
FIG. 14 is an example user interface allowing a user to upload, download, or at least one document, according to an example embodiment.
Figure 15:
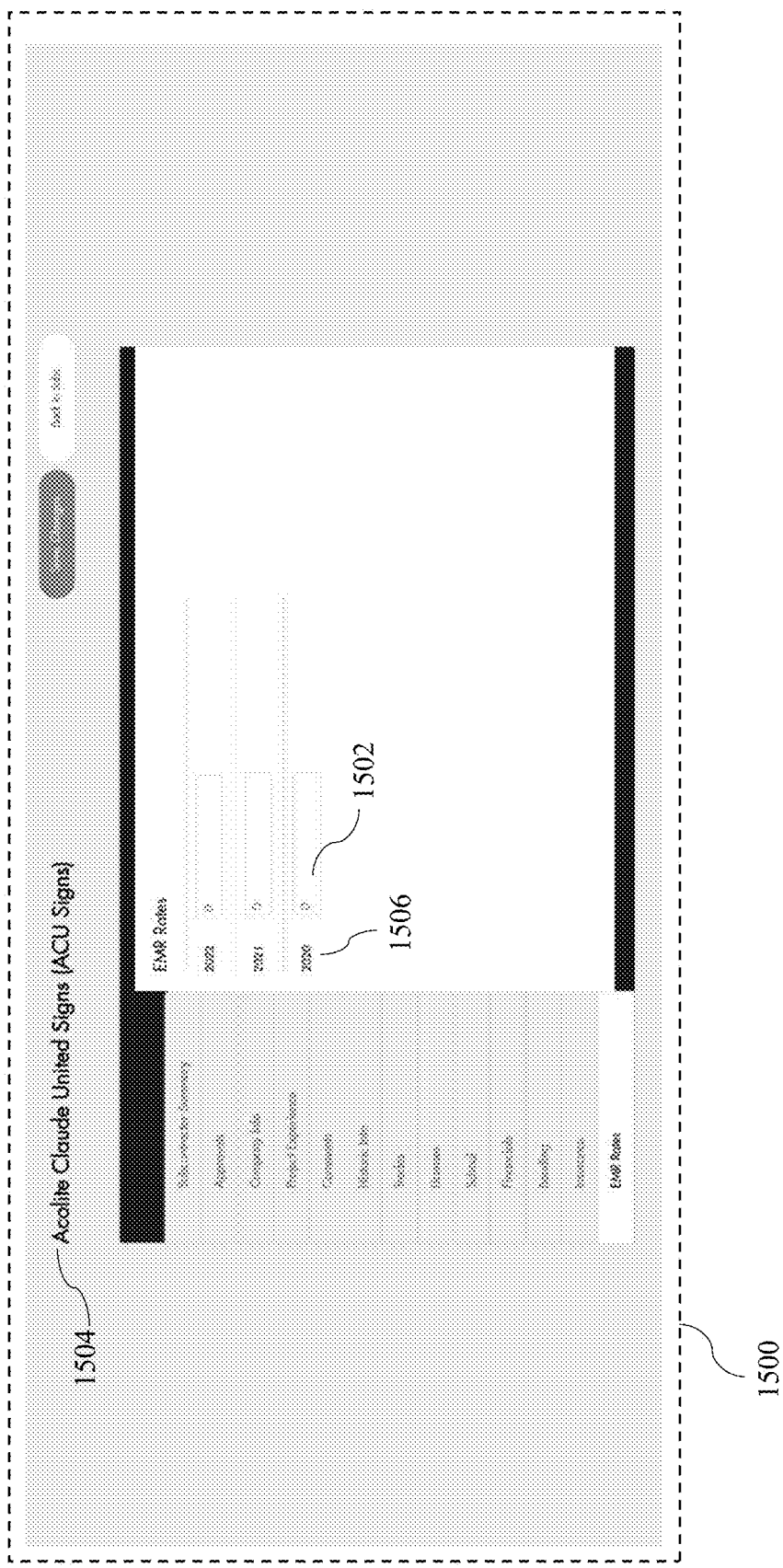
FIG. 15 is an example user interface displaying a sub-contractors EMR, according to an example embodiment.

FIG. 13 depicts an example embodiment of a user interface 1300 for uploading at least one document. The user interface 1300 may include inputs 1302 that retrieve and uploads documents from a computing device. The at least one document incudes alphanumeric information and defines a certificate of license, proof of insurance, a financial document, a certificate of competency, etc. FIG. 14 is an example embodiment of a user interface 1400 that includes inputs 1402 configure to allow a user to upload and a button 1404 to delete at least one document. FIG. 15 is an example embodiment of a user interface 1500 configured to allow the contractor to enter a risk metric for a subcontractor 1504. The user interface 1500 includes inputs 1502 for a subcontractor's risk metric corresponding to a specific time period 1506.

FIG. 16 depicts a map 232 for sorting subtractors based on risk factor and geographic location. The method for optimizing trade deployment and risk mitigation producing the map includes retrieving the subcontractor records stored in the connected database and sorting into a plurality of groupings 235 based the risk metric of each of the plurality of subcontractors. The plurality of groupings may include low risk, moderate risk, and high risk. Other groupings configured to sort the plurality of subcontractor records may be used and are within the spirit and scope of the present invention. Then, assigning each of the groupings a color or a shade of color, and displaying on the map 232 of a geographical area 233 at a geographic location 234 where each subcontractor operates the color or the shade of color associated with each of the subcontractors. The low risk factor is assigned a color that may represent good or positive. The high risk factor is assigned a color that represents bad or negative. The moderate risk factor group is assigned a color that may be a combination of the previously mentioned colors to represent that it is between the previously mentioned groups. For example, the low risk factor group may be assigned a green color, the moderate risk factor group may be assigned a yellow color, and the high risk factor group may be assigned a red color.

Figure 17:
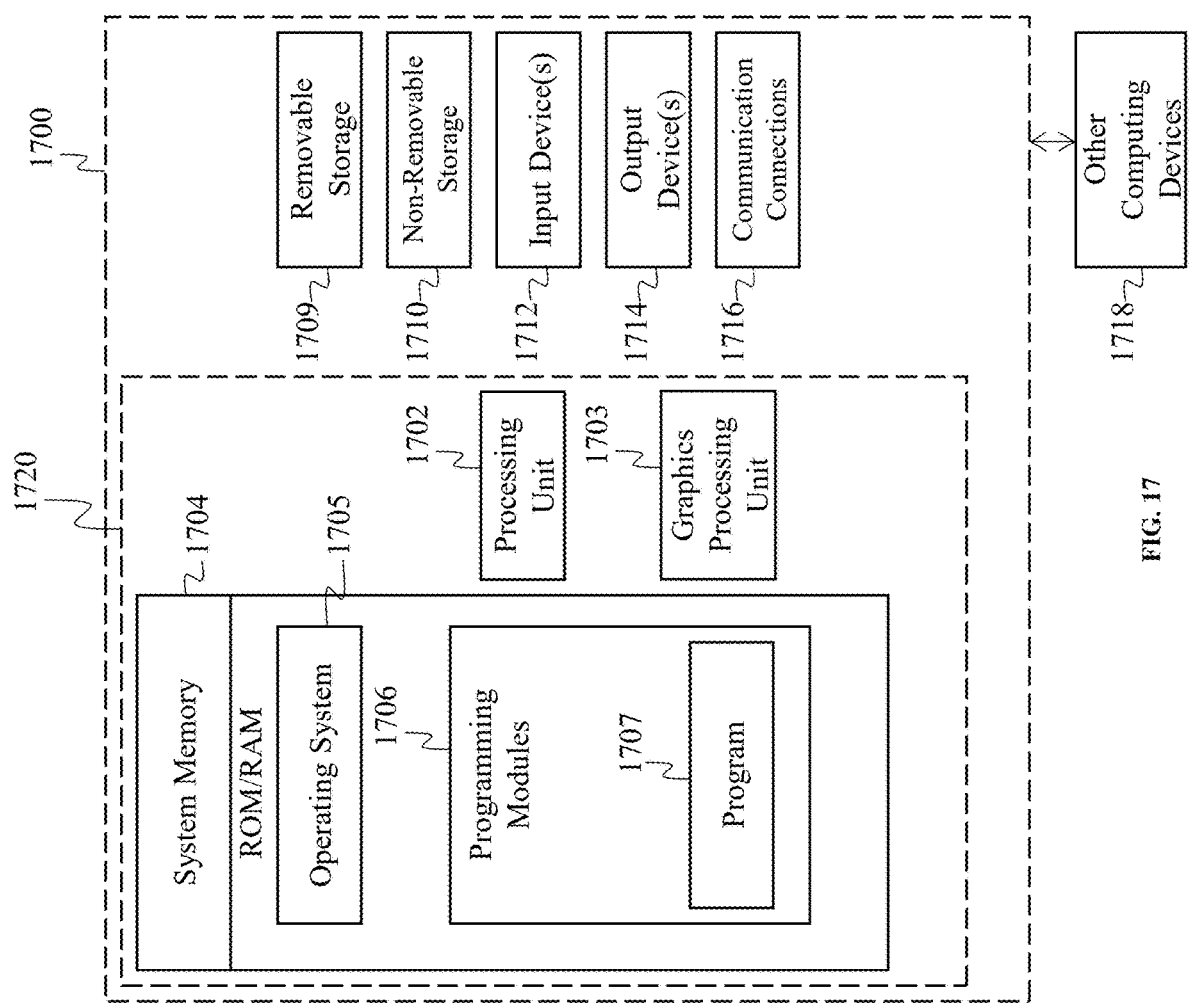
FIG. 17 is a block diagram of a system including an example computing device and other computing devices, according to an example embodiment.

FIG. 17 is a block diagram of a system including an example computing device 1700 and other computing devices. Consistent with the embodiments described herein, the aforementioned actions performed by server 102 or first computing device 105, and second computing device 109 may be implemented in a computing device, such as the computing device 1700 of FIG. 17. Any suitable combination of hardware, software, or firmware may be used to implement the computing device 1700. The aforementioned system, device, and processors are examples and other systems, devices, and processors may comprise the aforementioned computing device. Furthermore, computing device 1700 may comprise an operating environment for the methods shown in FIGS. 1 through 16 above.

With reference to FIG. 17, a system consistent with an embodiment of the invention may include a plurality of computing devices, such as computing device 1700. In a basic configuration, computing device 1700 may include at least one processor and a system memory 1704. Depending on the configuration and type of computing device, system memory 1704 may comprise, but is not limited to, volatile (e.g., random access memory (RAM)), nonvolatile (e.g., read-only memory (ROM)), flash memory, or any combination or memory. System memory 1704 may include operating system 1705, one or more programming modules 1706 (such as program module 1707). Operating system 1705, for example, may be suitable for controlling computing device 1700's operation. In one embodiment, programming modules 1706 may include, for example, a program module 1707. Furthermore, embodiments of the invention may be practiced in conjunction with a graphics library, other operating systems, or any other application program and is not limited to any particular application or system. This basic configuration is illustrated in FIG. 17 by those components within a dashed line 1720.

Computing device 1700 may have additional features or functionality. For example, computing device 1700 may also include additional data storage devices (removable and/or non-removable) such as, for example, magnetic disks, optical disks, or tape. Such additional storage is illustrated in FIG. 17 by a removable storage 1709 and a non-removable storage 1710. Computer storage media may include volatile and nonvolatile, removable, and non-removable media implemented in any method or technology for storage of information, such as computer readable instructions, data structures, program modules, or other data. System memory 1704, removable storage 1709, and non-removable storage 1710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 1700. Any such computer storage media may be part of device 1700. Computing device 1700 may also have input device(s) 1712 such as a keyboard, a mouse, a pen, a sound input device, a camera, a touch input device, etc. Output device(s) 1714 such as a display, speakers, a printer, etc. may also be included. The aforementioned devices are only examples, and other devices may be added or substituted.

Computing device 1700 may also contain a communication connection 1716 that may allow device 1700 to communicate with other computing devices 1718, such as over a network in a distributed computing environment, for example, an intranet or the Internet. Communication connection 1716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 1704, including operating system 1705. While executing on processing unit 1702, programming modules 1706 may perform processes including, for example, one or more of the methods shown in FIGS. 2A through 5B above. Computing device 1700 may also include a graphics processing unit 1703, which supplements the processing capabilities of processing unit 1702 and which may execute programming modules 1706, including all or a portion of those processes and methods shown in FIGS. 2A through 5B above. The aforementioned processes are examples, and processing unit 1702 may perform other processes. Other programming modules that may be used in accordance with embodiments of the present invention may include electronic mail and contacts applications, word processing applications, spreadsheet applications, database applications, slide presentation applications, drawing or computer aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including handheld devices, multiprocessor systems, microprocessor based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general-purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A computer implemented method for optimizing trade deployment and risk mitigation in a construction contracting project based on a risk of utilizing a plurality of contractors on the construction contracting project, the computer implemented method comprising:
receiving contractor information from a contractor computing device of a contractor, the contractor informa- tion comprising at least one of (i) contractor input data, (ii) at least one document, and (iii) geolocation data;

creating a contractor record based on the contractor information;

storing the contractor record in a connected database;

analyzing the contractor information;

authenticating and validating the contractor information;

assigning a review status a value for a first subset of the contractor information, wherein the value of the review status is indicative of a validation outcome of the first subset of the contractor information;

calculating a contractor risk metric associated with the contractor record based on the review status and the value; wherein the contractor risk metric is a measurement of a potential impact of the contractor on the construction contracting project;

storing the contractor risk metric in the contractor record in the connected database;

displaying a first graphical user interface on a user computing device of a user, the first graphical user interface comprising a request for the user to input a search query comprising parameters associated with the construction contracting project to generate the search query;

receiving the search query from the user computing device;

generating query results by matching the parameters with the contractor record stored in the connected database;

segmenting the query results into a plurality of groups based on risk metrics and the geolocation data associated with the contractor record;

based on the query results, generating a first graphical representation of a density map comprising a graphical icon corresponding to the geolocation data of the contractor record matched in the query results; wherein a plurality of contractor records are represented by a plurality of graphical icons distributed across the density map; wherein the graphical icon comprises a first stylized representation;

based on the query results, generating a project risk metric within a first predetermined geolocation based on the contractor risk metric of the contractor record matched in the query results and where said contractor record comprises the geolocation data corresponding to the first predetermined geolocation;

based on the project risk metric, generating a second graphical representation of the density map that represents a magnitude of risk associated with the construction contracting project in a geographic area;

displaying at least one of a first graphical representation and the second graphical representation on the user computing device;

receiving a selection from the user computing device, wherein the selection is a request to modify appearance of the graphical icon from the first stylized representation to a second stylized representation; and automatically displaying on the user computing device, the second stylized representation comprising a subset graphical window comprising the contractor record displayed in a standardized format.

2. The computer implemented method of claim 1, further comprising converting the at least one of (i) contractor input data, (ii) at least one document, and (iii) geolocation data, into the standardized format prior to storing the contractor record in a connected database, wherein the at least one of (i) contractor input data, (ii) at least one document, and (iii) geolocation data is in a non-standardized format, and the standardized format is a predefined structure of the contractor input data, the geolocation data and the at least one document.

3. The computer implemented method of claim 1, wherein authenticating and validating the contractor information comprises:

fetching at least one of personal details, past work experience, qualification information, and license information from the contractor information;

matching the personal details and qualification information in the contractor information with a public record database, wherein the public record database stores personal details of contractors in the first predetermined geolocation;

verifying the past work experience comprising cross-referencing with professional records stored in a professional database for the contractors in the first predetermined geolocation;

verifying validity of license information within the contractor information by querying at least one license database from a licensing authority;

receiving outcomes of matching the personal details and qualification information, verifying the past work experience, and verifying validity of license information; and determining potential risks associated with the contractor based on the outcomes of matching the personal details and qualification information, verifying the past work experience, and verifying validity of license information.

4. The computer implemented method of claim 1, wherein the first stylized representation comprises at least one of a first shade of a color, a first shape and a size of the graphical icon.

5. The computer implemented method of claim 1, wherein prior to receiving the contractor information, the method comprises:

generating, by the user computing device, a webpage having a plurality of fields for receiving at least one of (i) the contractor input data, (ii) the at least one document, and (iii) the geolocation data for the contractor; and sending, to the contractor computing device of the contractor, a link to the webpage.

6. The computer implemented method of claim 1, wherein the value of the review status comprises a graphical representation that the review status is at least one of denied, approved, or commented on.

7. The computer implemented method of claim 1 further comprising:

receiving, from the user computing device of the user, a request to review a first subset of the contractor information of the contractor;

after receiving the request to review the first subset of the contractor information, sending to the user computing device of the user, information for displaying the first subset of the contractor information on the user computing device;

receiving from the user computing device of the user, information requesting to update the review status for the first subset of the contractor information for the contractor;

storing an updated review status for the first subset of the contractor information in the contractor record of the contractor; and sending to the user computing device, information for displaying an updated review status.

8. The computer implemented method of claim 1, wherein the contractor input data comprises contractor name, contact information, financial information, administrative information, license information, tax information, prior job information, reference information.

9. The computer implemented method of claim 1, wherein the at least one document incudes alphanumeric information defines a certificate of license, proof of insurance, a financial document, a certificate of competency.

10. The computer implemented method of claim 6, wherein when the value of review status is commented on, then a plurality of alphanumeric content is included into a contractor comment field for providing additional comments regarding the contractor information that has been reviewed by the user.

11. The computer implemented method of claim 5, wherein prior to generating the webpage having the plurality of fields for receiving the contractor input data and the at least one document, the method comprises:
sending to the user computing device of the user a request for a list of fields to select the contractor;
displaying a graphical user interface on the user computing device of the user to receive the list of fields to select the contractor;
receiving, from the user computing device, a user reply to the request for the list of fields, wherein the user reply includes a plurality of requirements for the list of fields; and
generating information to provide a custom webpage, based on the user reply, having the plurality of fields for receiving the contractor input data and the at least one document.

12. A computer implemented method for optimizing trade deployment and risk mitigation in a construction contracting project based on a risk of utilizing a plurality of contractors on the construction contracting project, the computer implemented method comprising:
receiving contractor information from a contractor computing device of a contractor, the contractor information comprising at least one of (i) contractor input data, (ii) at least one document, and (iii) geolocation data;
creating a contractor record based on the contractor information;
converting the at least one of (i) contractor input data, (ii) at least one document, and (iii) geolocation data, into a standardized format, wherein the standardized format is a predefined structure of the contractor input data, the geolocation data and the at least one document;
storing the contractor record in a connected database;
analyzing the contractor information;
authenticating and validating the contractor information;
assigning a review status a value for a subset, wherein the value of the review status is indicative of a validation outcome of the subset of the contractor information;
calculating a contractor risk metric associated with the contractor record based on the review status and the value; wherein the contractor risk metric is a measurement of a potential impact of the contractor on the construction contracting project;
storing the contractor risk metric in the contractor record in the connected database;
displaying a first graphical user interface on a second computing device of a user, the first graphical user interface comprising a request for the user to input a search query comprising parameters associated with the construction contracting project to generate the search query;
receiving the search query from the second computing device;
generating query results by matching the parameters with the contractor record stored in the connected database;
segmenting the query results into a plurality of groups based on risk metrics and the geolocation data associated with the contractor record;
based on the query results, generating a first graphical representation of a map comprising a graphical icon corresponding to the geolocation data of the contractor record matched in the query results; wherein a plurality of contractor records are represented by a plurality of graphical icons distributed across the map; wherein the graphical icon comprises a first stylized representation, the first stylized representation comprising at least one of a first shade of a color, a first shape and size of the plurality of graphical icons;
receiving a selection from a user computing device, wherein the selection is a request to modify appearance of the graphical icon from the first stylized representation to a second stylized representation; and
automatically displaying on the user computing device, the second stylized representation comprising a subset graphical window comprising the contractor record displayed in a standardized format.

13. The computer implemented method of claim 12 comprising:
generating a project risk metric within a first predetermined geolocation based on the contractor risk metric of the contractor record matched in the query results and where said contractor record comprises the geolocation data corresponding to the first predetermined geolocation;
generating a second graphical representation of a density map based on the project risk metric that represents a magnitude of risk associated with the construction contracting project; and
displaying at least one of a first graphical representation and the second graphical representation on the user computing device.

14. The computer implemented method of claim 12 further comprising:
receiving a request for accessing a plurality of contractor records for a plurality of contractors in the connected database; and
displaying, in response to receiving the request, a graphical user interface on the user computing device of the user, having a custom display, wherein the custom display has (i) a list of contractors, (ii) three display regions for each of the plurality of contractors wherein each of the three display regions indicate a value of a review status for a subset of the contractor information.

15. The computer implemented method of claim 12, wherein the request to modify the appearance of the graphical icon from the first stylized representation to the second stylized representation is based on the contractor record meeting a predefined criteria, wherein the predefined criteria is a valid license information and insurance information in the contractor information.

16. The computer implemented method of claim 12, wherein a magnitude of risk associated with the construction contracting project is categorized into multiple categories and each category is associated with a shade of color.

17. A computer implemented method for optimizing trade deployment and risk mitigation in a construction contracting project based on a risk of utilizing a plurality of contractors on the construction contracting project, the computer implemented method comprising:

provides:
generating, by a user computing device of a user, a webpage having a plurality of fields for receiving contractor information from a contractor;
sending, to a contractor computing device of the contractor, a link to the webpage;
displaying, the webpage on the contractor computing device;
receiving contractor information from the contractor computing device of the contractor, the contractor information comprising at least one of (i) a contractor input data, (ii) at least one document, and (iii) a geolocation data;
creating a contractor record based on the contractor information;
storing the contractor record in a connected database;
analyzing the contractor information;
authenticating and validating the contractor information;
assigning a review status a value for a first subset, wherein the value of the review status is indicative of a validation outcome of the first subset of the contractor information;
calculating a contractor risk metric associated with the contractor record based on the review status and the value; wherein the contractor risk metric is a measurement of a potential impact of the contractor on the construction contracting project;
storing the contractor risk metric in the contractor record in the connected database;
displaying a first graphical user interface on a user computing device of a user, the first graphical user interface comprising a request for the user to input a search query comprising parameters associated with the construction contracting project to generate the search query;
receiving the search query from the user computing device;
generating query results by matching the parameters with the contractor record stored in the connected database;
segmenting the query results into a plurality of groups based on risk metrics and the geolocation data associated with the contractor record;
based on the query results, generating a first graphical representation of a map comprising a graphical icon corresponding to the geolocation data of the contractor record matched in the query results; wherein a plurality of contractor records are represented by a plurality of graphical icons distributed across the map; wherein the graphical icon comprises a first stylized representation;
based on the query results, generating a project risk metric within a first predetermined geolocation based on the contractor risk metric of the contractor record matched in the query results and where said contractor record comprises the geolocation data corresponding to the first predetermined geolocation;
based on the project risk metric, generating a second graphical representation of a density map that represents a magnitude of risk associated with the construction contracting project;
displaying at least one of a first graphical representation and the second graphical representation on the user computing device;
receiving a selection from the user computing device, wherein the selection is a request to modify appearance of the graphical icon from the first stylized representation to a second stylized representation;
automatically displaying on the user computing device, the second stylized representation comprising a subset graphical window comprising the contractor record displayed in a standardized format;
receiving a user selection, on the first graphical user interface of the user computing device of at least one contractor record from the plurality of contractor records for engagement in the construction contracting project;
fetching personal details of at least one contractor corresponding to the at least one contractor record from the connected database; and
sending a notification of engagement to at least one contractor computing device of the at least one contractor.

18. The computer implemented method of claim 17, wherein the geolocation data is one of an IP address of the contractor computing device, GPS location data of the contractor computing device, and a location information entered by the contractor on a website displayed on contractor computing device.

19. The computer implemented method of claim 17, wherein the value of the review status comprises a graphical representation that the review status is at least one of denied, approved, or commented on.

20. The computer implemented method of claim 17 further comprising:
receiving, from the user computing device of the user, a request to review a first subset of the contractor information of the contractor;
after receiving the request to review the first subset of the contractor information, sending to the user computing device of the user, information for displaying the first subset of the contractor information on the user computing device;
receiving from the user computing device of the user, information requesting to update the review status for the first subset of the contractor information for the contractor;
storing an updated review status for the first subset of the contractor information in the contractor record of the contractor; and
sending to the user computing device, information for displaying an updated review status.

* * * * *